US 6,614,439 B2

(12) United States Patent
Matsumoto et al.

(10) Patent No.: US 6,614,439 B2
(45) Date of Patent: Sep. 2, 2003

(54) SYSTEM FOR DISPLAYING MULTIPLE IMAGES AND DISPLAY METHOD THEREFOR

(76) Inventors: Yuichi Matsumoto, 16-9-102, Miyamatsu-cho, Hiratsuka-shi, Kanagawa-ken (JP); Katsuhiro Miyamoto, 10-10, Takamoridai 1-chome, Isehara-shi, Kanagawa-ken (JP); Shuntaro Aratani, 9-8, Ogawa 3-chome, Machida-shi, Tokyo (JP); Hideaki Yui, 9-21-201, Ikuta 2-chome, Tama-ku, Kawasaki-shi, Kanagawa-ken (JP)

( * ) Notice: Subject to any disclaimer, the term of this patent is extended or adjusted under 35 U.S.C. 154(b) by 0 days.

(21) Appl. No.: 10/191,554

(22) Filed: Jul. 10, 2002

(65) Prior Publication Data
US 2002/0186212 A1 Dec. 12, 2002

Related U.S. Application Data

(62) Division of application No. 09/332,106, filed on Jun. 14, 1999, now Pat. No. 6,473,088.

(30) Foreign Application Priority Data

Jun. 16, 1998 (JP) .......................................... 10-183290
Jan. 29, 1999 (JP) .......................................... 11-023052

(51) Int. Cl.[7] .............................................. G06T 1/60
(52) U.S. Cl. ...................................................... 345/530
(58) Field of Search ................................. 345/501, 502, 345/530, 531, 535, 543, 544, 545

(56) References Cited

U.S. PATENT DOCUMENTS

| | | | |
|---|---|---|---|
| 4,961,072 A | 10/1990 | Sekikawa | 345/131 |
| 5,353,041 A | 10/1994 | Miyamoto et al. | 345/97 |
| 5,408,247 A | 4/1995 | Enomoto et al. | 345/100 |
| 5,420,603 A | 5/1995 | Tsuboyama et al. | 345/87 |
| 5,481,274 A | 1/1996 | Aratani et al. | 345/98 |
| 5,500,939 A | 3/1996 | Kurihara | 395/502 |
| 5,602,565 A | 2/1997 | Takeuchi | 345/119 |
| 5,677,741 A | 10/1997 | Yui | 348/649 |
| 5,815,135 A | 9/1998 | Yui et al. | 345/97 |
| 5,838,336 A | 11/1998 | Ross | 345/508 |
| 5,912,713 A | 6/1999 | Tsunoda et al. | 348/540 |
| 6,009,232 A | 12/1999 | Sakaegi et al. | 386/70 |
| 6,014,492 A | 1/2000 | Kim et al. | 389/67 |
| 6,037,921 A | 3/2000 | Matsumoto et al. | 345/88 |
| 6,170,016 B1 * | 1/2001 | Nakai et al. | 709/232 |
| 6,330,684 B1 | 12/2001 | Yamanaka et al. | 714/1 |

* cited by examiner

Primary Examiner—Matthew C. Bella
Assistant Examiner—Mackly Monestime

(57) ABSTRACT

A multiple images display system includes a plurality of image data input portions, for receiving image data from a plurality of image sources, a display device for simultaneously displaying all of the image data that are received by the image data input portions, an external action input portion, a frame memory for storing the image data received by the image data input portions, a transfer portion. In addition, a comparator compares the sum obtained for the input data transmission rates with a data transmission rate for the frame memory, a priority allocation portion determines and allocates display priorities for the image data sets to be displayed on the display device in accordance with the external action and a control portion controls the display, on the display device, of the received image data sets in accordance with the display priorities and the result obtained by the comparison of the data transmission rate for the frame memory with the sum detected for the input data transmission rates.

21 Claims, 43 Drawing Sheets

SYSTEM FOR DISPLAYING MULTIPLE IMAGES AND DISPLAY METHOD THEREFOR

This is a divisional application of application Ser. No. 09/332,106, filed on Jun. 14, 1999 now U.S. Pat. No. 6,473,088.

BACKGROUND OF THE INVENTION

1. Field of the Invention

The present invention relates to a multi-image display system for displaying on a single display device image data received from multiple image sources, and a display method therefor.

2. Related Background Art

Recently, there has been an increase in the use for presentations of image data that are supplied by notebook computers and that are displayed using large display devices, such as liquid crystal projectors or plasma display devices. There has also been an increase in the number of people attending conferences who save data to their computers for later reference, or who exchange files with other individuals who are present. Furthermore, in the future it can be expected that for video conferencing a system will employ PinP (Picture in Picture) to display, in a portion of a display area on a screen, video images of conference participants at remote locations, or that during a conference digital television transmission will be employed to distribute the contents of information that is presented for simultaneous, real-time display.

Because of the above described situation, a demand exists for image display systems whereby multiple, asynchronously received (inputted) image data sets can be simultaneously displayed. Some image display systems of this type employ a method whereby when image data sets are received (inputted) they are temporarily stored in a frame memory, and thereafter are transferred to the display means when the synchronization of all available (input) image data has been completed.

However, in order for a conventional image display system to simultaneously display multiple, asynchronously received (inputted) image data sets, the system must temporarily store the image data, and must delay their transfer to the display means until the synchronization of all image data has been accomplished. Therefore, if the resolution of the received image data is high, and if the data storage capacity is large or the data transfer rate is high, the speed at which the received data is transferred to a frame memory for storage may exceed the data transfer rate for the frame memory. It can be readily seen that this phenomenon will occur more frequently as the number of input sources is increased. And in addition, the above phenomenon will also occur more frequently when multiple, asynchronously received image data sets are simultaneously displayed in a video conferencing environment wherein there are frequent operating condition changes; for example, the sudden addition of an input connection, the alteration of the positions and sizes of multiple display windows, or the sudden shifting to a power saving mode of a computer that is acting as an input source. When a conventional image display system is employed in a video conferencing environment in which the above phenomenon is frequently encountered, display data are abandoned or erased, and the system hangs, so that the degree of freedom provided by the system configuration is lost.

SUMMARY OF THE INVENTION

It is, therefore, one objective of the present invention to provide a multiple images display system, for simultaneously displaying multiple image data sets while coping with changes in a display state that are caused by external actions, and a multiple image display method.

To achieve the above objective, according to an aspect of the present invention, a display apparatus comprises:

storage means, for storing image data input by a plurality of input means;

display means, for displaying image data that are read from the storage means;

comparison means, for comparing the sum of the input data transmission rates for the plurality of input means with the data transmission rate for the storage means;

storage control means, for, based on the results of the comparison, inhibiting the storage in the storage means of the image data input by the plurality of input means; and display control means, for indicating the input means that is inhibited from storing the image data in the storage means.

Furthermore, according to another aspect of the present invention, an image data storage control method, which is applied for a display apparatus that stores, in storage means, image data input by a plurality of input means and that displays, on display means, image data that are read from the storage means, comprises:

a comparison step of comparing the sum of the input data transmission rates for the plurality of input means with the data transmission rate for the storage means;

a storage control step of, based on the results of the comparison, inhibiting the storage in the storage means of the image data input by the plurality of input means; and a display control step of indicating the input means that is inhibited from storing the image data in the storage means.

According to another aspect of the present invention, a multiple images display system comprises:

a plurality of image data input means, for inputting image data from a plurality of image sources;

a display device, for simultaneously displaying all of the image data that are inputted by the plurality of image data input means;

external action input means, for receiving an external action;

a frame memory, for storing, as frames, the image data inputted by the plurality of image data input means;

transfer means, for reading the image data from the frame memory and for transferring the image data to the display device;

detection means, for detecting the sum of the input data transmission rates for the image data that are inputted by the plurality of image data input means;

comparison means, for comparing the sum obtained for the input data transmission rates with a data transmission rate for the frame memory;

priority allocation means, for determining and allocating display priorities for the image data sets to be displayed on the display device in accordance with the external action; and control means, for controlling the display, on the display device, of the inputted image data sets in accordance with the display priorities and the result obtained by the comparison of the data transmission rate for the frame memory with the sum detected for the input data transmission rates.

According to another aspect of the present invention, a multiple image display method for inputting image data from a plurality of image sources and for simultaneously displaying, on a display device, all the image data that are inputted, comprises:

an external action input step of inputting an external action;
a storage step of storing in a frame memory, as frames, the image data inputted from the plurality of input sources;
a detection step of detecting the sum of the input data transmission rates for the image data;
a transfer step of reading the image data from the frame memory and of transferring the image data to the display device;
a comparison step of comparing the sum obtained for the input data transmission rates with the data transmission rate for the frame memory;
a priority allocation step of determining and allocating display priorities for the image data sets to be displayed on the display device in accordance with the external action; and
a control step of controlling the display, on the display device, of the inputted image data sets in accordance with the display priorities and the result of the comparison of the data transmission rate for the frame memory with the sum detected for the input data transmission rates.

DETAILED DESCRIPTION OF THE PREFERRED EMBODIMENTS

The preferred embodiments of the present invention will now be described while referring to the accompanying drawings.

First Embodiment

Figure 1:
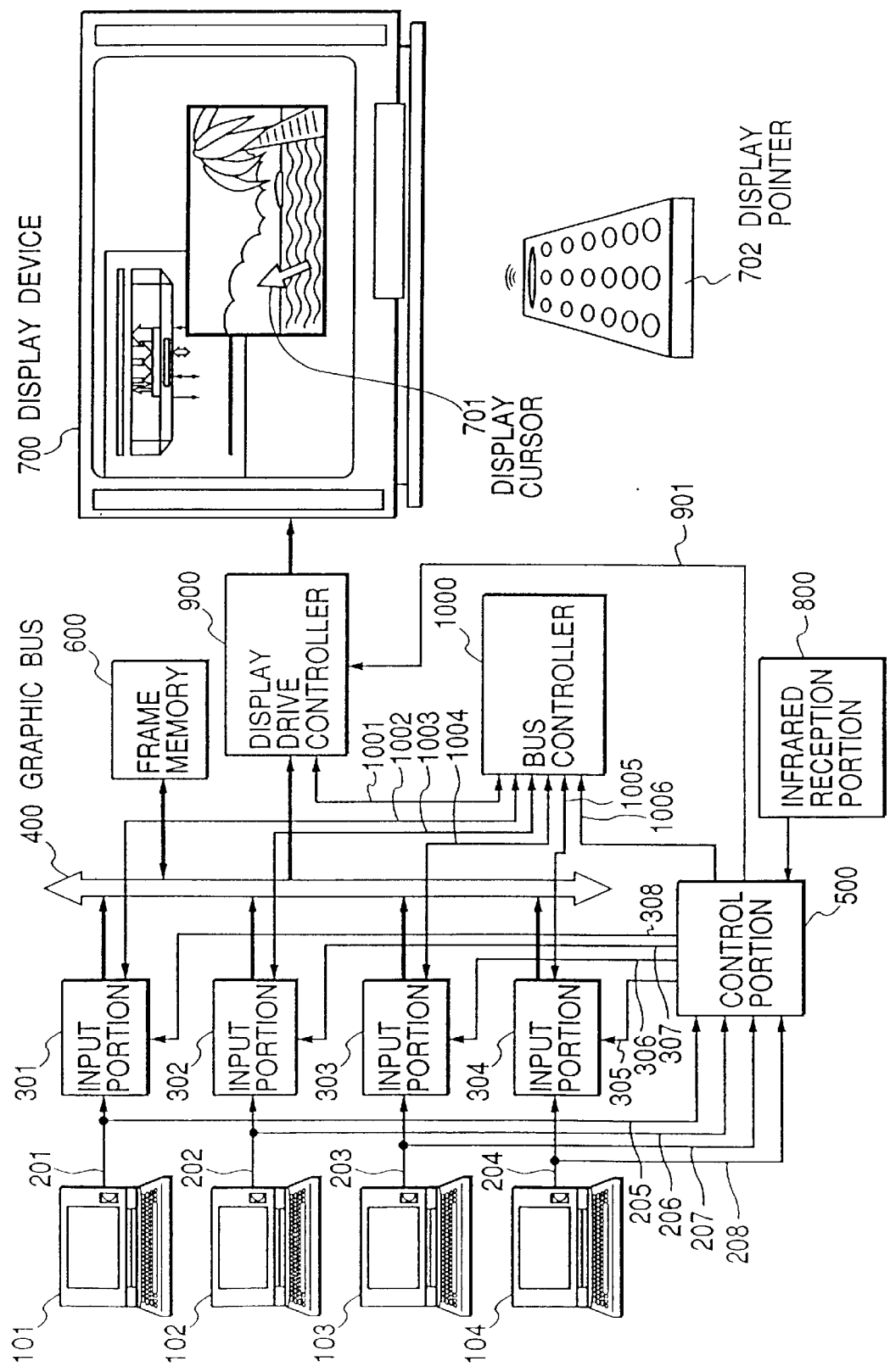
FIG. 1 is a block diagram illustrating an arrangement for a multiple images display system according to a first embodiment of the present invention.
Figure 2:
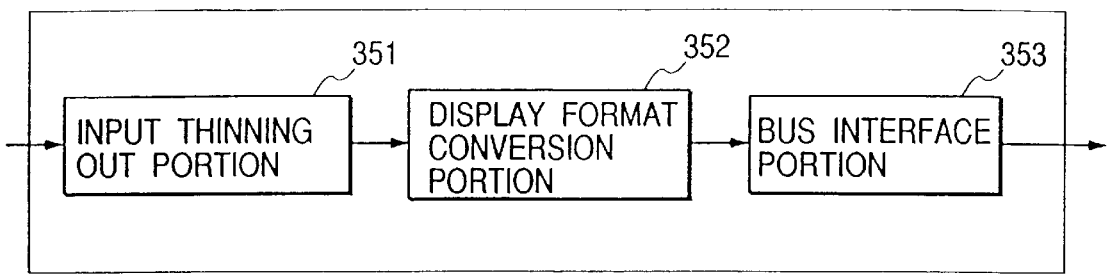
FIG. 2 is a block diagram illustrating the arrangement for an input portion in FIG. 1.

FIG. 1 is a block diagram illustrating an arrangement for a multiple images display system according to a first embodiment of the present invention, and FIG. 2 is a block diagram illustrating an arrangement for an input portion in FIG. 1.

As is shown in FIG. 1, the multiple images display system receives, at the included input portions 301 to 304, image signals from image sources 101 to 104, which are computers, and simultaneously displays, on a display device 700, images described by the received image signals. In this process, image signals from the image sources 101 to 104 are transmitted along signal lines 201 to 204 to the input portions 301 to 304. These image signals include RGB analog video signals, signal Vsyn, which is a vertical synchronization signal, and signal Hsync, which is a horizontal synchronization signal. The image sources 101 to 104 are not limited to computers, such as personal computers or workstations, but may also be digital television sets, or data streams, such as video, DV (digital video) or MPEG2. In this embodiment, four image sources 101 to 104 are employed; however, more or less than four image sources may be employed.

The input portions 301 to 304 include A/D converters for converting into digital signals image signals received from the image sources 101 to 104 along the signal lines 201 to 204, and PLLs (Phase Locked Loops) for sampling image data. If the input image signals are digital signals, such as LVDSs (Low Voltage Differential Signals), input portions having a decoder and a differential buffer are employed. If input image signals are television and video composite signals, input portions are employed that have encoders for encoding the image signals to obtain R, G and B signals.

The input portions 301 to 304 receive, from the image sources 101 to 104, image data and control signals for their simultaneous reception. In this embodiment, the input portions 301 to 304 receive, as control signals, a horizontal synchronization signal for acquiring synchronization for one line, a vertical synchronization signal for acquiring synchronization for one frame or one field, a clock signal for sampling one pixel, and a display enable signal designating a period to be used for the transfer of effective image data. The input portions 301 to 304 employ independent timings to receive image data from the image sources 101 to 104.

As is shown in FIG. 2, each of the input portions 301 to 304 includes: an input thinning-out portion 351, for the thinning out along the time axis of the data rate for an input image; a display format conversion portion 352, for converting the display format (the number of horizontal pixels, the number of vertical lines and the number of colors) for the received image data under the control of a control portion 500, which will be described later; and a bus interface 353, for transferring four independent image data sets to a single common graphic bus 400. The input thinning out portion 351 thins out image data as frame units, under the control of the control portion 500 that will be described later. In this embodiment, to simplify the explanation, the input thinning out portion 351 is employed to thin out image data as frame units; however, means for thinning out image data as bit units or as block units may be employed. The display format conversion portion 352 converts a resolution in order to arbitrarily enlarge/reduce an input image. The bus interface 353 positions a display window that has been moved, or that has been changed in size, in accordance with the address generation control for determining for input image data storage locations in a frame memory 600, which will be described later.

The control portion 500 controls the entire multiple images display system of the present invention, and includes a CPU (not shown), which has a computation capability; a RAM (not shown), which is used for the temporary storage of data; a ROM (not shown), which is used to store a control program; a timer (not shown), which measures the time; and a peripheral input/output interface (not shown). The control portion 500 can be constituted by only a logical portion. A program for governing the operation of the CPU may be stored in the ROM, or may be loaded from an external source via the peripheral input/output interface.

The control portion 500 receives, along signal lines 205 to 208, pixel clock signals, Hsync signals and Vsync signals for the image signals that are output along the signal lines 201 to 204 by the image sources 101 to 104. If the signals output by the image sources 101 to 104 are video composite signals, they are divided into Vsync signals and Hsync signals by synchronization signal separators, and the obtained signals are transmitted to the control portion 500.

The control portion 500 employs an internal timer to set the cycles for the received Vsync signal and Hsync signal. From the cycles, the control portion 500 can detect the frequency for one pixel (pixel frequency), the screen size (the horizontal pixel count (number) and the vertical line count number)), and the frame rate (the frame frequency) for each of the signals transmitted along the signal lines 201 and 204. In this embodiment, the input data transfer rate is detected by employing the signal lines 201 to 204, with the assumption that the input data transfer rate will be unchanged until it reaches the bus interface 353. If a data rate is changed as the result of the resolution conversion performed by the display format conversion portion 352, the input data transfer rate can be detected after the data rate has been converted, i.e., by using a signal output by the display format conversion portion 352.

The control portion 500 also serves as means for detecting the sum of the input data transfer rates. The control portion 500 employs the frequency detected for one pixel to detect the transfer rates for the individual signals received (inputted) by the input portions 301 to 304, and adds together the transfer rates (substitutions for the input data transfer rates) for the data output by the input portions 301 to 304 to obtain the sum of the input data transfer rates. For the system, the control portion 500 also provides various controls, which will be described later.

The frame memory 600 is a memory wherein at least one frame of image data to be drawn on the display device 700 can be stored. The image data output by the input portions 301 to 304 is readably stored in the frame memory 600, and the image data read from the frame memory 600 are transmitted via the graphic bus 400 and a display drive controller 900 to the display device 700. The display device 700 is constituted by a flat panel (liquid crystal or plasma display) having a matrix electrode structure, or a CRT (cathode ray tube).

The reading and the writing of the image data output by the input portions 301 to 304 relative to the frame memory 600 are controlled by a bus arbitration process conducted between the input portions 301 to 304 and the display drive controller 900, and a bus controller 1000. For the bus arbitration process, transfer request signals requesting the use of the graphic bus 400 for data transfers are asynchronously transmitted by the input portions 301 to 304 and the display drive controller 900 to the bus controller 1000 via signal lines 1001 to 1005. Upon receiving these request signals, the bus controller 1000 determines the priorities for the individual requests, and returns to the requesting sources, via the signal lines 1001 to 1005, transfer enable signals that designate the timings for the acquisition of graphic bus 400. The priorities awarded in accordance with the bus arbitration are determined by scalability management conducted to adjust the data rate for the system based on the input data transfer rates detected by the control portion 500 and transmitted to the bus controller 1000 via a signal line 1006.

A display pointer 702 is employed to relay instructions concerning the operation of the image display on the display device 700. The display pointer 702 constitutes a user interface that facilitates the operation of the display window by a user who employs the multiple images display system of the present invention. The display pointer 702 includes a function for displaying a moveable display cursor 701 on the display device 700. A user manipulates the display cursor 701, or a button provided on the display pointer 702, to instruct the performance of various tasks, such as the selection, the movement, the enlargement or the reduction of a display window. The task instruction information is transmitted via an infrared port (not shown) provided for the display pointer 702, and is received by an infrared reception portion 800. The infrared reception portion 800 transmits the received task instruction information to the control portion 500, which instructs the display drive controller 900 to adjust the screen images on the display in accordance with the received task instruction information.

A detailed operation of the multiple images display system will now be described.

The input data transfer rates (the data transfer capabilities per the unit hour: also called bandwidths) for the input portions 301 to 304 are defined as BWi1, BWi2, BWi3 and BWi4, and the sum of them is defined as BWi, i.e., $$BWi=BWi1+BWi2+BWi3+BWi4.$$

Further, the read out data transfer rate when the display drive controller 900 reads out the display data from the frame memory 600 is defined as BWd, and the data transfer rate for the frame memory 600 is defined as BWm. BWd and BWm are fixed values that are determined when the system is designed. The actual BWm is determined not only by the data transfer rate for the frame memory 600 but also by the effective transfer rate for the graphic bus 400. BWi is a variable value that is dynamically obtained by determining the above described input data transfer rate when the control portion 500 monitors the connections with the image sources 101 to 104 and data are input.

The following conditions are required for the transmission of data by the input portions 301 to 304 to the frame memory 600, and the transmission of data by the frame memory 600 to the display drive controller 900, when all the input data is not lost by the multiple images display system:

$$BWm > BWi + BWd \quad (1).$$

In the case of $$BWm < BWi + BWd \quad (2),$$

scalability management conducted for adjusting the data rate of the system is required.

An operation will now be described in which the conduct of scalability management is included.

Initialization Process

Figure 3:
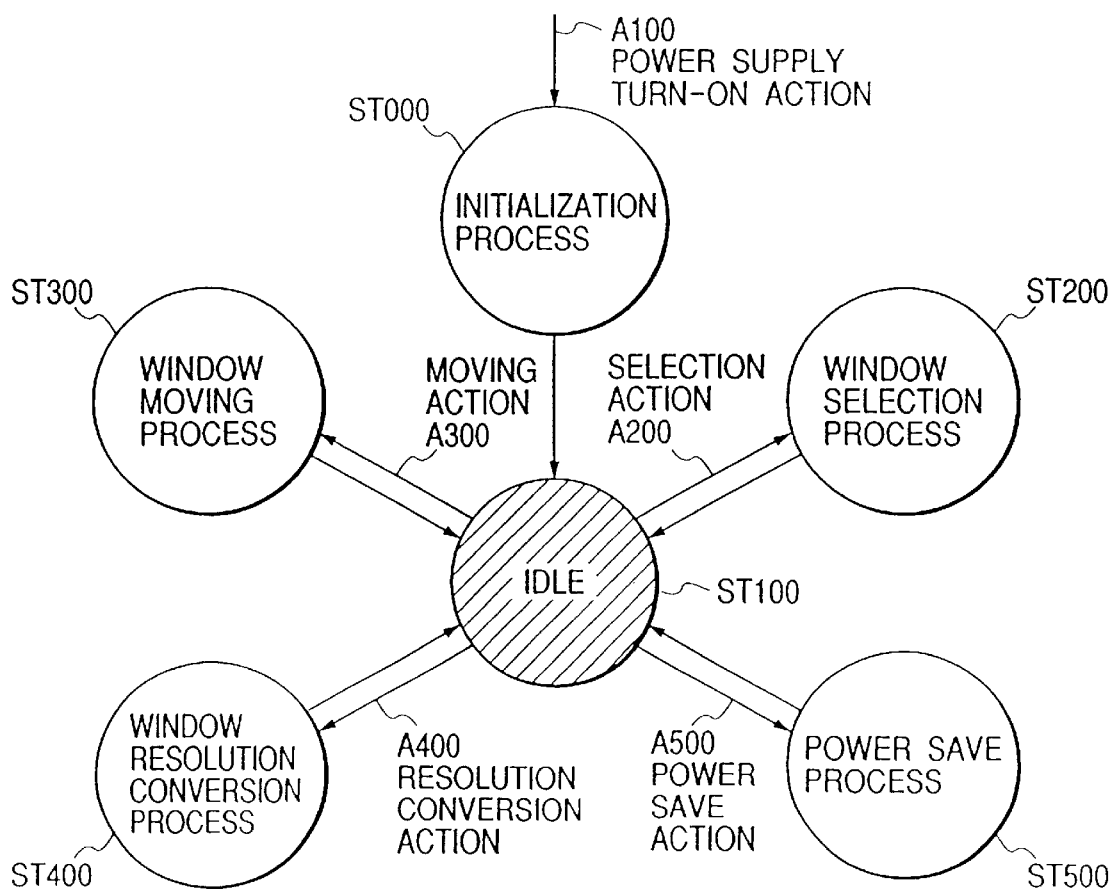
FIG. 3 is a diagram showing the shifting of the states of the multiple images display system in FIG. 1.

FIG. 3 is a diagram showing the shifting of the state of the multiple images display system in FIG. 1. The shifting to the individual states is controlled by the control portion 500.

First, when a power-ON action A100 has occurred, an initialization process ST000 is immediately begun.

Figure 4:
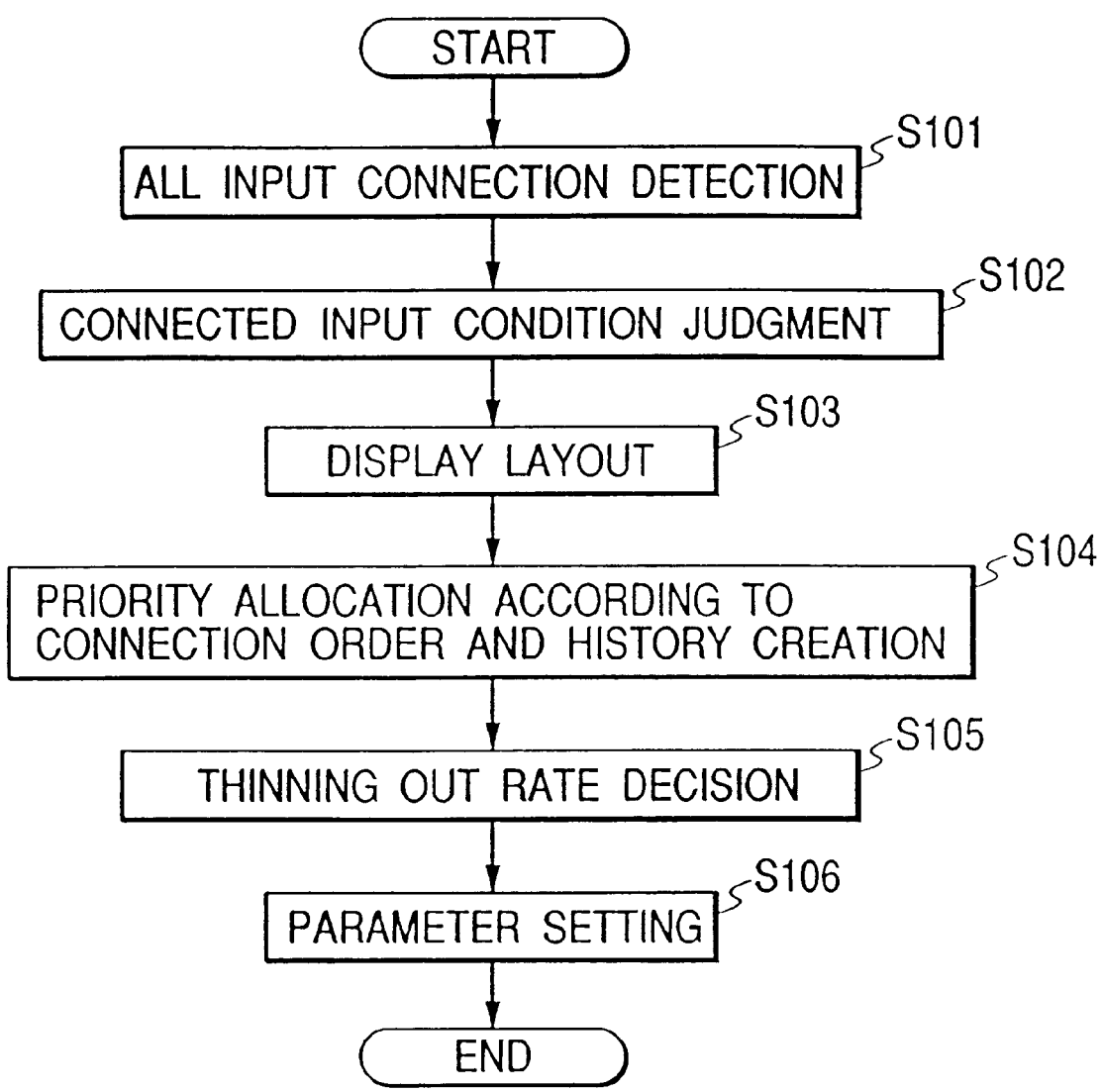
FIG. 4 is a flowchart showing the initialization process performed by the multiple images display system in FIG. 1.
Figure 5:
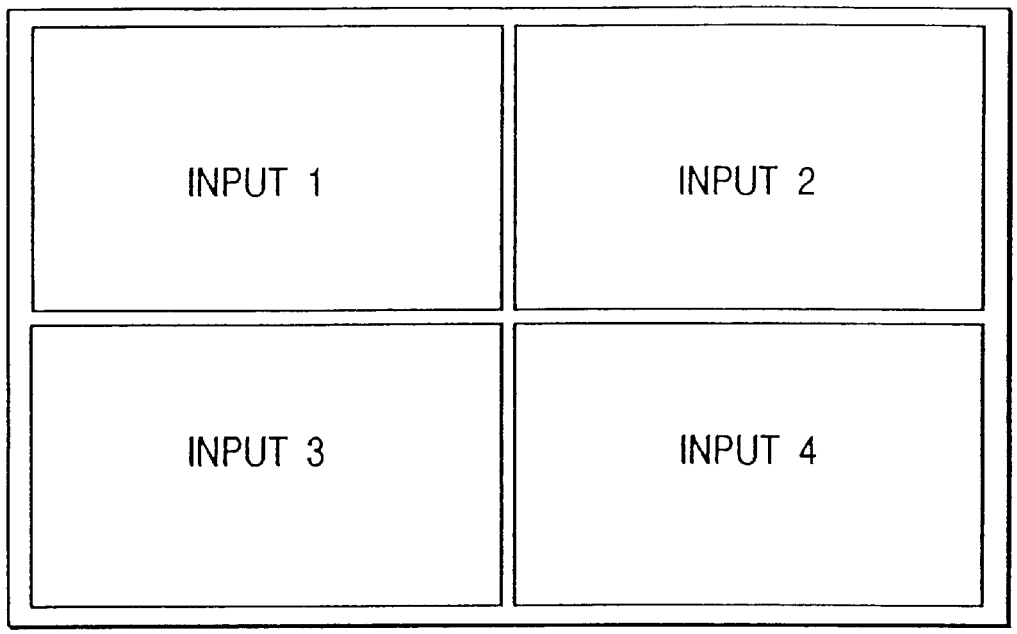
FIG. 5 is a diagram showing an initialized example display for the multiple images display system in FIG. 1.

The initialization process will now be explained while referring to FIGS. 4 and 5. FIG. 4 is a flowchart showing the initialization process performed by the multiple images display system in FIG. 1, and FIG. 5 is a diagram showing an initialized display example of the multiple images display system. In this example, four input connections are detected. The same condition is applied for the following explanation of the flowchart.

First, at step S101 the connection conditions of all the ports are examined. At step S102 the above described means is employed to determine the connection conditions (the screen size and the input data rate) for all the four input ports. At step S103, a display layout for determining the display location and the magnification rate is performed, so that, based on the screen size determined at step S102, the sizes of all the input data images displayed on the screen of the display device 700 will be the same (preparation of the display position information for four input data sets, and resolution conversion information).

At step S104, the priorities (display priorities) are allocated in the order in which the connections are detected, and a record of the history is created. The priorities are stored in the RAM of the control portion 500. Since this process is performed at the time of initialization, the priorities are arbitrarily determined by the system. In the following explanation, the history recorded for the priorities in the initialization state is assumed to be $$\text{input 1} > \text{input 2} > \text{input 3} > \text{input 4} \quad (3)$$

(preparation of the priority parameters). These priorities are reflected in the adjustment priority for the bus controller 1000.

At step S105, the scalability is controlled based on the input data rate determined at step S102. When expression (1) is established, the thinning-out rate for each of the input data sets is set to a default value (1.0), regardless of the order established for the priorities. In other words, the thinning-out process is not performed. When expression (2) is established, the thinning-out rate is determined for each input data set in accordance with the priorities in expression (3). In this embodiment, the input thinning out portion 351 performs a frame thinning-out process for fetching data as frame units, while the Vsync signal received via the signal line 201 is employed as a trigger and the input data rate is reduced to the average time.

According to this method, the purpose is to adjust the scalability so that expression (1) is established based on the average time, and expression (2) may be established in a moment. This case can be coped with by providing a data-waiting buffer for the bus interface 353. The scalability management conducted by the specific frame thinning out process begins with the varying, based on the average time, of the thinning-out rates for the individual input data sets, i.e., the frame rate (thinning out frames by turning every other frame or so ON or OFF along the time axis), and with the employment of the following expression (4) to re-calculate the latest input data transfer rates (data transfer capabilities by the unit hour: also called bandwidths), BWi1', BWi2', BWi3' and BWi4', for the input data sets.

$$BWi1' = BWi1 \times (\text{thinning-out rate for input 1})$$

Thinning-out rate for input 1=frame rate (Hz) after input 1 is thinned out/frame rate (Hz) before input 1 is thinned out $$BWi2' = BWi2 \times (\text{thinning-out rate for input 1})$$

Thinning-out rate for input 2=frame rate (Hz) after input 2 is thinned out/frame rate (Hz) before input 2 is thinned out $$BWi3'BWi3 \times (\text{thinning-out rate for input 3})$$

Thinning-out rate for input 3=frame rate (Hz) after input 3 is thinned out/frame rate (Hz) before input 3 is thinned out $$BWi4' = BWi4 \times (\text{thinning-out rate for input 4})$$

Thinning-out rate for input 4=frame rate (Hz) after input 4 is thinned out/frame rate (Hz) before input 4 is thinned out (4)

Then, in accordance with the priority history represented by expression (3), the control portion 500 calculates a condition that satisfies:

$$BWi' = BWi1' + BWi2' + BWi3' + BWi4'$$

$$BWm > BWi' + BWd \quad (5).$$

In the case of $$BWm < BWi' + BWd \quad (6),$$

the adjustment of the scalability is repeated until expression (5) is established.

A brief example is given below to supplement the above description.

For better understanding, assuming that the pixel frequency for each input is the same as the data quantity, the input data rate is proportional to the frame rate. By employing this assumption, if display data transfer rate BWd=K×60 Hz
data transfer rate BWi1 for input 1=K×60 Hz
data transfer rate BWi2 for input 2=K×50 Hz
data transfer rate BWi3 for input 3=K×70 Hz
data transfer rate BWi4 for input 4=K×60 Hz,
and the data transfer rate for the frame memory BWm=K×200 Hz, BWm<BWi+BWd=K×300 Hz is obtained, and expression (2) is established.

However, when thinning-out rates of 0.8, 0.6, 0.5 and 0.2 are provided in order, in accordance with the priorities obtained in expression (3), the following re-calculation results are obtained $$BWi1' = BWi1 \times (\text{thinning-out rate for input 1})$$
$$= K \times 60 \text{ Hz} \times 0.8 = K \times 48 \text{ Hz}$$

$$BWi2' = BWi2 \times (\text{thinning-out rate for input 2})$$
$$= K \times 60 \text{ Hz} \times 0.6 = K \times 36 \text{ Hz}$$

$$BWi3' = BWi3 \times (\text{thinning-out rate for input 3})$$
$$= K \times 70 \text{ Hz} \times 0.5 = K \times 35 \text{ Hz}$$

$$BWi4' = BWi4 \times (\text{thinning-out rate for input 4})$$
$$= K \times 60 \text{ Hz} \times 0.2 = K \times 12 \text{ Hz.}$$

BWm>BWi'+BWd=K×191 Hz is obtained, and the relationship in expression (5) is established.

At step S106, to initiate the display the control portion 500 sets the parameters at steps S103 and S105 for the input portions 301 to 304 and the bus controller 1000 via the signal lines 305 to 308 and 1006.

The display at this time is the display example at the time of initialization shown in FIG. 5. All the four inputs can be displayed, even though the data rate for each input is reduced. This method is an especially effective means for displaying a moving image that does not move frequently, similar to a static image (e.g., a presentation display screen). After this process is completed, the control portion 500 is shifted to the idle state in ST100 in FIG. 3, and waits for the next action.

<Window Selection Process>

When selection action A200 occurs in response to the manipulation of the display pointer 702, the control portion 500 immediately enters a window selection process ST200 in FIG. 3.

Figure 6:
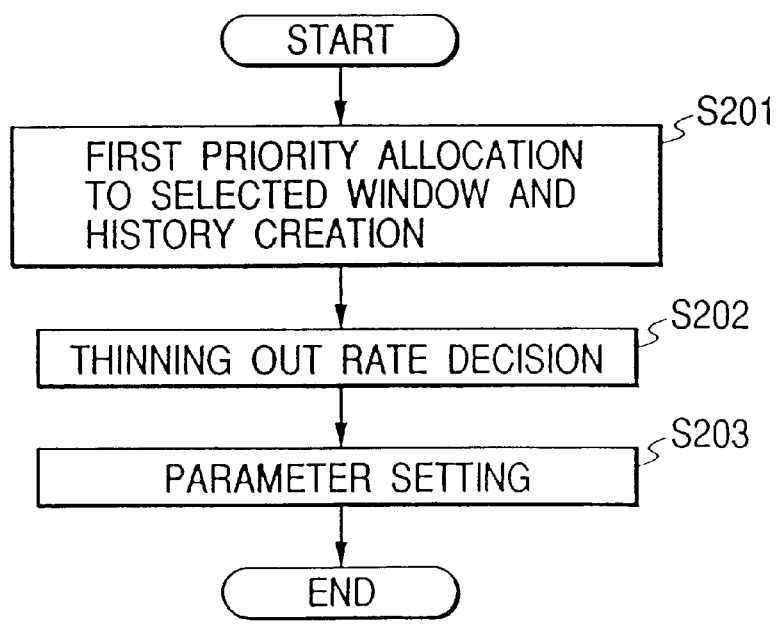
FIG. 6 is a flowchart showing the window selection process performed by the multiple images display system in FIG. 1.
Figure 7:
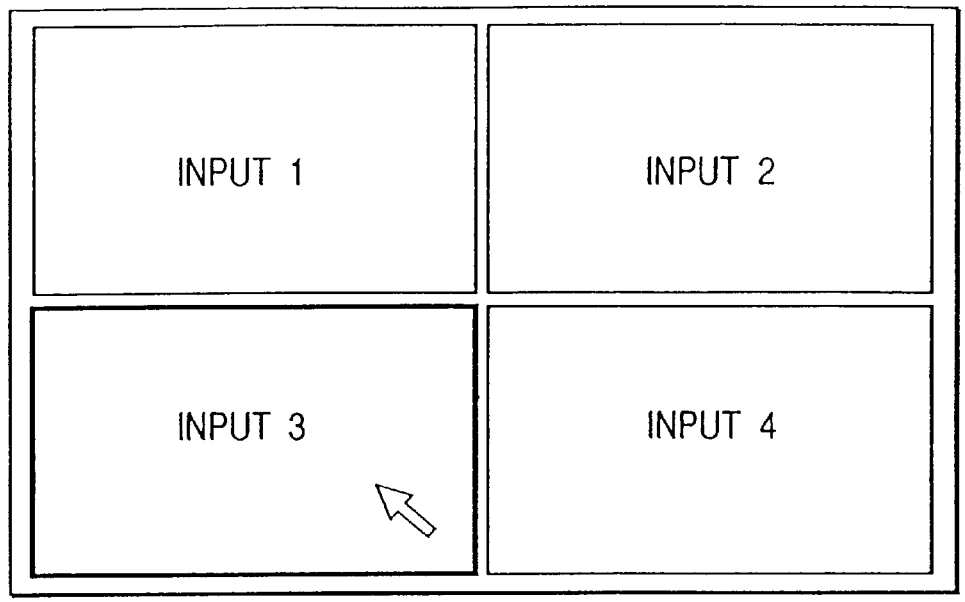
FIG. 7 is a diagram illustrating an example display in the window selection process.

The window selection process will now be described while referring to FIGS. 6 and 7. FIG. 6 is a flowchart showing the window selection process in the multiple images display system shown in FIG. 1, and FIG. 7 is a diagram showing a display example in the window selection process.

When an image displayed on the display device 700 is selected by the manipulation of the button of the display pointer 702 or by moving the display cursor 701, as is shown in FIG. 6, at step S201 the priorities are so re-allocated that the selected window receives the first priority, and the above described priority history record is updated. These priorities are stored in the RAM of the control portion 500. If input 3 is selected, as in the display example in the window selection process in FIG. 6, the priority history indicated in expression (3) is changed to input 3>input 1>input 2>input 4     (7)

(preparation of the priority parameters). These priorities are is reflected in the adjusted priority for the bus controller 1000.

At step S202 management of the scalability is executed. When expression (1) is established, the thinning-out rate for each of the input data sets is set to a default value, regardless of the priorities. When expression (2) is established, the thinning-out rate is determined for each input data set in accordance with the priorities recorded in expression (7). The above described method is used to change the thinning-out rates, and when thinning-out rates of 0.5, 0.6, 0.8 and 0.2 are provided in order, in accordance with the priorities recorded in expression (7), the following re-calculation results are obtained $$BWi1' = BWi1 \times (\text{thinning-out rate for input 1})$$
$$= K \times 60 \text{ Hz} \times 0.5 = K \times 30 \text{ Hz}$$

$$BWi2' = BWi2 \times (\text{thinning-out rate for input 2})$$
$$= K \times 60 \text{ Hz} \times 0.6 = K \times 36 \text{ Hz}$$

$$BWi3' = BWi3 \times (\text{thinning-out rate for input 3})$$
$$= K \times 70 \text{ Hz} \times 0.8 = K \times 56 \text{ Hz}$$

$$BWi4' = BWi4 \times (\text{thinning-out rate for input 4})$$
$$= K \times 60 \text{ Hz} \times 0.2 = K \times 12 \text{ Hz.}$$

BWm>BWi'+BWd=K×194 Hz is obtained, and the relationship in expression (5) is established.

At step S203, to initiate the display the control portion 500 sets the parameters at steps S201 and S202 for the input portions 301 to 304 and the bus controller 1000 via the signal lines 305 to 308 and 1006. The display at this time corresponds to the example shown in FIG. 7. In this state, input 3 is displayed as the one having the highest priority (the thinning-out rate was the highest of all). To provide a frame for the selected window, the control portion 500 transmits frame data along a signal line 901 to the display drive controller 900, which then displays the frame data while superposing (superimposing) the frame data on normal data. After this process is completed, the control portion 500 is shifted to the idle state in ST100 in FIG. 3, and waits for the next action.

<Window Moving Process>

When moving action A300 is activated in response to the manipulation of the display pointer 702, the control portion 500 immediately enters the window moving process ST300 in FIG. 3.

Figure 8:
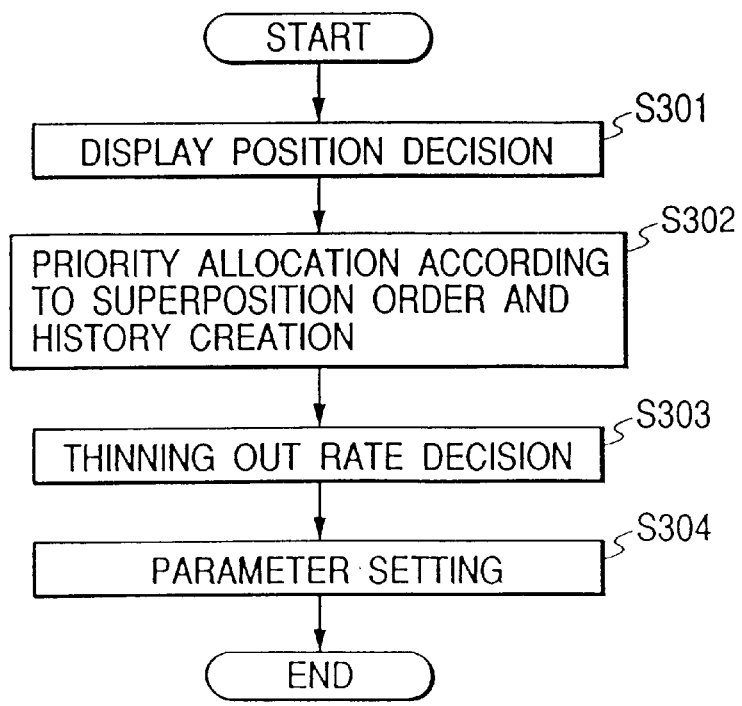
FIG. 8 is a flowchart showing the window moving display process performed by the multiple images display system in FIG. 1.
Figure 9:
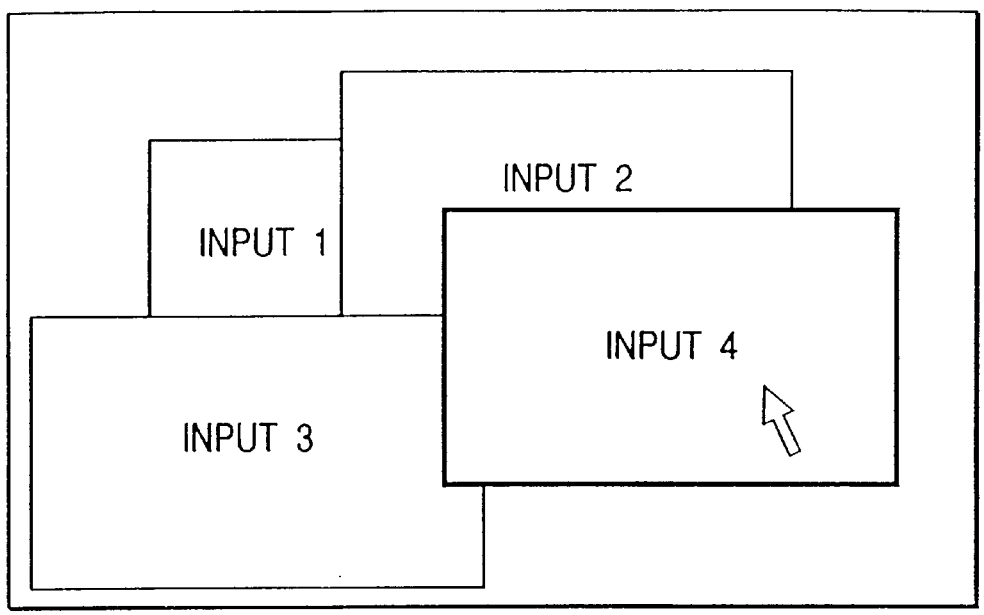
FIG. 9 is a diagram showing an example display for the multiple images display system in FIG. 1 during the window moving display process.

The window moving process will now be described while referring to FIGS. 8 and 9. FIG. 8 is a flowchart for the window moving process for the multiple images display system in FIG. 1, and FIG. 9 is a diagram showing an example display for the window moving process for the multiple images display system in FIG. 1. In this explanation, assuming that several window moving actions have been performed, the display state is as shown in FIG. 9.

When moving action A300 is activated by the manipulation of the button on the display pointer 702, as is shown in FIG. 8, at step S301 the display position of each input display window that is changed by the moving action is altered (display position information parameters for four inputs are prepared). At step S302, the priorities are so re-allocated that the priorities are lowered, beginning with the foremost window and continuing to the rearmost window, when the windows are overlapped as a result of the performance of several window moving processes, and the above described priority history record is updated. These priorities are stored in the RAM of the control portion 500.

The priority history recorded in expression (7) is changed to $$\text{input } 4 > \text{input } 3 > \text{input } 2 > \text{input } 1 \qquad (8)$$

(preparation of the priority parameters). These priorities are reflected in the adjusted priority for the bus controller 1000.

At step S303 management of the scalability is executed. When expression (5) is established, the thinning-out rate for each of the input data sets is set to a default value, regardless of the priorities. When expression (6) is established, the thinning-out rate is determined for each input data set in accordance with the priorities in expression (8). The above described method is used to change the thinning-out rate. When thinning-out rates of 0.3, 0.5, 0.6 and 0.8 are provided in order, in accordance with the priorities recorded in expression (8), the following re-calculation results are obtained $$BWi1' = BWi1 \times (\text{thinning-out rate for input } 1)$$
$$= K \times 60 \text{ Hz} \times 0.3 = K \times 18 \text{ Hz}$$

$$BWi2' = BWi2 \times (\text{thinning-out rate for input } 2)$$
$$= K \times 60 \text{ Hz} \times 0.5 = K \times 30 \text{ Hz}$$

$$BWi3' = BWi3 \times (\text{thinning-out rate for input } 3)$$
$$= K \times 70 \text{ Hz} \times 0.6 = K \times 42 \text{ Hz}$$

$$BWi4' = BWi4 \times (\text{thinning-out rate for input } 4)$$
$$= K \times 60 \text{ Hz} \times 0.8 = K \times 48 \text{ Hz.}$$

BWm>BWi'+BWd=K×198 Hz is obtained, and the relationship in expression (5) is established.

At step S304, to initiate the display the control portion 500 sets the parameters at steps S301 and S303 for the input portions 301 to 304 and the bus controller 1000 via the signal lines 305 to 308 and 1006. After this process is completed, the control portion 500 is shifted to the idle state in ST100 in FIG. 3, and waits for the next action.

<Resolution Conversion Process>

When resolution conversion action A400 has been initiated in response to the manipulation of the display pointer 702, the control portion 500 immediately enters a window resolution conversion process ST400 in FIG. 3.

Figure 10:
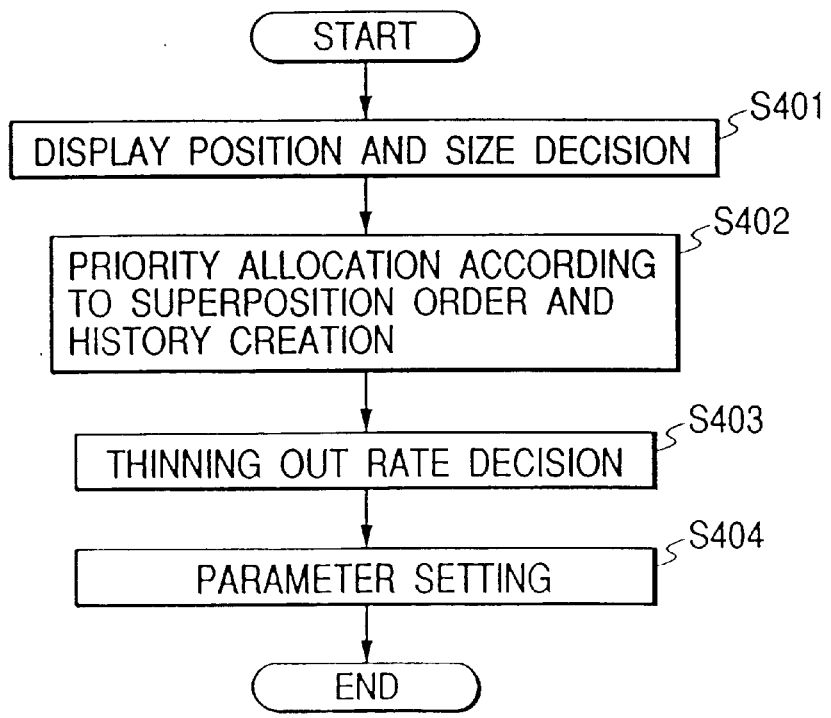
FIG. 10 is a flowchart showing the window resolution conversion process performed by the multiple images display system in FIG. 1.
Figure 11:
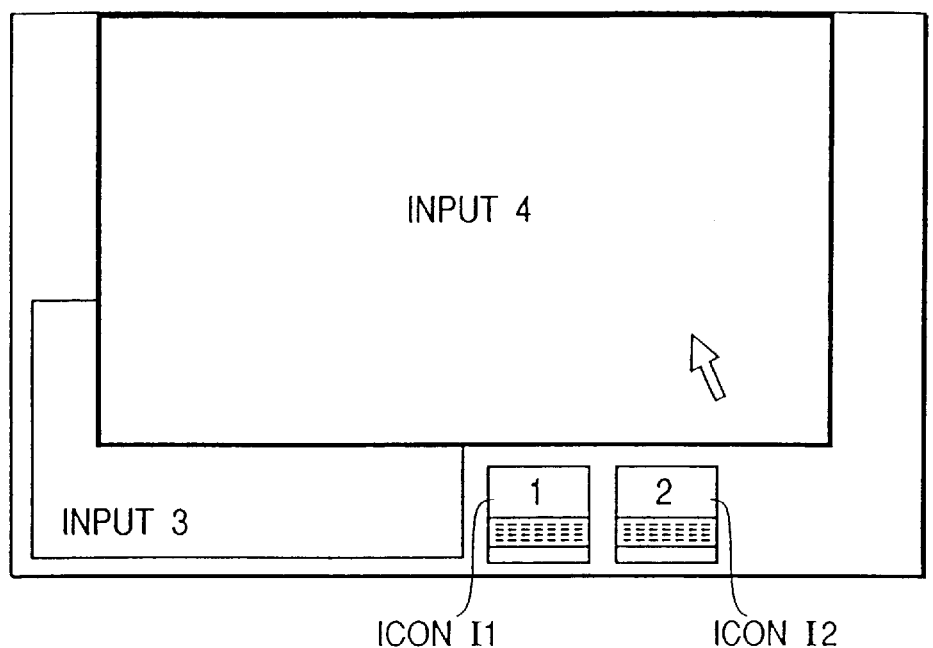
FIG. 11 is a diagram showing an example display for the multiple images display system in FIG. 1 during the window resolution conversion process.

The window resolution conversion process will now be described while referring to FIGS. 10 and 11. FIG. 10 is a flowchart showing the window resolution conversion process in the multiple images display system in FIG. 1, and FIG. 11 is a diagram showing an example display for the window resolution conversion process. In this example, the state wherein the window enlarging action is performed is employed.

When the resolution conversion action A400 has been activated by the manipulation of the display pointer 702, as is shown in FIG. 10, at step S401 the display position and the size of the display window that is changed by the resolution conversion (enlargement) action are altered (display position information parameters for the input data to be enlarged are prepared). At step S402, when the superposition condition occurs by the window resolution (enlargement) action, the priorities are so re-allocated that the highest priority is allocated for the selected enlarged window and the priorities are sequentially lowered toward the rearmost window, while the above described priority history record is updated. When an input window is hidden by the enlarged window (see FIG. 11; corresponds to inputs 1 and 2), the display for that window is rendered meaningless, so that, as additional information, a window other than one having a displayed area is regarded as having the lowest priority. These priorities are stored in the RAM of the control portion 500.

The priority history (c) is changed to $$\text{input } 4 > \text{input } 3 \; (>\text{input } 2 = \text{input } 1) \qquad (9)$$

(preparation of the priority parameters). These priorities are reflected in the adjusted priority for the bus controller 1000.

At step S403 management of the scalability is executed. When expression (1) is established, the thinning-out rate for each of the input data sets is set to a default value, regardless of the priorities. When expression (2) is established, the thinning-out rate is determined for each input data set in accordance with the priorities in expression (9). The above described method is used to change the thinning-out rate. When thinning-out rates of 0.0, 0.0, 1.0 and 1.0 are provided in order in accordance with the priorities recorded in expression (9), and additional information, i.e., information concerning a window that is hidden under the enlarged window, the following re-calculation results are obtained $$BWi1' = BWi1 \times (\text{thinning-out rate for input } 1)$$
$$= K \times 60 \text{ Hz} \times 0.0 = 0 \text{ Hz}$$

$$BWi2' = BWi2 \times (\text{thinning-out rate for input } 2)$$
$$= K \times 60 \text{ Hz} \times 0.0 = 0 \text{ Hz}$$

$$BWi3' = BWi3 \times (\text{thinning-out rate for input } 3)$$
$$= K \times 70 \text{ Hz} \times 1.0 = K \times 70 \text{ Hz}$$

$$BWi4' = BWi4 \times (\text{thinning-out rate for input } 4)$$
$$= K \times 60 \text{ Hz} \times 1.0 = K \times 60 \text{ Hz.}$$

BWm>BWi'+BWd=K×130 Hz is obtained, and the relationship in expression (5) is established. In this case, input 3 and 4 can be processed at the actual rate without thinning-out.

At step S404, to initiate the display the control portion 500 sets the parameters at steps S401 and S403 for the input portions 301 to 304 and the bus controller 1000 via the signal lines 305 to 308 and 1006. The control portion 500 transmits icon data (icons 11 and 12 in FIG. 11) along the signal line 901 to the display drive controller 900, so that the user can identify the connection with inputs 1 and 2, even when input data are not displayed. The display drive controller 900 then displays the icon data while superposing the icon data on normal data. After this process is completed the control portion 500 is shifted to the idle state in ST100 in FIG. 3, and waits for the next action.

<Power Saving Process>

Finally, a power saving process will be described. In the multiple images display system, the image sources 101 to 104 are so set up that they enter a power saving mode. When computers are employed as the image sources 101 to 104, the power saving mode can be easily detected by the monitoring by the control portion 500 of the states (VESA DPMS specifications, etc.) of the Hsync signal and the Vsync signal on the signal lines 205 to 208. And when the image sources 101 to 104 output composite video signals, the input portions 301 to 304 can monitor the condition whereby the full-screen FLUE of image data on the signal lines 201 to 204 is continued for a predetermined time, thus making it possible for the power saving mode to be easily detected. The shifting to the power saving mode is a sudden action that occurs regardless of the above described actions performed by a user while employing the display pointer 702.

When the control portion 500 identifies a power saving action A500, it immediately enters a power saving process ST500.

Figure 12:
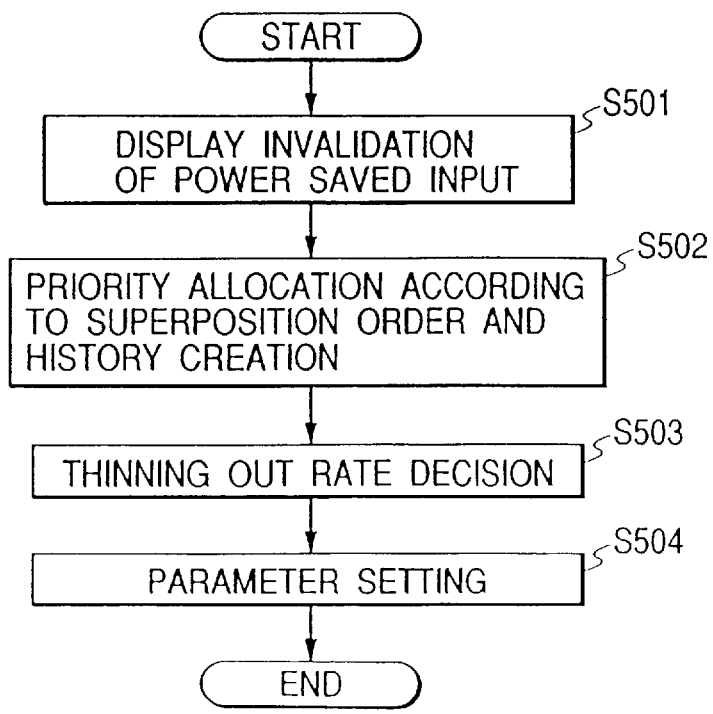
FIG. 12 is a flowchart showing the power saving process performed by the multiple images display system in FIG. 1.
Figure 13:
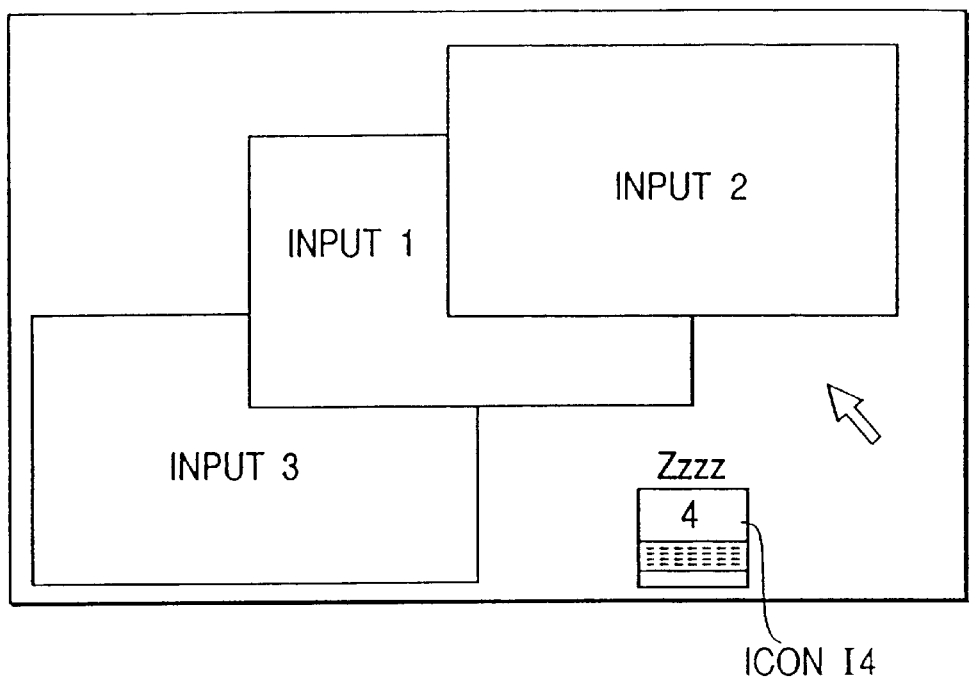
FIG. 13 is a diagram showing an example display for the multiple images display system in FIG. 1 during the power saving process.

The power saving process will now be described while referring to FIGS. 12 and 13. FIG. 12 is a flowchart showing the power saving process for the multiple images display system in FIG. 1, and FIG. 13 is a diagram showing an example display in the power saving mode of the multiple images display system in FIG. 1. In this example, it is assumed that input 4 has entered the power saving mode.

When at least one of the image sources 101 to 104 is shifted to the power saving mode, as is shown in FIG. 12, at step S501 the display is invalidated, while the input in the power saving mode is regarded as having no display area. In this example, input 4 is shifted to the power saving mode and is displayed as an icon (an icon 14 in FIG. 13). Since the positions and sizes of other windows (inputs 1, 2 and 3) are the same as those for the previous action, the display positions and the sizes of the display windows need not be altered.

At step S502, the priorities are so re-allocated that the priorities are lowered starting at the foremost window and continuing to the rearmost window, except for the window for which the input has been invalidated due to the power saving action, and the above described priority history record is updated. These priorities are stored in the RAM of the control portion 500. In this embodiment, as additional information, when input 4 was changed to an icon as a result of the power saving process, inputs 1 and 2, which were hidden under input 4 and were displayed as icons, are now displayed again.

The priority history (9) is changed to $$\text{input 2} > \text{input 1} > \text{input 3} (> \text{input 4}) \tag{10}$$

(preparation of the priority parameters). These priorities are reflected in the adjusted priority for the bus controller 1000.

At step S503 management of the scalability is executed. When expression (1) is established, the thinning-out rate for each of the input data sets is set to a default value, regardless of the priorities. When expression (2) is established, the thinning-out rate is determined for each input data set in accordance with the priorities in expression (10). The above described method is used to change the thinning-out rate. When thinning-out rates of 0.9, 1.0, 0.8 and 0.0 are provided in order, in accordance with the priorities recorded obtained in expression (10), the following re-calculation results are obtained $$BWi1' = BWi1 \times (\text{thinning-out rate for input 1})$$
$$= K \times 60 \text{ Hz} \times 0.9 = K \times 54 \text{ Hz}$$

$$BWi2' = BWi2 \times (\text{thinning-out rate for input 2})$$
$$= K \times 60 \text{ Hz} \times 1.0 = K \times 60 \text{ Hz}$$

$$BWi3' = BWi3 \times (\text{thinning-out rate for input 3})$$
$$= K \times 70 \text{ Hz} \times 0.8 = K \times 56 \text{ Hz}$$

$$BWi4' = BWi4 \times (\text{thinning-out rate for input 4})$$
$$= K \times 60 \text{ Hz} \times 0.0 = 0 \text{ Hz}.$$

BWm>BWi'+BWd=K×170 Hz is obtained, and the relationship in expression (5) is established.

At step S504, to initiate the display the control portion 500 sets the parameters at step S503 for the input portions 301 to 304 and the bus controller 1000 via the signal lines 305 to 308 and 1006. Further, the control portion 500 transmits icon data (icon 14) along the signal line 901 to the display drive controller 900, so that, even when input data are not displayed, the user can ascertain that a connection has been established with input 4 and that the input 4 is in the power saving mode. The display drive controller 900 then displays the icon data while superposing the icon data on normal data. After this process is completed, the control portion 500 is shifted to the idle state in ST100 in FIG. 3, and waits for the next action.

As described above, in the multiple images input display system, the display condition is dynamically changed by repeating the various above described actions instructed by the user (only one example has been employed in this embodiment) or by an action originating at an image source (the shifting to the power saving mode). Since, in accordance with such changes the priority history recorded for managing scalability is automatically updated from expression (3) to (7) to (8) to (9) to (10), the user can operate the multiple images display system merely by manipulating a user interface, such as the display cursor 701 or the display pointer 702, without being at all aware of the scalability management that is conducted. As a result, an environment can be provided for a user wherein scalability is managed automatically while interacting with actions instructed by the user or an action originating at an image source (the power saving mode). That is, a multiple images display system having excellent usability can be constructed.

Second Embodiment

A second embodiment of the present invention will now be described while referring to the accompanying drawings.

Figure 15:
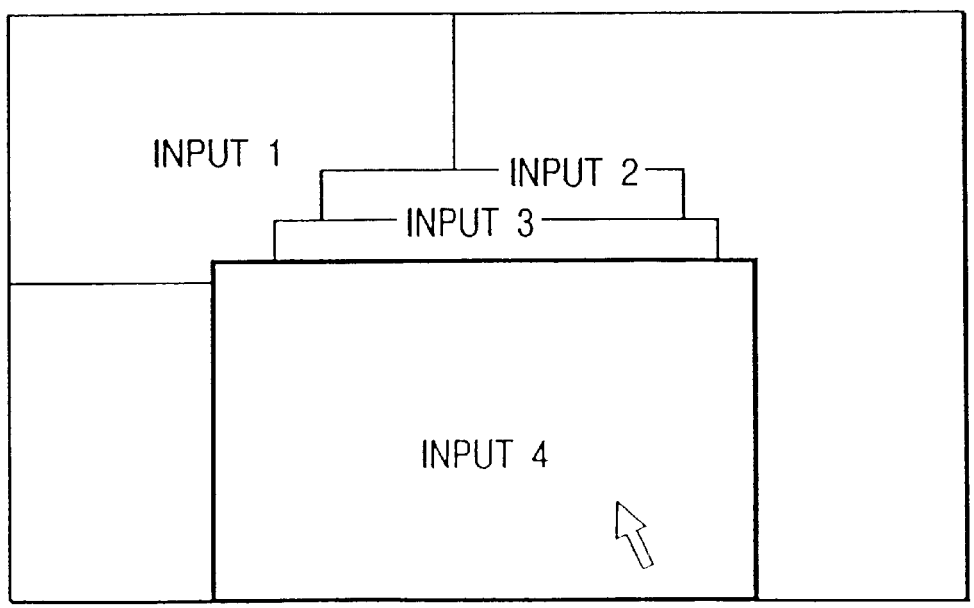
FIG. 15 is a diagram showing an example display for which a problem arises in the overlapping state according to the first embodiment of the present invention.

First, while referring to FIG. 15, an explanation will be given for a problem that is encountered with the method for deciding priorities merely by determining the overlapping condition, as in the first embodiment. FIG. 15 is a diagram showing an example display when the overlapping condition occurs in a program in the first embodiment.

When the management of scalability is performed as in the first embodiment under the display conditions shown in FIG. 15, the display example shown in FIG. 9 for the first embodiment is also obtained. The results at this time are:

$$BWi1' = BWi1 \times (\text{thinning-out rate for input 1})$$
$$= K \times 60 \text{ Hz} \times 0.3 = K \times 18 \text{ Hz}$$

$$BWi2' = BWi2 \times (\text{thinning-out rate for input 2})$$
$$= K \times 60 \text{ Hz} \times 0.5 = K \times 30 \text{ Hz}$$

$$BWi3' = BWi3 \times (\text{thinning-out rate for input 3})$$
$$= K \times 70 \text{ Hz} \times 0.6 = K \times 42 \text{ Hz}$$

$$BWi4' = BWi4 \times (\text{thinning-out rate for input 4})$$
$$= K \times 60 \text{ Hz} \times 0.8 = K \times 48 \text{ Hz}.$$

However, in the display example in FIG. 15, although inputs 2 and 3 have almost no display areas, they are adjusted as windows having higher priorities than input 1, which has a large display area. It should be more convenient for a user to update, as having a higher priority, input 1, which has a larger display area than inputs 2 and 3.

To resolve this problem, in the second embodiment, if inputs 1 to 4 overlap on the display device 700, a method is employed for determining whether the sum of the pixel counts (numbers) for the display areas of inputs 1 to 3 in the background is smaller than a predetermined pixel count (number), and for changing the display priorities of the inputs 1 to 3 in the background in accordance with the results provided by the determination.

Figure 14:
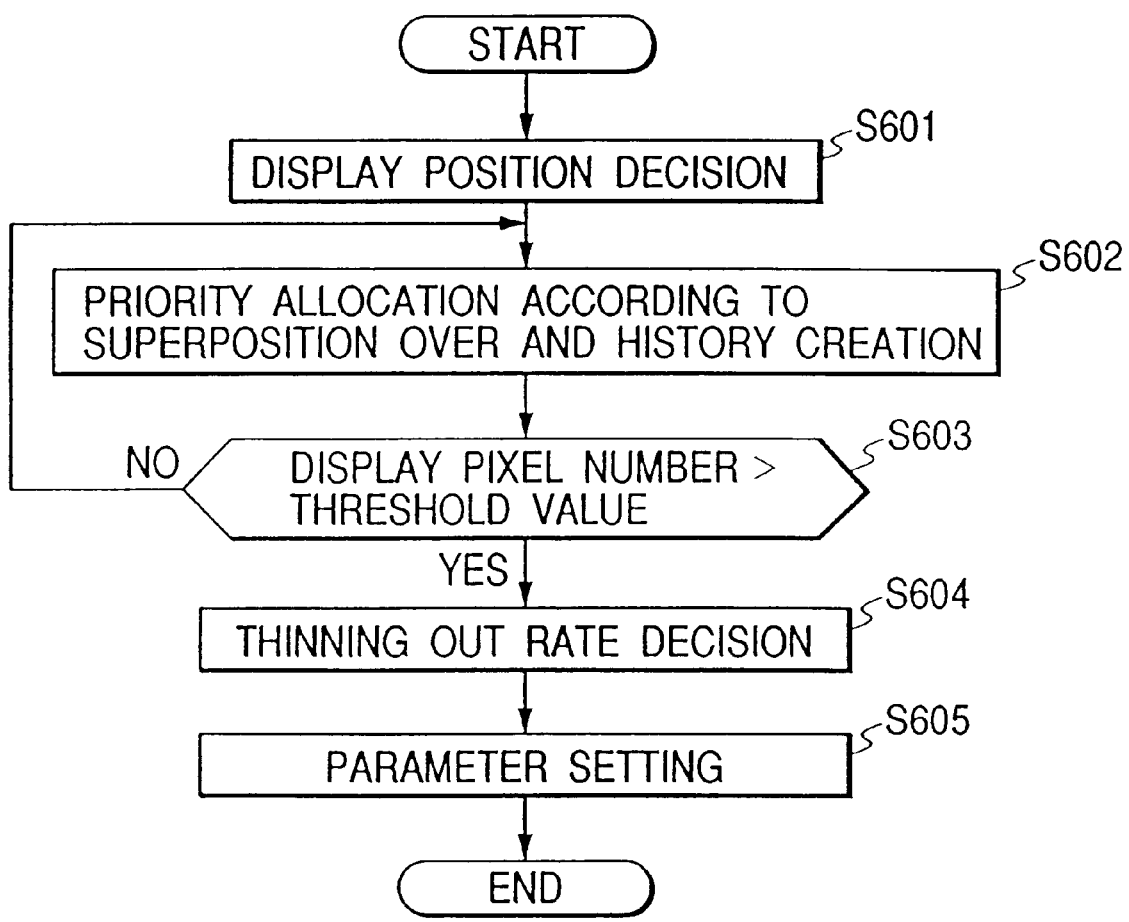
FIG. 14 is a flowchart showing the processing performed by a multiple images display system according to a second embodiment of the present invention.

This method will now be described while referring to FIG. 14. FIG. 14 is a flowchart showing the processing for a multiple images display system according to the second embodiment of the present invention.

Specifically, as is shown in FIG. 14, at step S601 the display positions for the individual input display windows that are changed due to a moving action are decided (preparation of parameters for display position information for four inputs). At step S602, the priorities are re-allocated so that the priorities are lowered beginning at the foremost window and continuing to the rearmost when overlapping of the windows occurs as a result of several window moving actions, and the priority history record is updated. The priorities are stored in the RAM of the control portion 500.

At step S603, the areas on the display device 700 wherein the inputs are actually displayed are calculated to determine the number of display pixels required for the individual inputs, and each of the obtained display pixel numbers is compared with a display threshold value. Since the control portion 500 possesses precise information concerning the current priority history and the positions and sizes of the individual display windows, the number of display pixels can be easily calculated. Assume that the control portion 500 calculates the number of pixels for each input in the display example in FIG. 15 as display pixel number for input 1=DP1 (pixel number)

display pixel number for input 2=DP2 (pixel number)

display pixel number for input 3=DP3 (pixel number)

display pixel number for input 4=DP4 (pixel number).

Then, the number of pixels that a user does not regard as an effective display area is determined in advance. This pixel number is defined as a display pixel threshold value (TH pixel number). Then, the number of the display pixels that is obtained is compared with the display pixel threshold value to determine whether the individual display inputs have larger display areas than that provided by the threshold value. That is, whether the inputs have display areas would be considered effective by a user is determined. When the following results are obtained in the display example in FIG. 15,

DP1>TH

DP2<TH

DP3<TH

DP4>TH, the priority history recorded is input 4>input 3>input 2>input 1 as represented in expression (8). However, in this embodiment, when as the result of comparison the display pixel number is smaller than the threshold value (TH pixel number), program control returns to step S602, and the priority is lowered for the pertinent input. The priority history is changed to input 4>input 1>input 2=input 3 (11)

(preparation of the priority parameters).

This priorities are is reflected in the adjusted priority for the bus controller 1000.

At step S604 management of the scalability is executed. When expression (1) is established, the thinning-out rate for each of the input data sets is set to a default value, regardless of the priorities. When expression (2) is established, the thinning-out rate for each input data set is determined in accordance with the priorities in expression (11). The above described method is used to change the thinning-out rate. When thinning-out rates of 0.9, 0.2, 0.2 and 1.0 are provided in order, in accordance with the priorities recorded in expression (11), the following re-calculation results are obtained $$BWi1' = BWi1 \times (\text{thinning-out rate for input 1})$$
$$= K \times 60 \text{ Hz} \times 0.9 = K \times 54 \text{ Hz}$$

$$BWi2' = BWi2 \times (\text{thinning-out rate for input 2})$$
$$= K \times 60 \text{ Hz} \times 0.2 = K \times 12 \text{ Hz}$$

$$BWi3' = BWi3 \times (\text{thinning-out rate for input 3})$$
$$= K \times 70 \text{ Hz} \times 0.2 = K \times 14 \text{ Hz}$$

$$BWi4' = BWi4 \times (\text{thinning-out rate for input 4})$$
$$= K \times 60 \text{ Hz} \times 1.0 = K \times 60 \text{ Hz}.$$

BWm>BWi'+BWd=K×140 Hz is obtained, and the relationship in expression (5) is established.

At step S605, to initiate the display the control portion 500 sets the parameters at step S604 for the input portions 301 to 304 and the bus controller 1000 via the signal lines 305 to 308 and 1006. After this process is completed, the control portion 500 is shifted to the idle state in ST100 in FIG. 3, and waits for the next action.

In this process, the frame rate is changed from 18 Hz to 54 Hz for input 1; from 42 Hz to 12 Hz for input 2; from 42 Hz to 14 Hz for input 3; and from 48 Hz to 60 Hz for input 4. That is, the frame rates are increased for the inputs 1 and 4 that are important to a user, while the frame rates for the less important inputs 2 and 3 are reduced.

As is described above, in the second embodiment, the scalability management conducted, whereby a display area that is important to a user is also considered, not only resolves the above described problem but also fosters a dramatic improvement in the user interface. This effect is unique to the second embodiment.

(Third Embodiment)

A third embodiment of the present invention will now be described while referring to the accompanying drawings.

In the first and the second embodiments, the priorities can not be automatically determined when the windows are not overlapped and when all the effective display areas for a user (when at least two display areas exceed the threshold value in the second embodiment) are displayed.

In the third embodiment, therefore, a motion detection portion is additionally provided for the input portions 301 to 304 in FIG. 1. When the windows are not overlapped and when all the effective display areas for a user (when at least two display areas exceed the threshold value in the second embodiment) are displayed, a distance that is moved is detected by the motion detection portion and is employed to automatically determine the priorities. The distance moved that is detected by the motion detection portion is employed as a reference to determine the priorities for multiple display windows, and the accurate distance each pixel in a display window is moved is not required. Therefore, a motion detection portion in this embodiment constitutes a motion detection circuit for the easy calculation, as a differential value for frames, of the total number of pixels in one frame.

Figure 16:
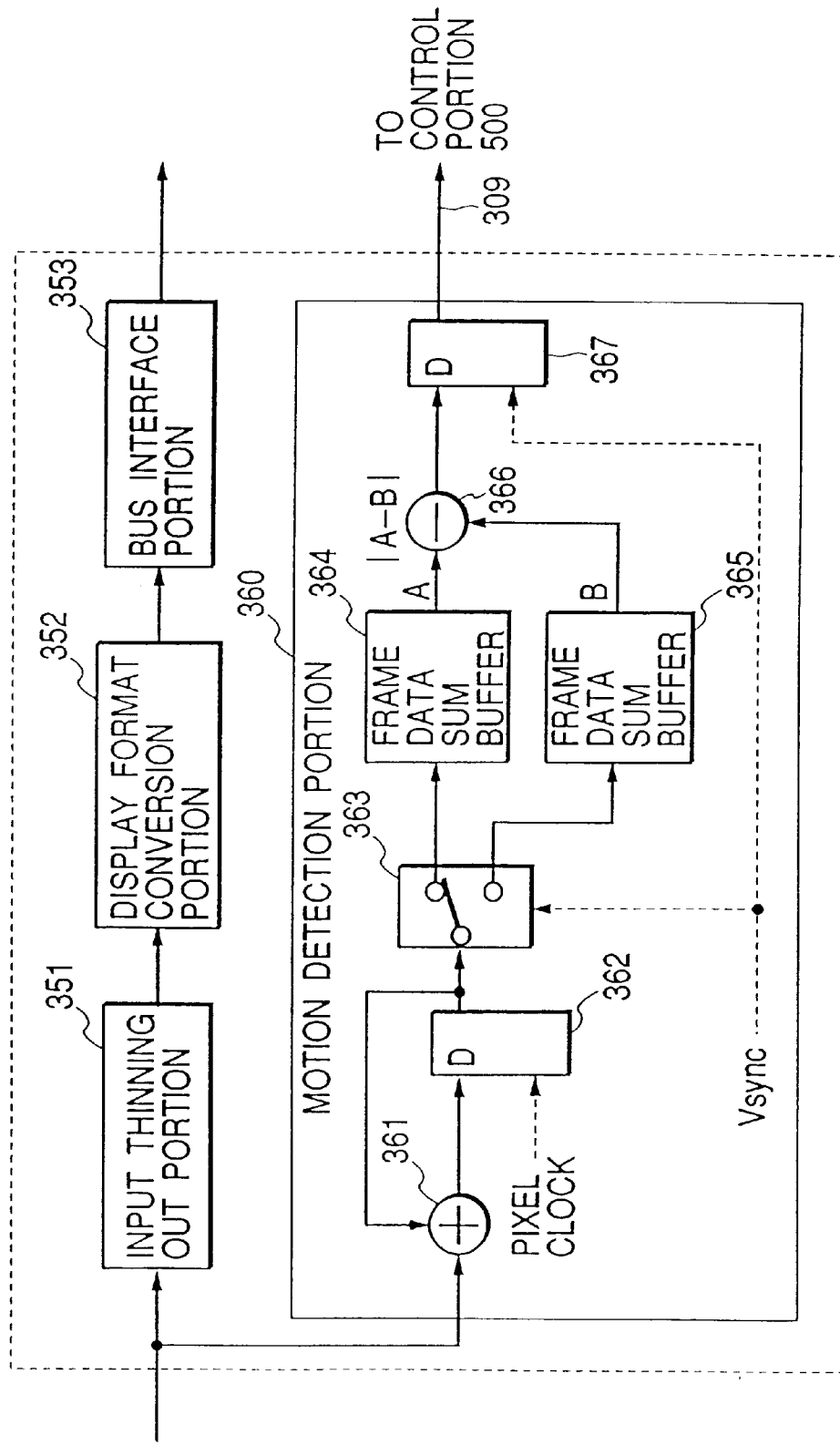
FIG. 16 is a block diagram illustrating the arrangement of a motion detection portion in a multiple images display system according to a third embodiment of the present invention.

The arrangement of the motion detection portion will now be described while referring to FIG. 16. FIG. 16 is a block diagram illustrating the arrangement of the motion detection portion 360 in the multiple images display system according to the third embodiment of the present invention.

As is shown in FIG. 16, a motion detection portion 360 is provided for each of the input portions 301 to 304. A motion detection portion 360 includes an adder 361 and a latch 362, the two of which, upon receiving each pixel clock, interact to constitute a circuit for calculating the total number of pixels in one frame. The total pixel number is transmitted to a selector 363, which is toggled for every frame (Vsync signal) to alternately allot the received value to a frame data sum buffer 364 and to a frame data sum buffer 365. Outputs A and B extracted from the frame data sum buffers 364 and 365 are transmitted to an absolute differential value calculator 366, which calculates frame differential data |A−B|. The frame differential data are transmitted to a latch 367, and are latched for each frame (Vsync signal). Then, the data are transmitted via a signal line 309 to the control portion 500.

Figure 17:
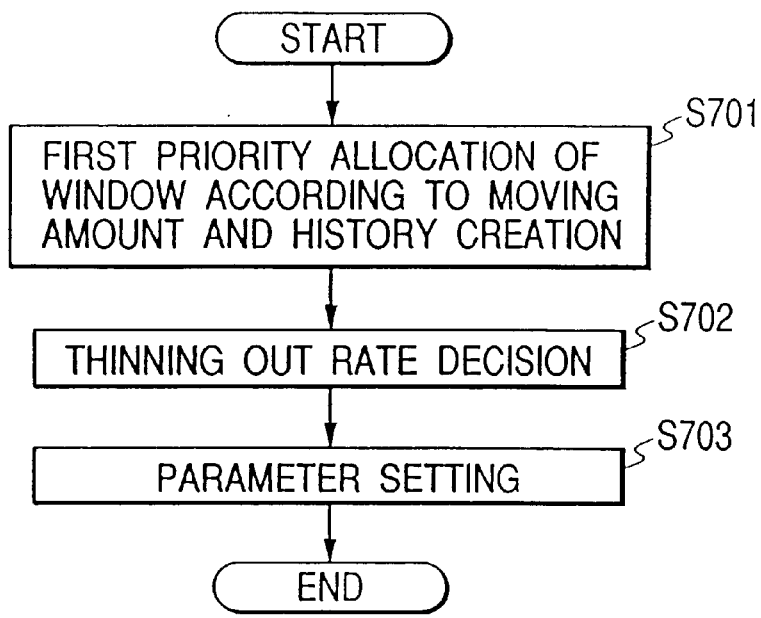
FIG. 17 is a flowchart showing the processing performed when employing the motion detection portion of the multiple images display system according to the third embodiment of the present invention.
Figure 18:
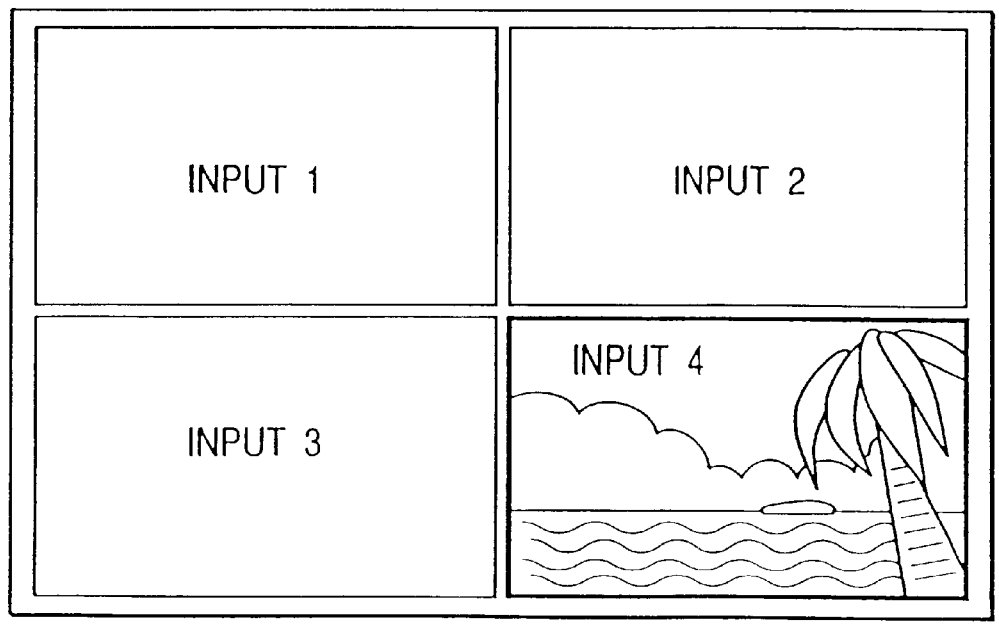
FIG. 18 is a diagram showing an example display when the detection of motion is required.

The processing employing the motion detection portion 360 will now be described while referring to FIGS. 17 to 19. FIG. 17 is a flowchart showing the processing employing the motion detection portion 360 of the multiple images display system according to the third embodiment of the present invention; FIG. 18 is a diagram showing a display example when motion detection is required; and FIG. 19 is a timing chart for the motion detection processing performed by the multiple images display system according to the third embodiment.

Figure 19:
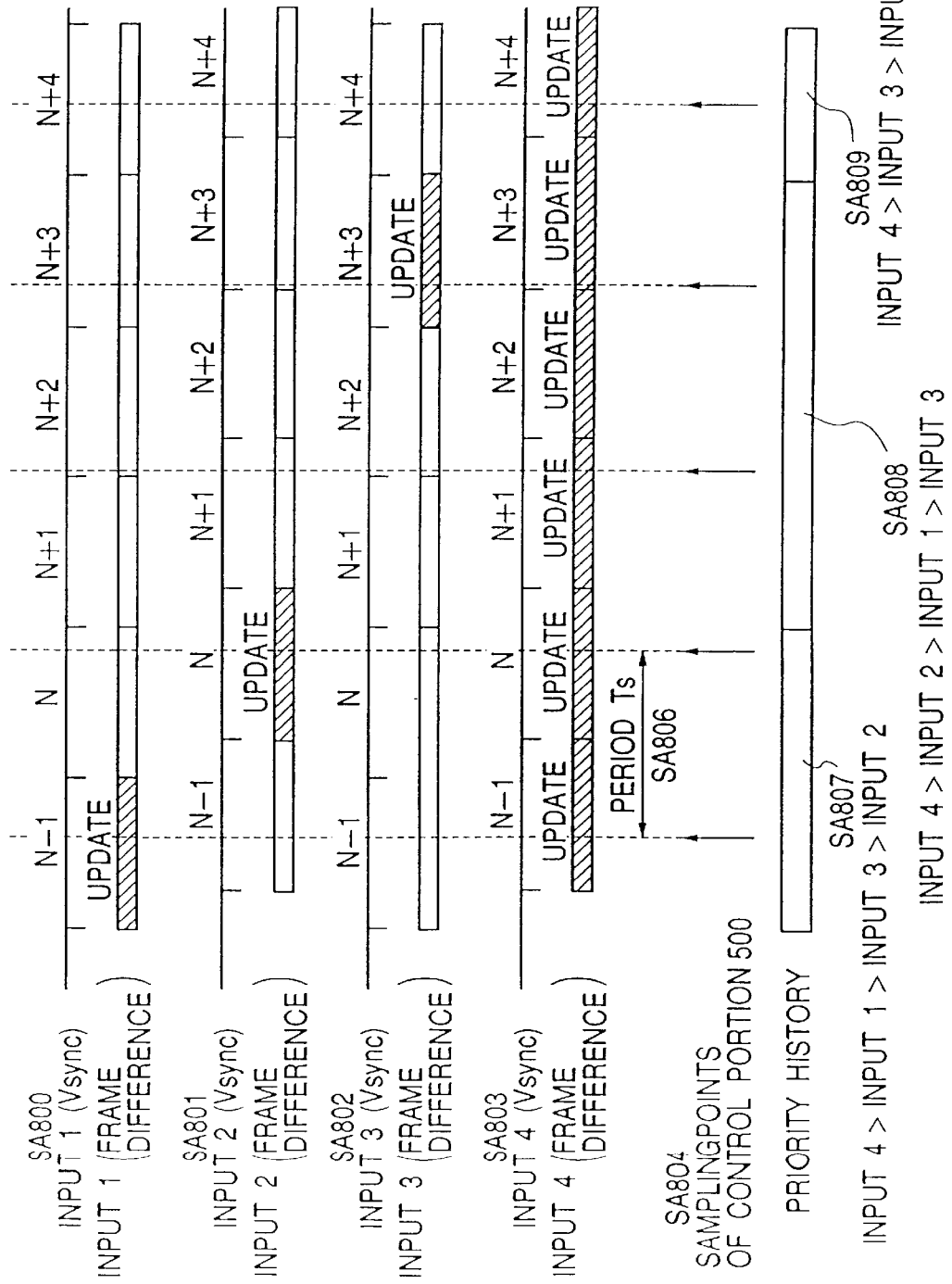
FIG. 19 is a timing chart for the motion detection process for the multiple images display system according to the third embodiment of the present invention.

In this embodiment, as is shown in FIG. 19, inputs 1 to 3 are windows in which images that move less frequently, such as presentation data, are displayed, and input 4 is a window in which images that move frequently, such as video data, are displayed.

In FIG. 19, for input 1, the frame differential data are updated (UPDATE) in accordance with the N−1 timing for a Vsync signal, and the same frame is displayed at the following timing (SA800). For input 2, frame differential data are updated (UPDATE) at the N timing of the Vsync signal, and the same frame is displayed at the succeeding timing (SA801). For input 3, the frame differential data are updated (UPDATE) in accordance with the N+3 timing for the Vsync signal, and the same frame is displayed at the succeeding timing (SA802). For input 4, the frame differential data for the Vsync signal (SA803) are continuously updated (UPDATE), regardless of the occurrence of movement, during a period extending from N−1 to N+4. Since the frame periods (Vsync signals) for the inputs 1 to 4 are completely asynchronous, differential data are completely asynchronously transmitted by the input portions 301 to 304 to the control portion 500 via the signal line 309.

Upon receiving the frame differential data for inputs 1 to 4, the control portion 500 compares them at the sampling points for period TS (SA804 and SA806).

When the results of comparison of the frame differential data are obtained, the control portion 500 begins the process in FIG. 17. At step S701, the priority history record is updated in consonance with the descending order of the differential values. At step S702, the scalability management is conducted, and at step S703 parameters are set. Since the process is the same as that described in the preceding embodiments, no detailed explanation will be given for it.

The timing for the updating of the display using the new parameters is synchronized with the Vsync signal for input 1. As a result, the priority history (SA805) is automatically updated as in two-frame period (SA807) . . . input 4>input 1>input 3>input 2 three-frame period (SA808) . . . input 4>input 2>input 1>input 3 one-frame period (SA809) . . . input 4>input 3>input 2>input 1.

That is, management of the scalability is conducted so that the highest priority is allocated for input 4 because an image in that window moves frequently, and so that the priorities for inputs 1 to 3 are increased when in those windows images that move less frequently are changed.

In this embodiment, a motion detection portion that easily detects motion is provided, and the display priorities are allocated in accordance with the detection of movement and are reflected in the conduct of the scalability management. Then, when windows are not overlapped, the system can automatically conduct scalability management, and can foster the dramatic improvement of the user interface. This effect is unique to the third embodiment.

(Fourth Embodiment)

A fourth embodiment of the present invention will now be described.

Figure 20:
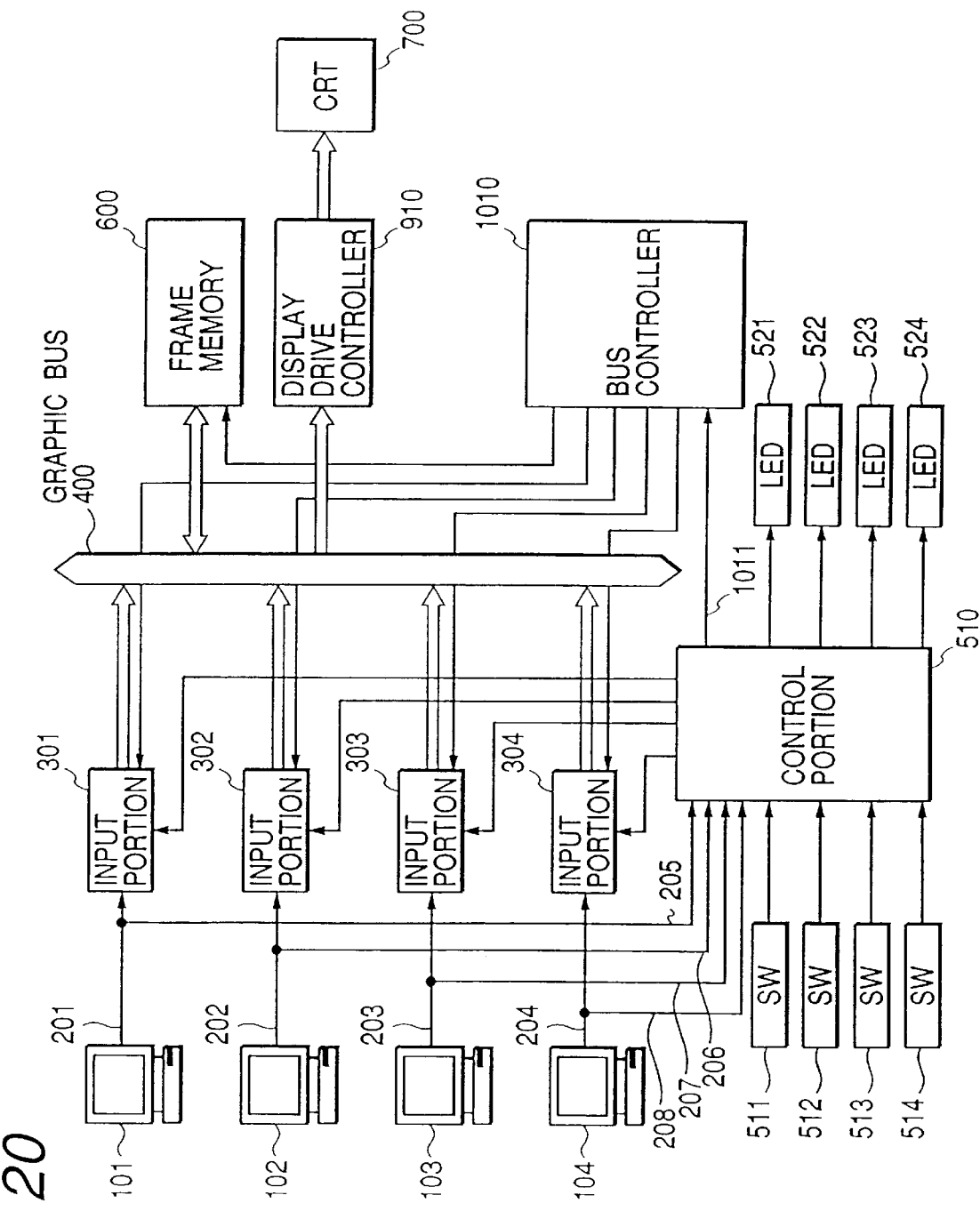
FIG. 20 is a block diagram illustrating the essential part of a display system according to a fourth embodiment of the present invention.
Figure 21:
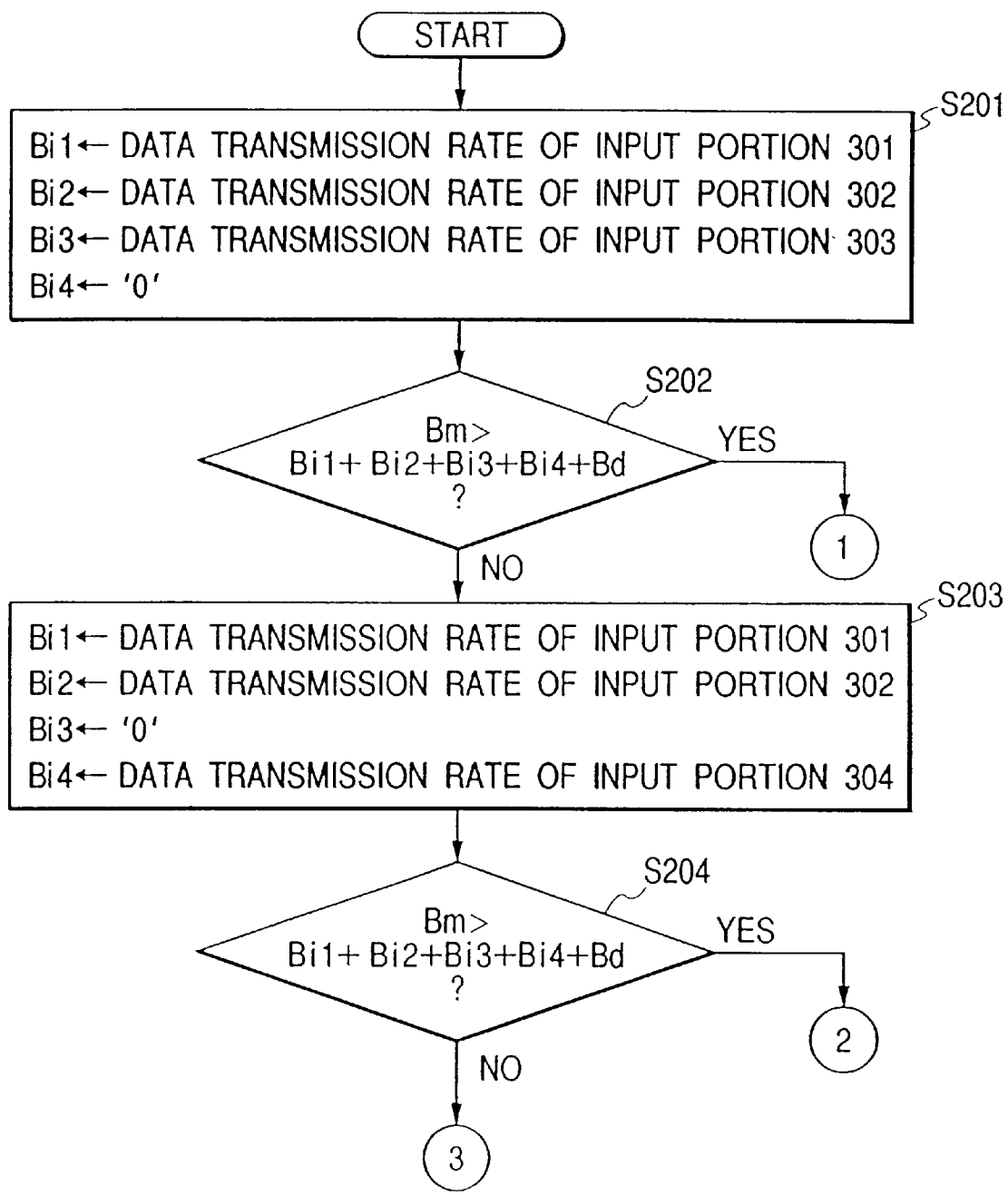
FIGS. 21, 22, 23, 24, 25, 26, 27, 28, 29, 30, 31, 32, 33, 34, 35, 36 and 37 are flowcharts showing the processing performed by the display system according to the fourth embodiment of the present invention.
Figure 22:
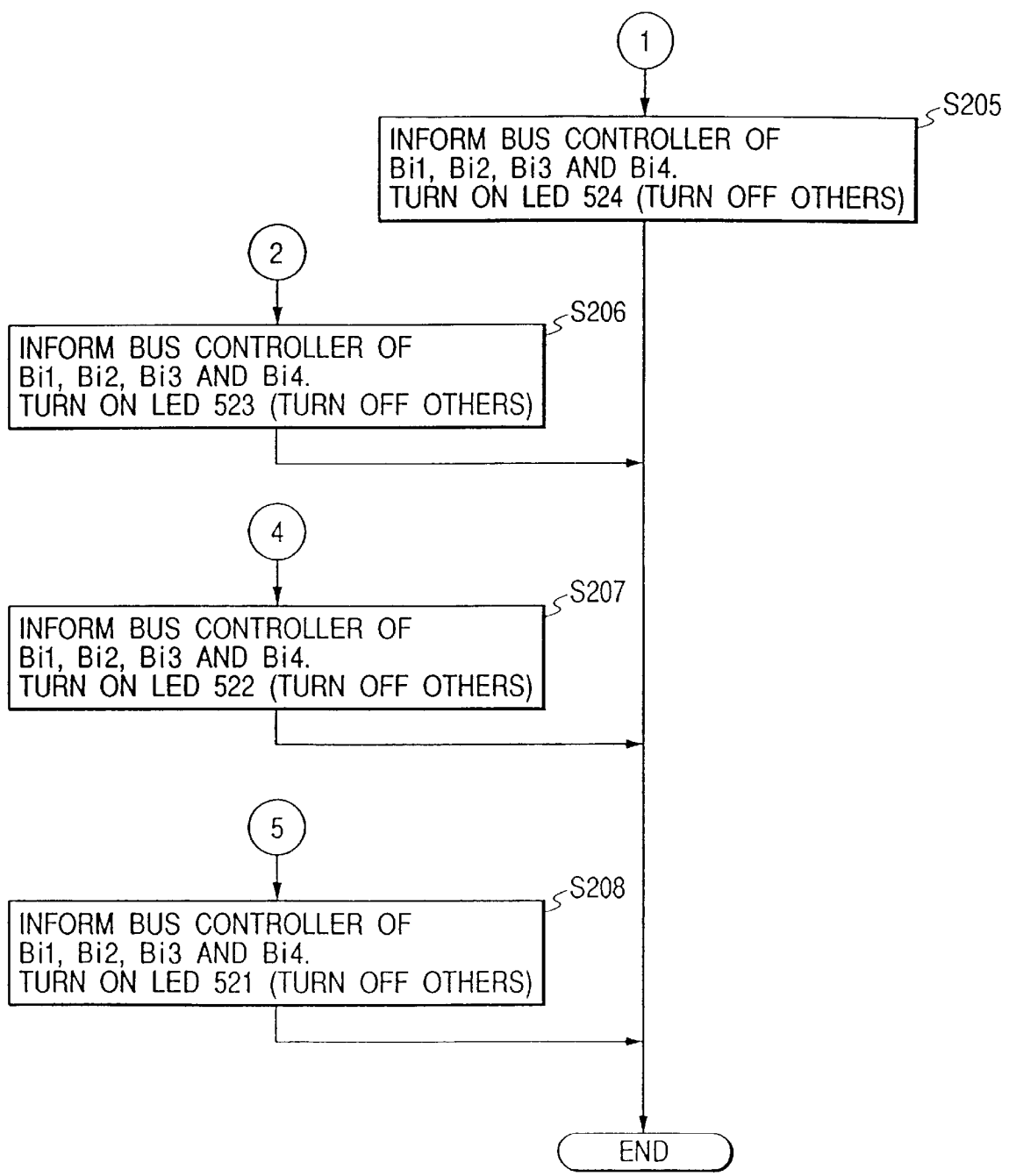
Figure 23:
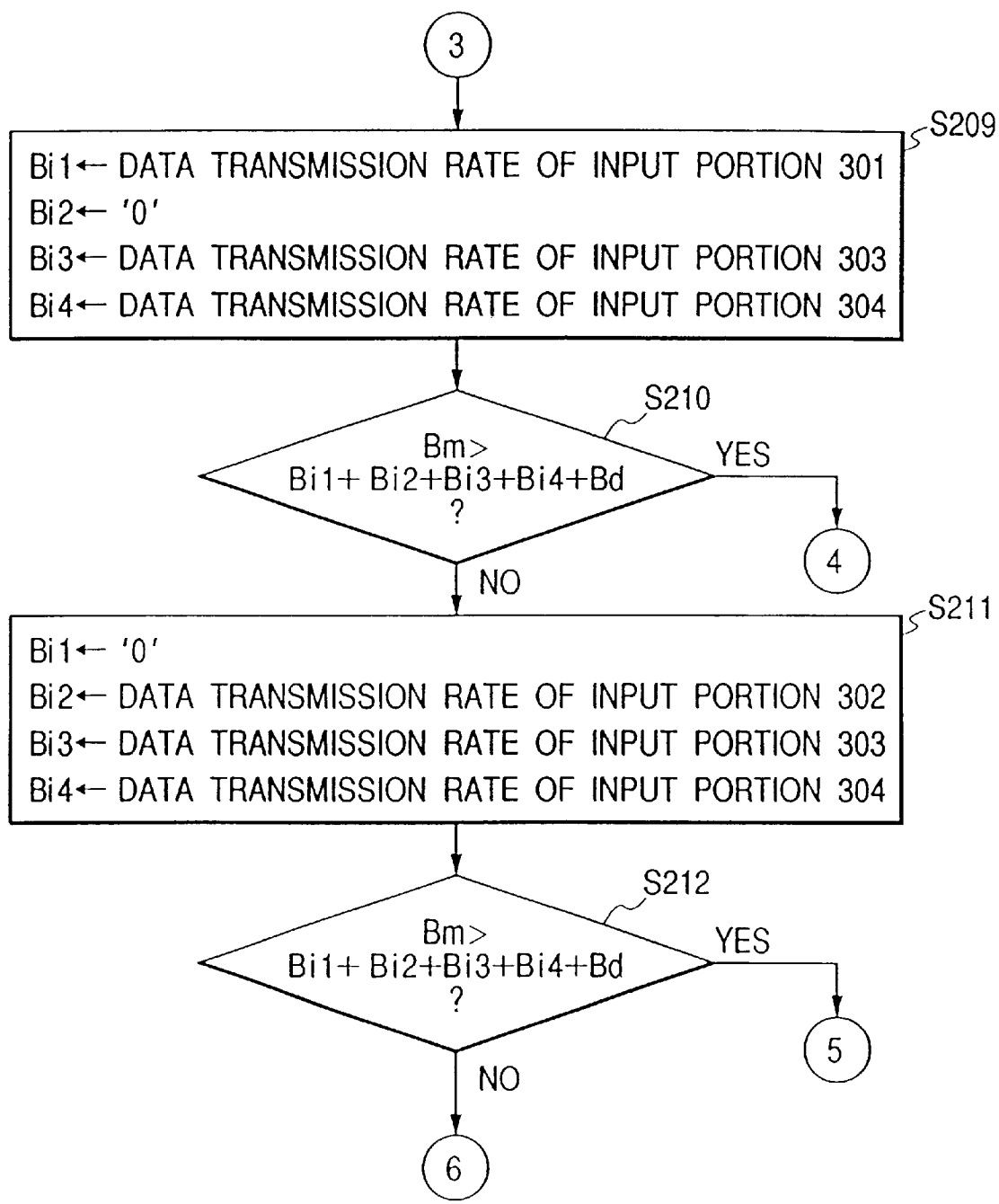
Figure 24:
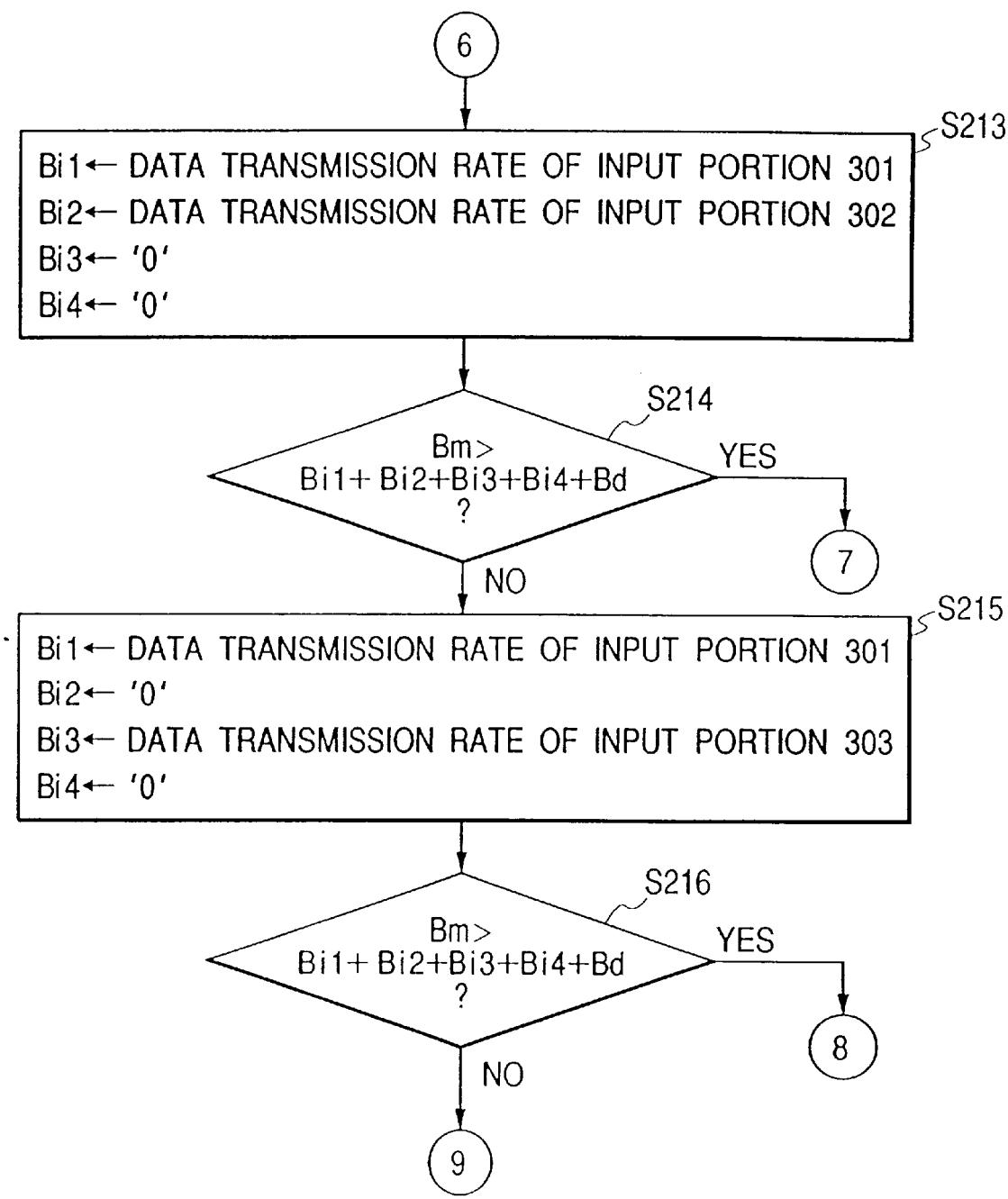
Figure 25:
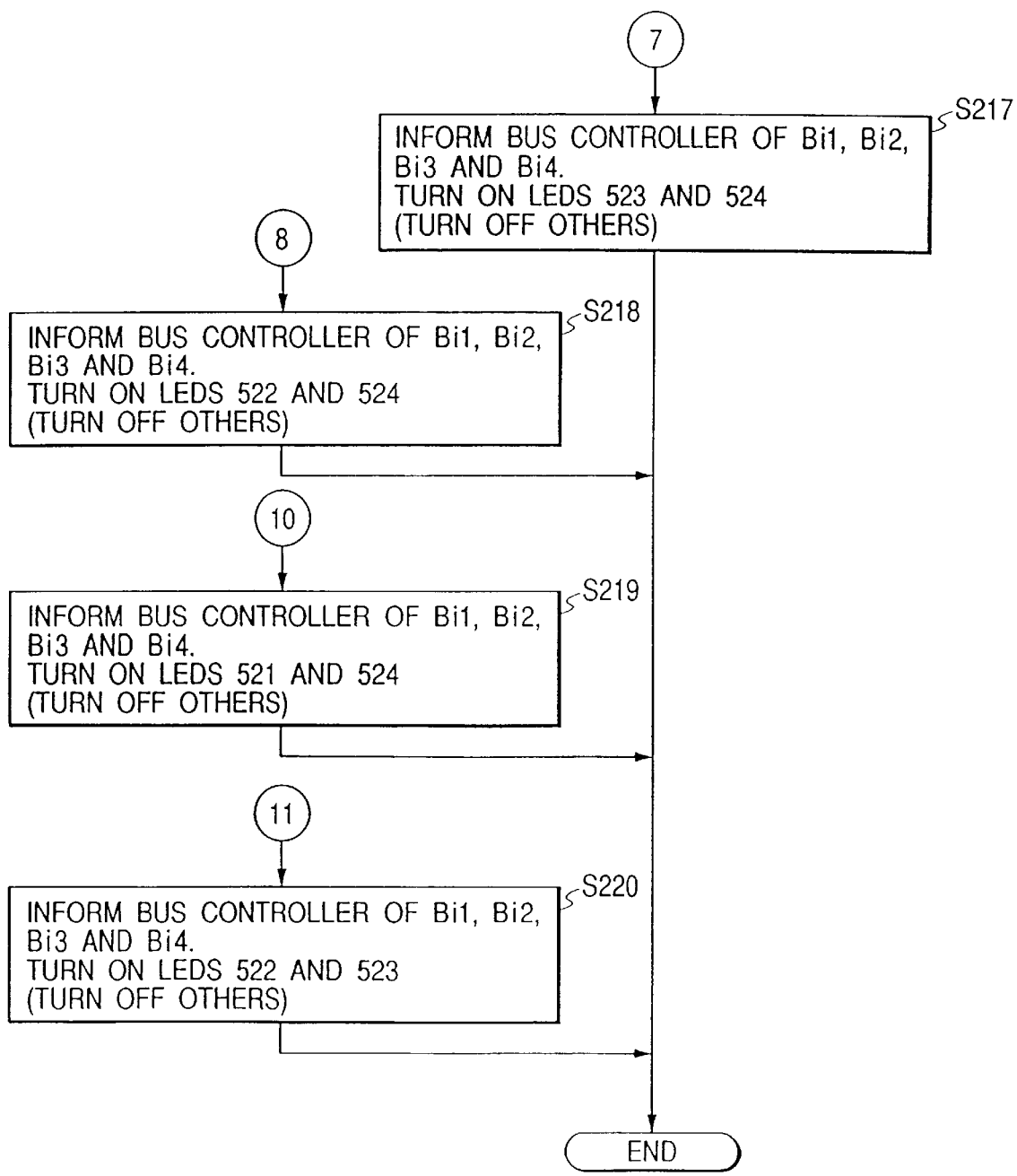
Figure 26:
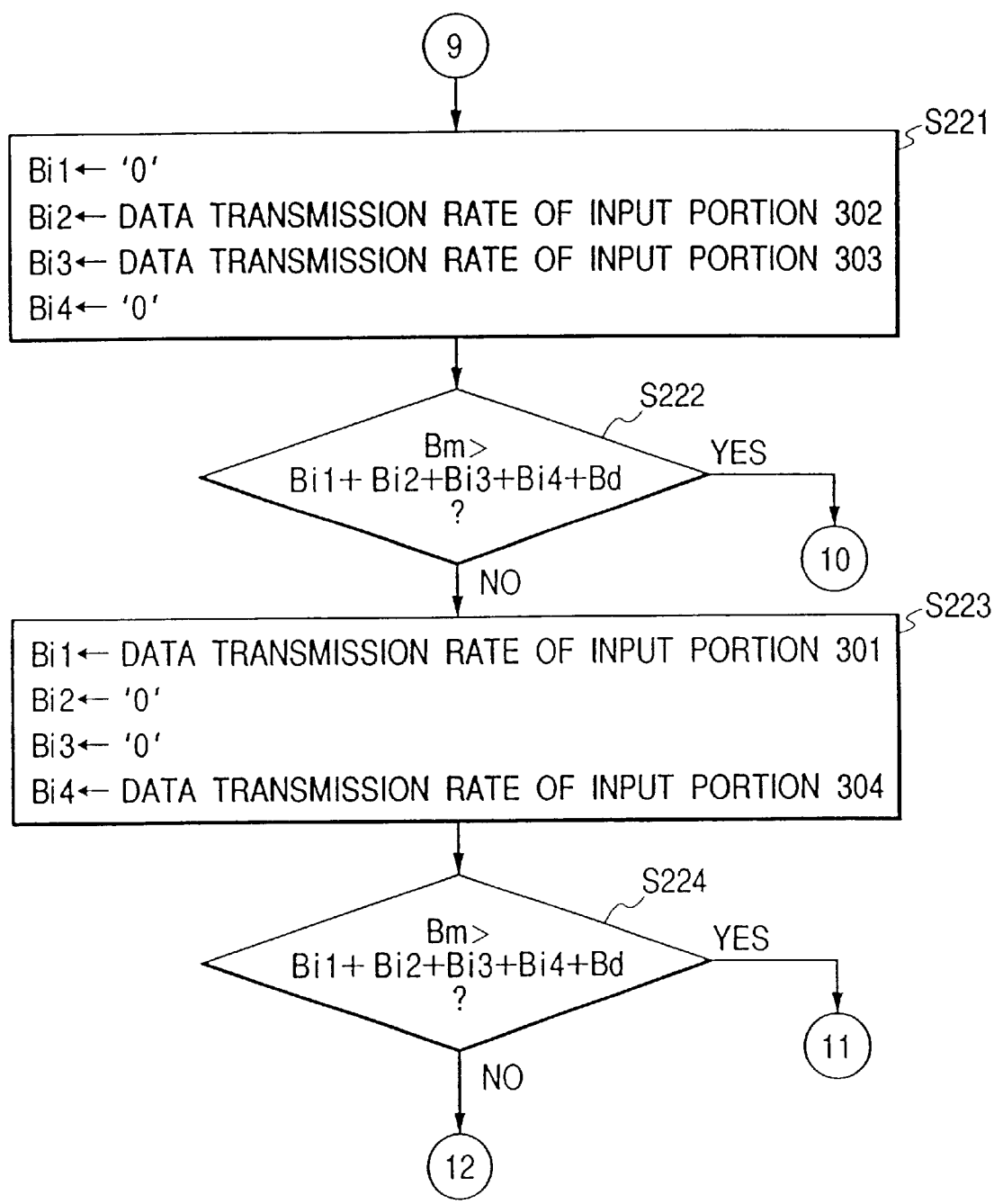
Figure 27:
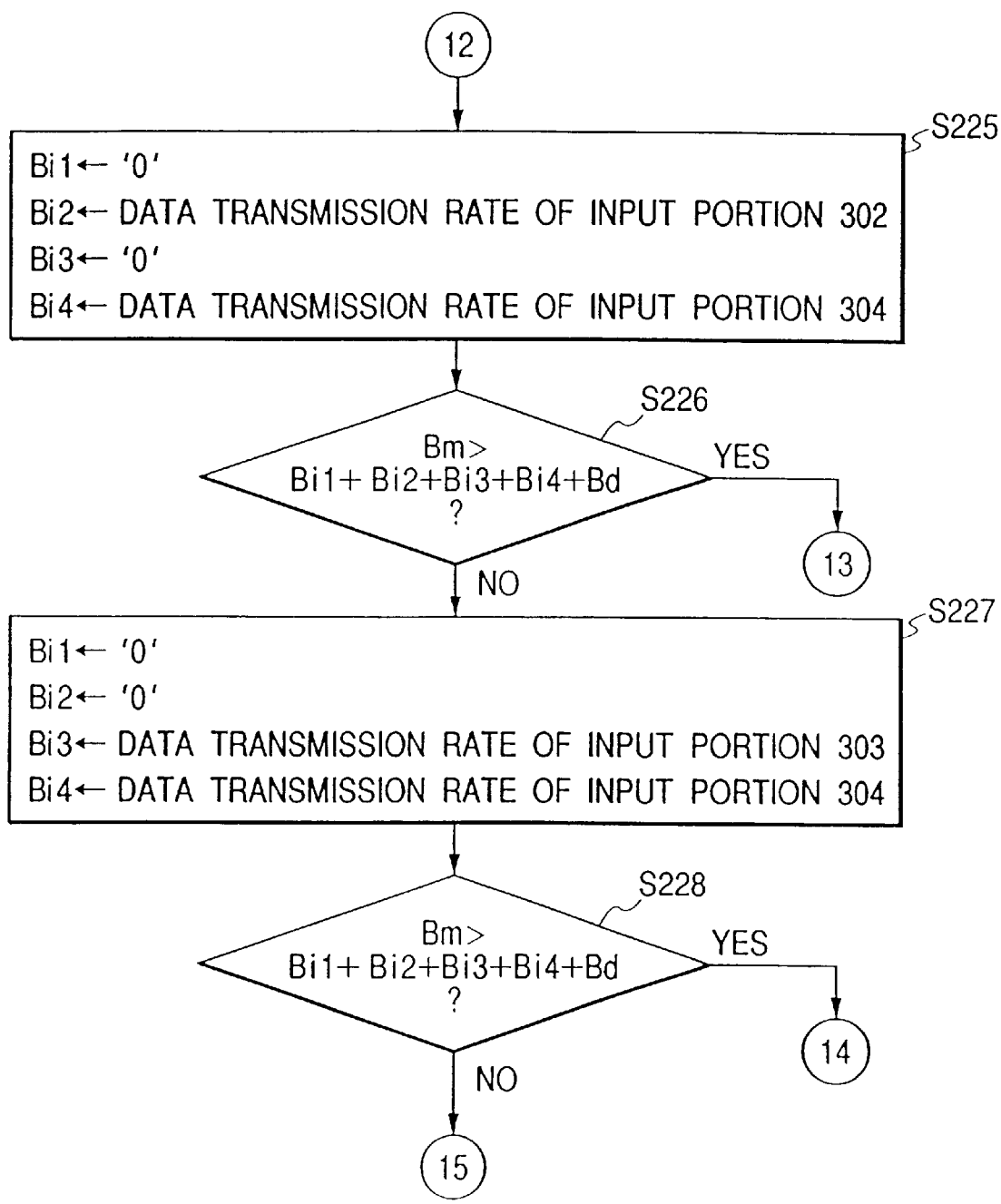
Figure 28:
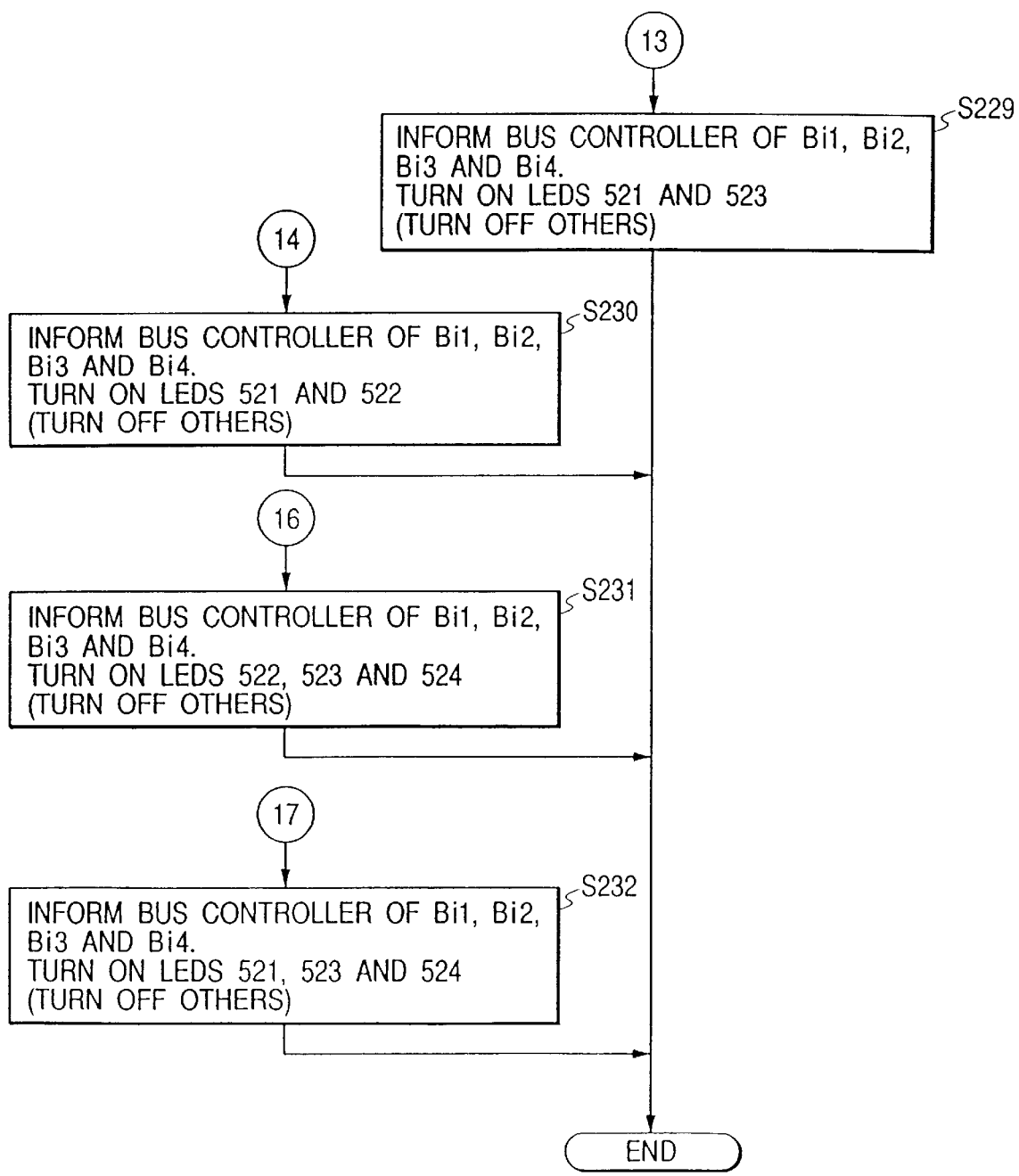
Figure 29:
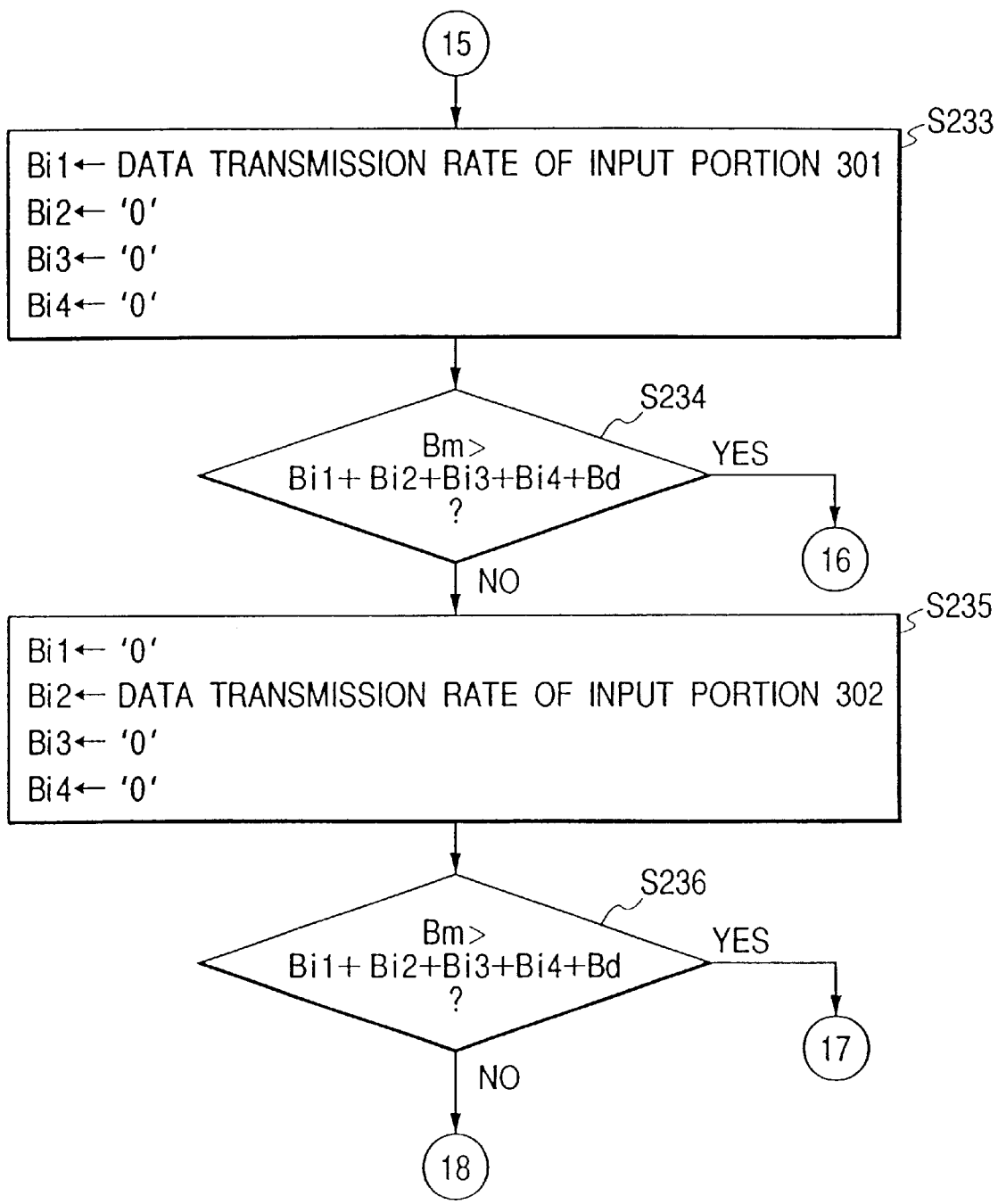
Figure 30:
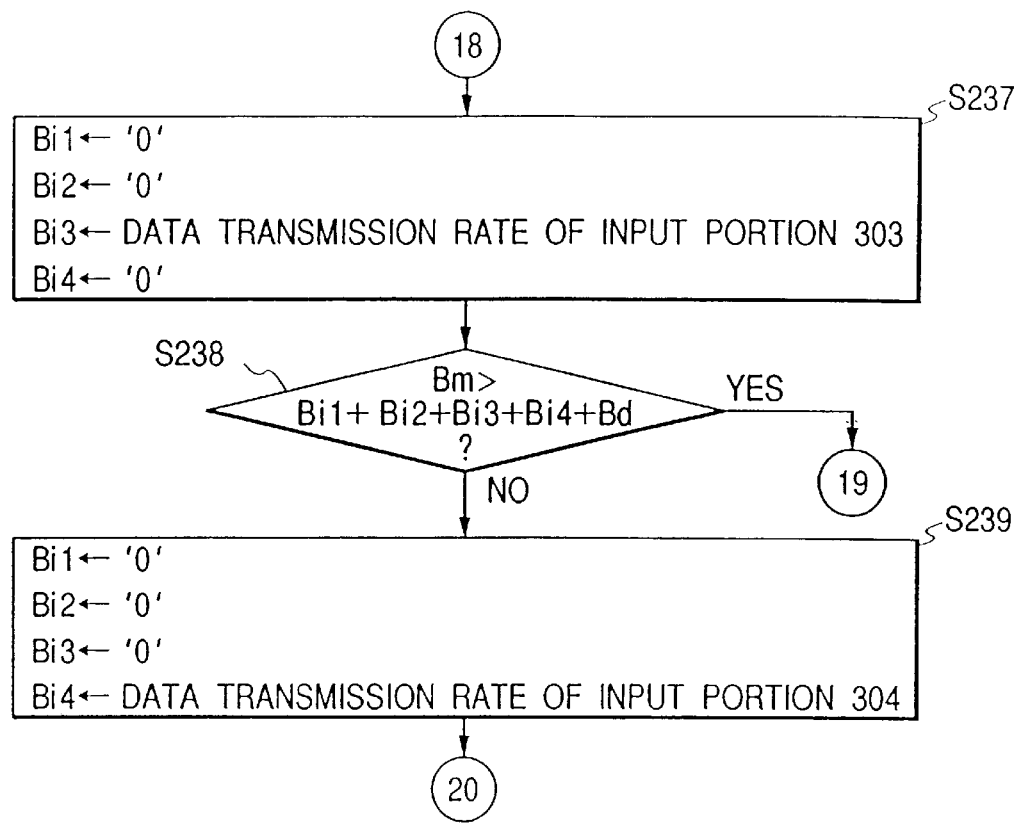
Figure 31:
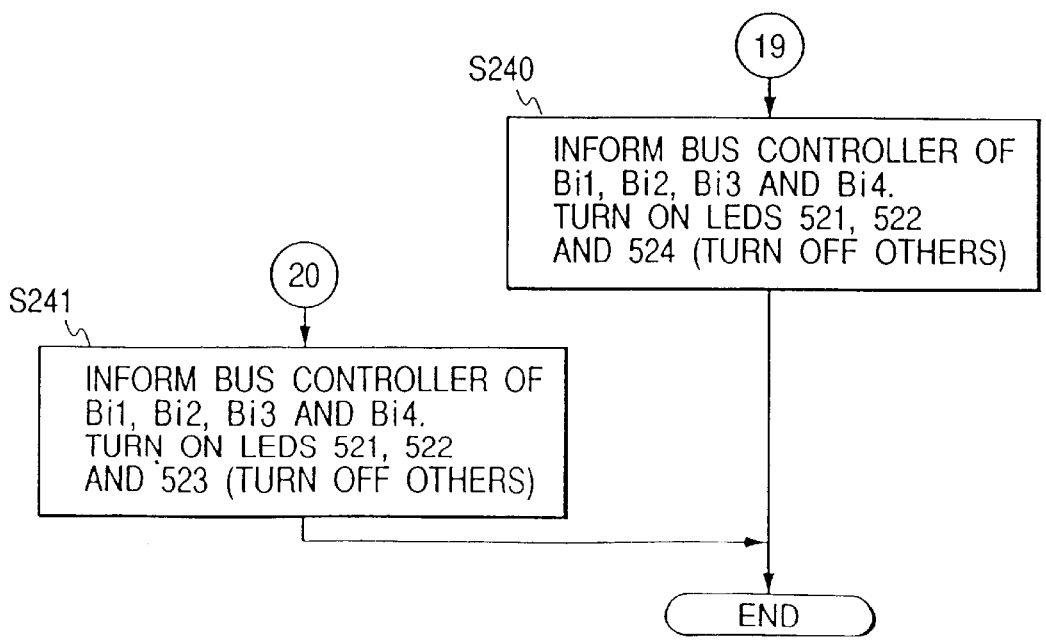
Figure 32:
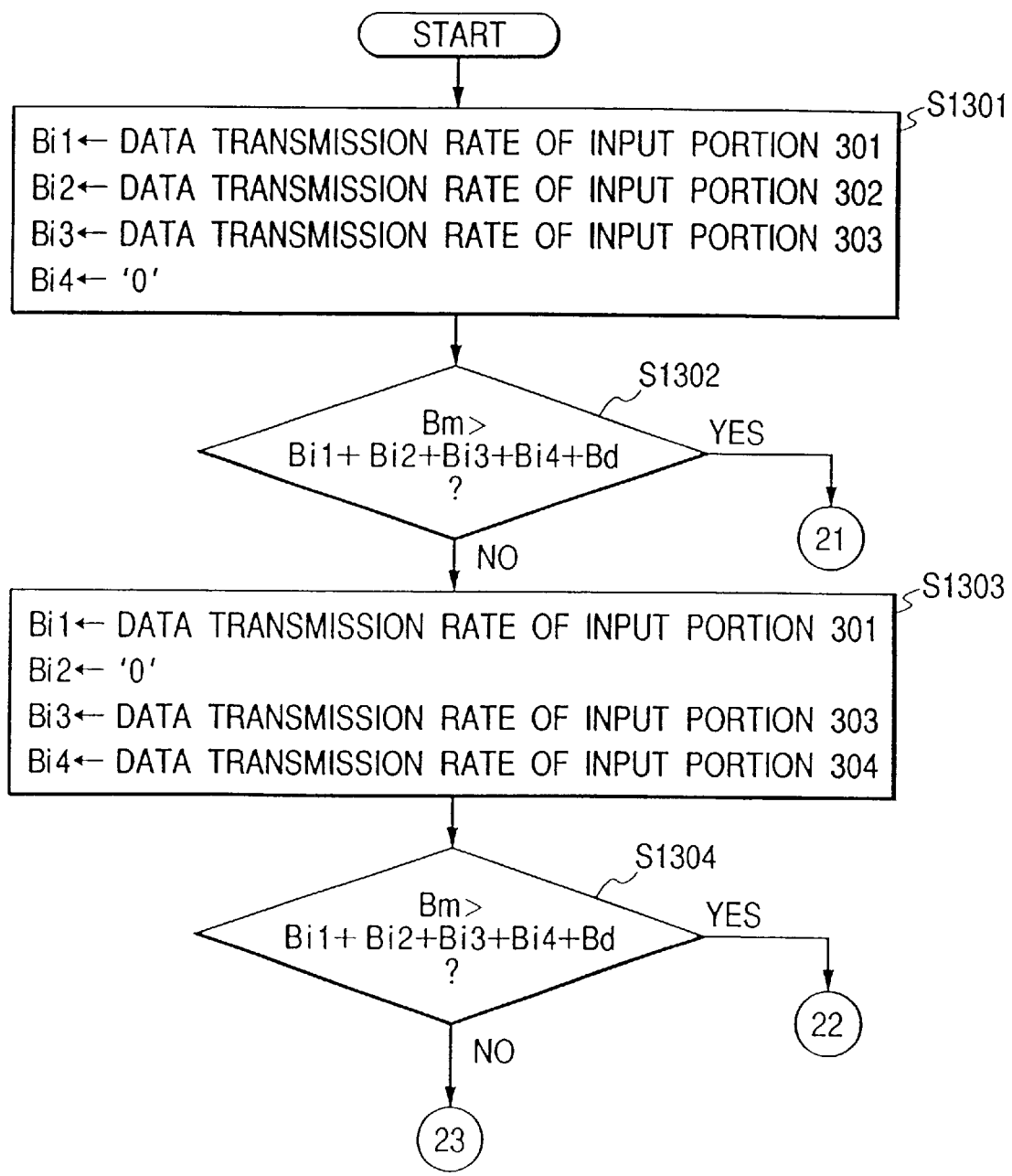
Figure 33:
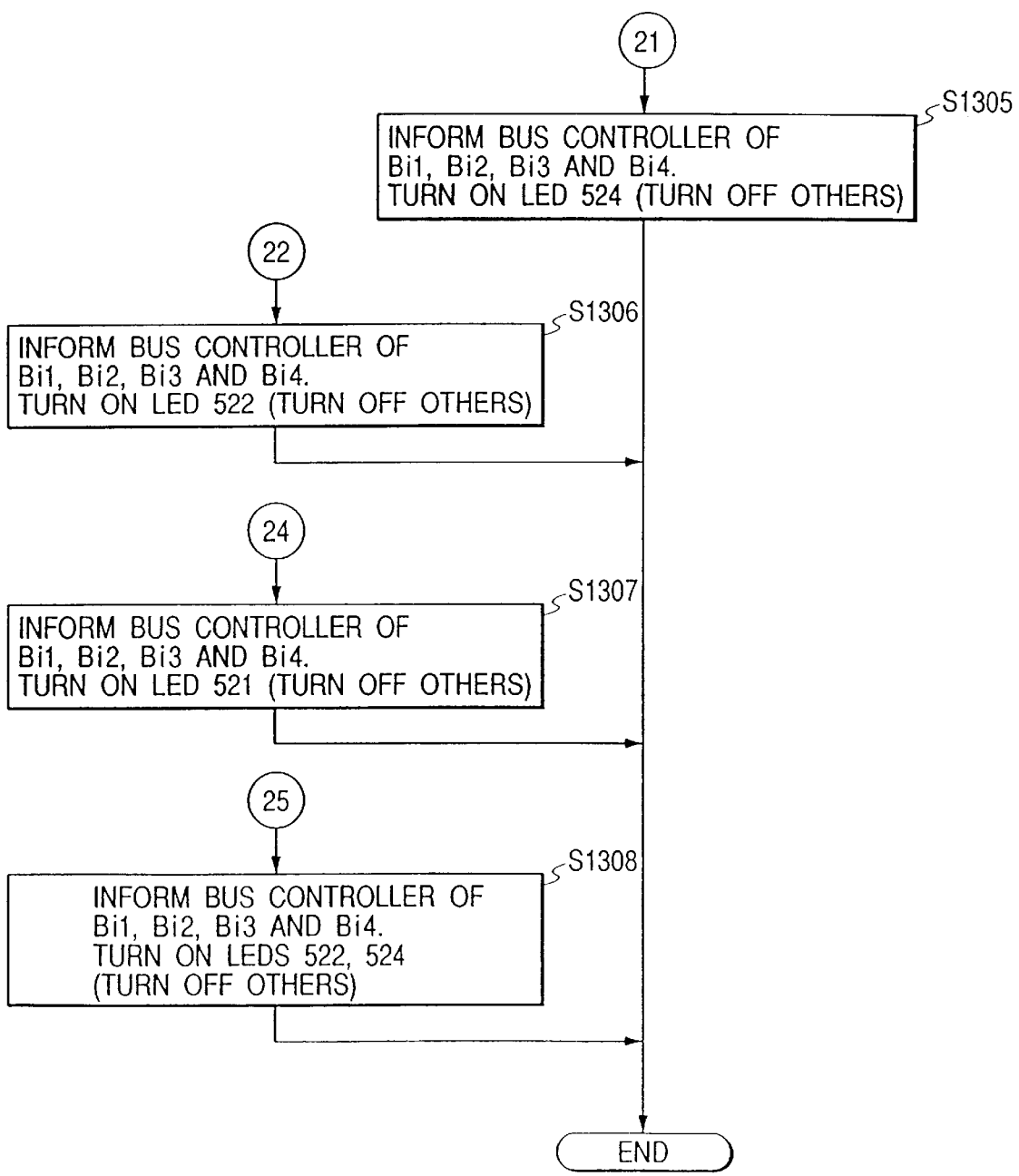
Figure 34:
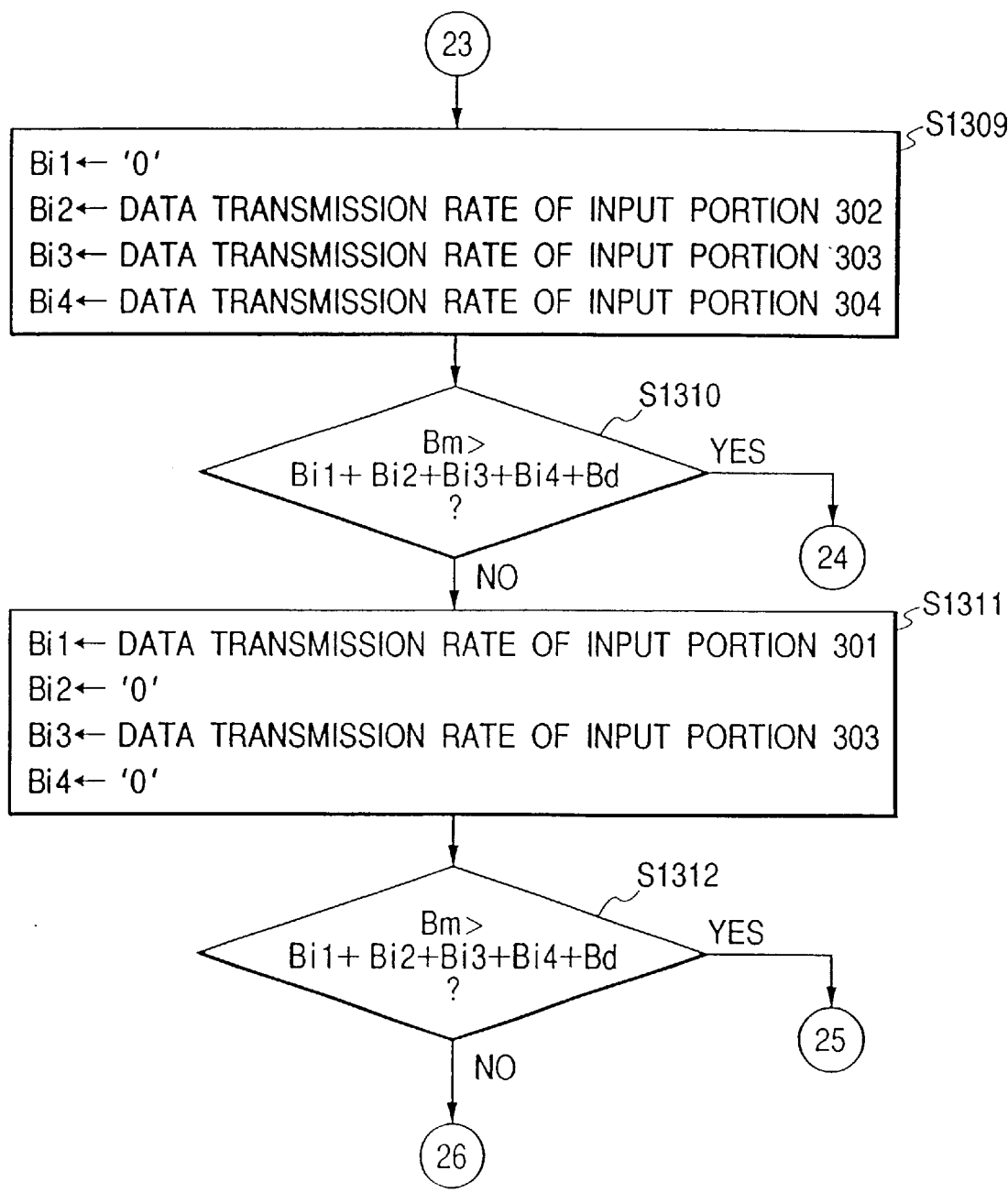
Figure 35:
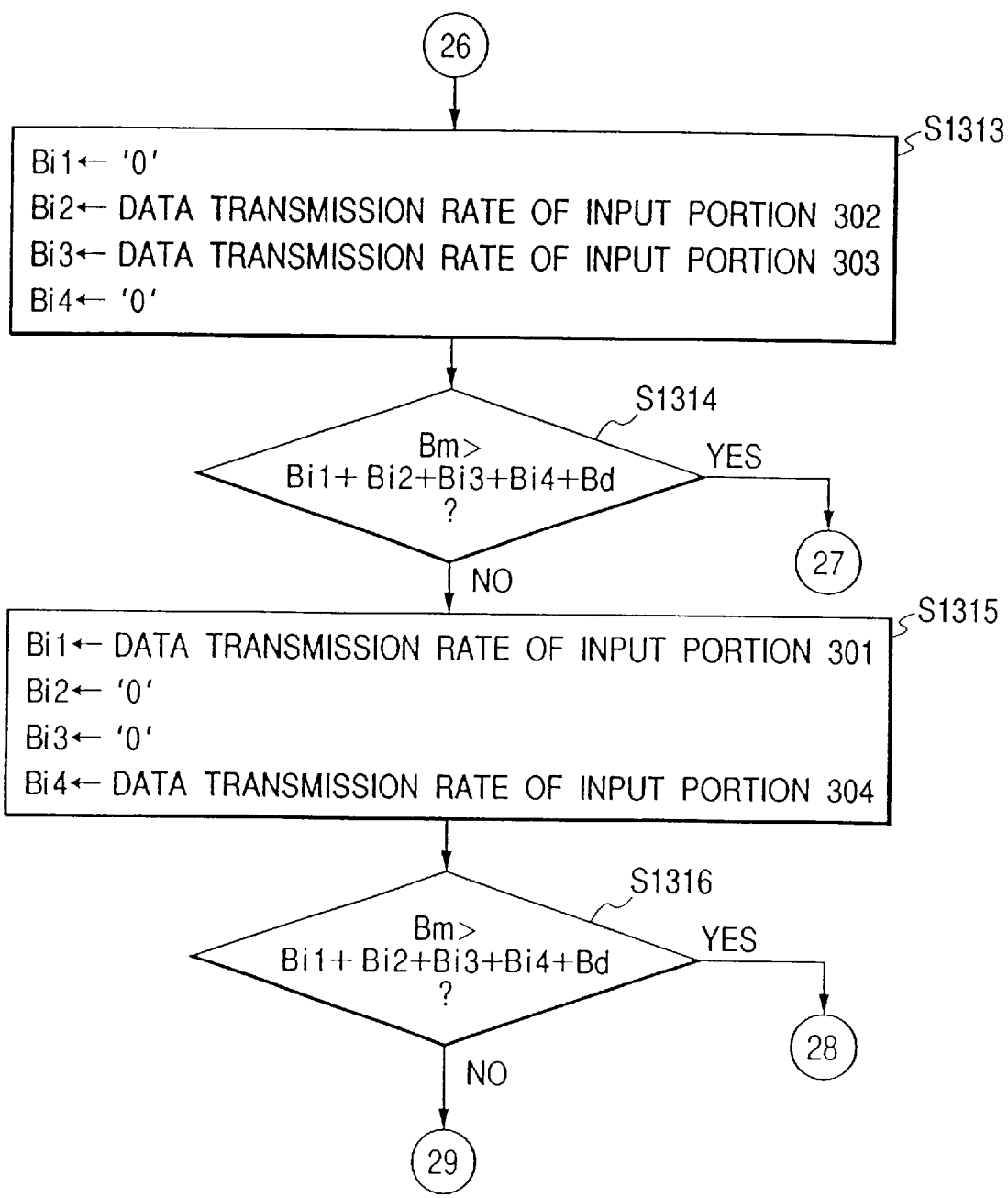
Figure 36:
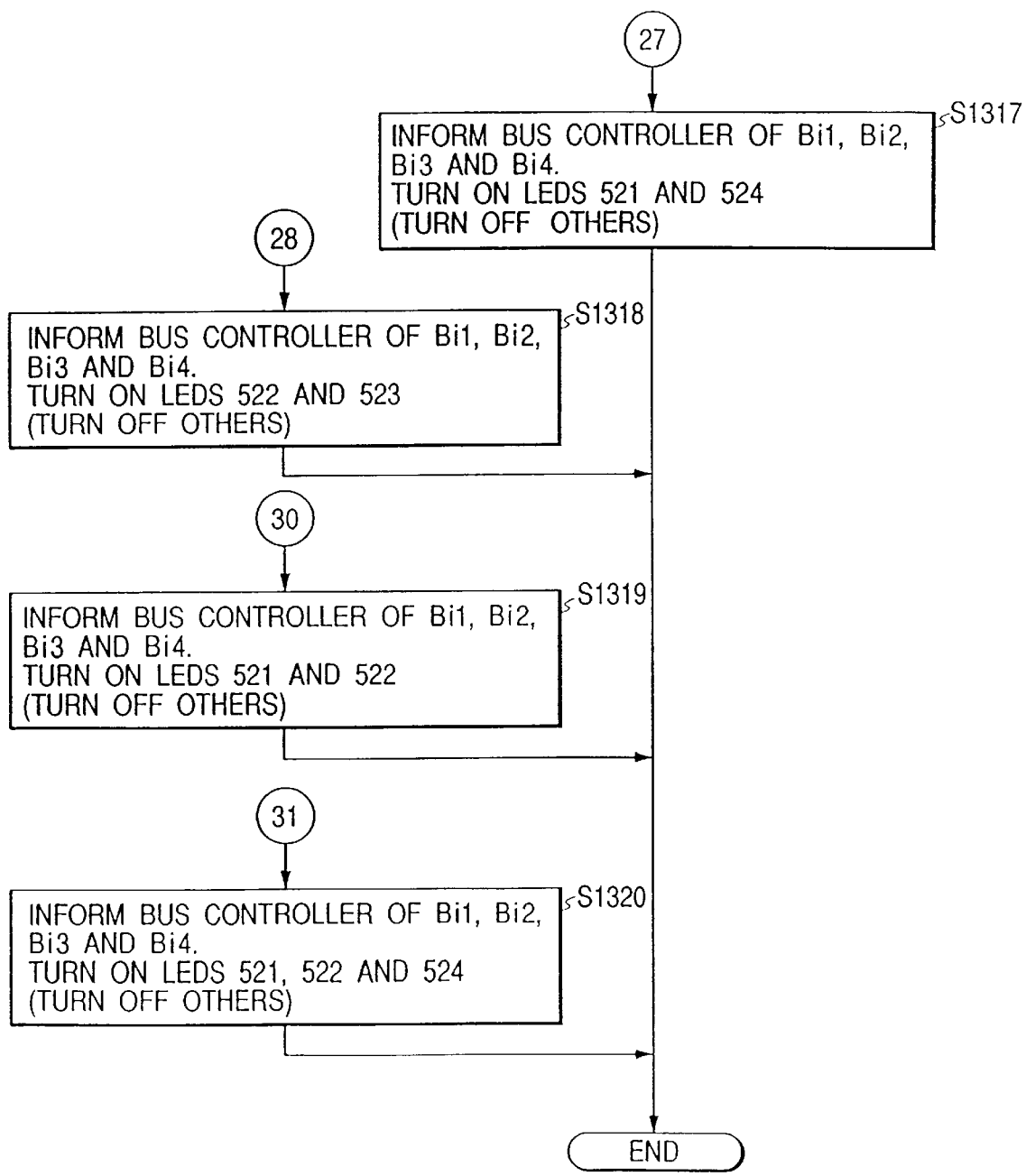
Figure 37:
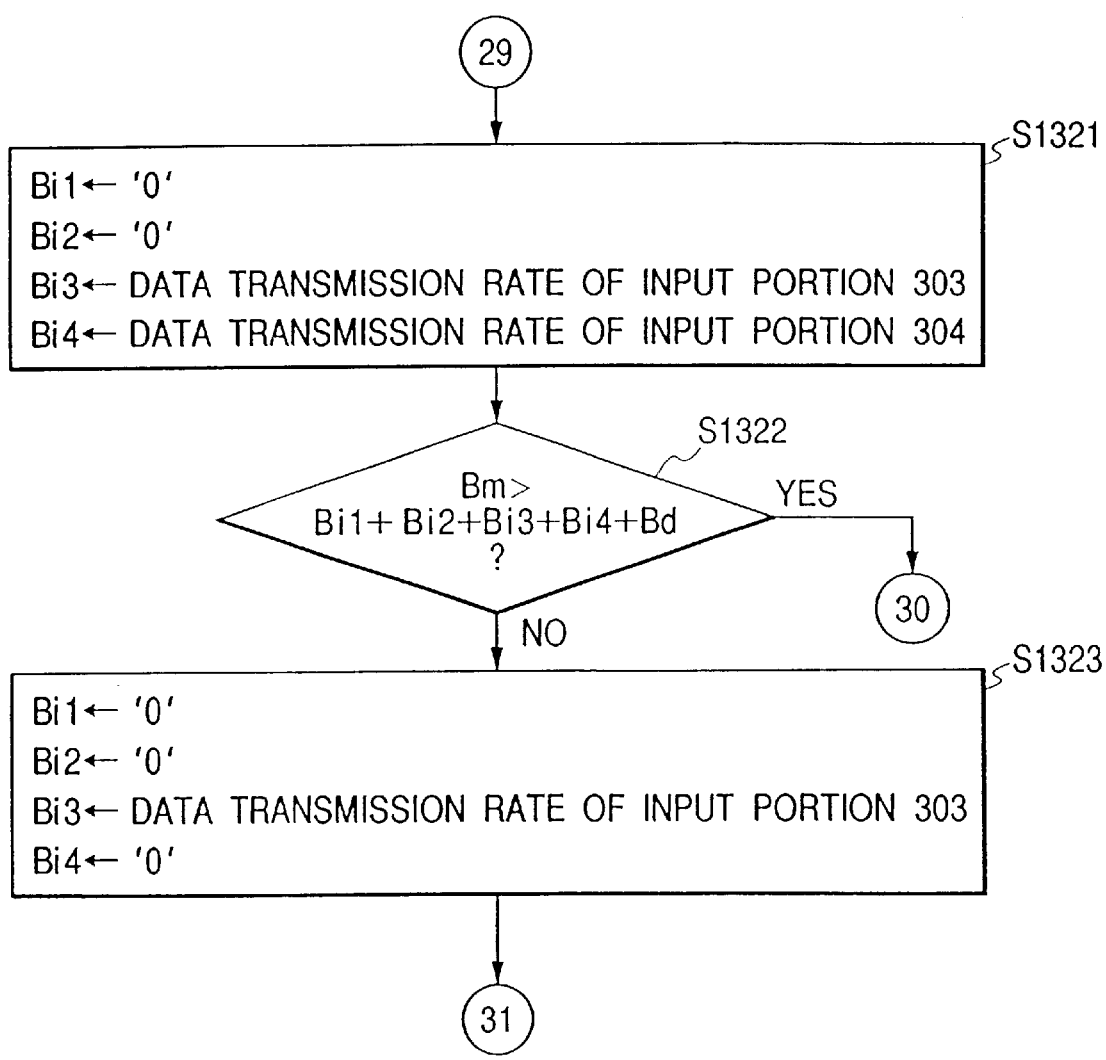

FIG. 20 is a block diagram illustrating the arrangement of the essential portion of a multiple images display system according to a fourth embodiment of the present invention. The same reference numerals as are used in FIG. 1 are also employed to denote corresponding or identical components, and no explanation for them will be given.

A control portion 510, which controls the entire system and which, in accordance with a control program, executes the processing shown in flowcharts FIGS. 21 to 37, comprises a CPU having a computation capability; a RAM used to temporarily store data; a ROM used to store the control program; a timer for measuring time; and a peripheral input/output interface. The control portion 510 may be constituted merely by a logical unit. Further, a program for governing the operation of the CPU of the control portion 510 may be stored in the ROM, or may be loaded from an external source via the peripheral input/output interface.

The control portion 510 employs an internal timer to measure the periods of received Vsync signals and Hsync signals. The control portion 510 employs the obtained periods to detect the frequency for one pixel for each signal transmitted along signal lines 201 to 204, the screen size, the front porch time, the back porch time, and the V blank time.

The control portion 510 sets the PLL for the input portions 301 to 304 in accordance with the frequency detected for one pixel, rearranges output data bits in accordance with the screen size, and assigns addresses.

In addition, the control portion 510 employs the frequency detected for one pixel to detect the transmission rates for the signals received by the input portions 301 to 304. In this embodiment, the data bits output for one pixel by the input portions 301 to 304 are a constant 16 bits. The 16 bits defined as the frequency for one pixel are employed to detect the transmission rates for the signals output by the input portions 301 to 304. It should be noted that the transmission rates for data output by the input portions 301 to 304 are employed as substitutes for the transmission rates for signals received at the input portions 301 to 304. The control portion 510 adds together all the transmission rates (substitutes for input data transmission rates) for data output by the input portions 301 to 304 to obtain the sum of the input data transmission rates.

Furthermore, the control portion 510 is connected to buttons SW511 to SW514, and can identify which button SW511 to SW514 has been depressed. The buttons SW511 to SW512 correspond respectively to the input portions 301, 302, 303 and 304. The control portion 510 is also connected to LEDs 521 to 524, and can arbitrarily turn them on or off. The LEDs 521 to 524 correspond respectively to the input portions 301, 302, 303 and 304.

A bus controller 1010 receives input data transmission rates for the input portions 301 to 304 from the control portion 510 via a signal line 1011. The bus controller 1010 arbitrates the transmission of data via a graphic bus 400 by employing the necessary data transfer time, which is consonant with the input data transmission rate for each of the input portions 301 to 304, and the necessary time for reading display data from a frame memory 600, so as to permit the transmission of data by the input portions 301 to 304 to the frame memory 600, and the transmission of data by the frame memory 600 to a display drive controller 910, without any data being lost.

When, for example, an input data transmission rate of "0" for input portion 302 is output by the control portion 510, the bus controller 1010 arbitrates the transmission of data via the graphic bus 400 by employing the necessary data transfer time, which is consonant with the input data transmission rate for each of the input portions 301, 303 and 304, and the necessary time for reading display data from a frame memory 600. The bus controller 1010 permits the transmission of data by the input portions 301, 303 and 304 to the frame memory 600, and the transmission of data by the frame memory 600 to the display drive controller 910, without any data being lost, and does not permit the transmission of data by the input portion 302 to the frame memory 600.

If an input data transmission rate of "0" is output, it is assumed that host computers 101 to 104 are not yet connected to the input portions 301 to 304, or have been disconnected therefrom. The control portion 510 can identify such an abnormality when the Vsync signal and the Hsync signal can not be detected along the signal lines 205 to 208, or when the periods for the signals are considerably increased. The operation that is the feature of this embodiment, which will be described later, corresponds to this example. The display drive controller 910 performs the D/A conversion of display data received from the graphic bus 400, and drives a CRT 700 for the display.

The operation according to the fourth embodiment of the thus arranged multiple images display system will now be described in detail while referring to the flowcharts in FIGS. 21 to 37.

In the multiple images display system, the obtained input data transmission rates for the input portions 301 to 304 are defined as $Bi1$, $Bi2$, $Bi3$ and $Bi4$, and the sum of the rates is defined as $Bi$:

$$Bi = Bi1 + Bi2 + Bi3 + Bi4.$$

The data transmission rate for the display data read from the frame memory 600 is defined as $Bd$, and the data transmission rate for the frame memory 600 is defined as $Bm$.

The condition wherein, without any data being lost, the bus controller 1010 permits the transmission of data by the input portions 301 to 304 to the frame memory 600, and by the frame memory 600 to the display drive controller 910, occurs when the following expression is established $$Bm > Bi + Bd.$$

The operation for this case has been described above.

An explanation will now be given for the operation performed when $Bm < Bi + Bd$, which is the feature of this embodiment, is established. $Bd$ and $Bm$ are values that are determined when the system is designed, and are stored in a program in the control portion 510. The control portion 510 can detect $Bm < Bi + Bd$. Upon making this detection, the control portion 510 sets the input data transmission rate for the input portion 304, i.e., $Bi4$, to "0" (step S201), and re-detects the sum of the input data transmission rates. As a result, when $Bm > Bi + Bd$ is established, i.e., when $Bm > Bi1 + Bi2 + Bi3 + \text{"0"} + Bd$ is established (YES at step S202), the bus controller 1010 is notified along the signal line 1011 of the input data transmission rates, while the input transmission rate for the input portion 304 is "0".

Therefore, without any data being lost, the bus controller 1010 transmits data from the input portions 301, 302 and 303 to the frame memory 600 and from the frame memory 600 to the display drive controller 910, and does not transmit data from the input portion 304 to the frame memory 600. As a result, the display system in this embodiment can continue the display operation without losing any data and without hanging. Further, the control portion 510 turns on only the LED 524 (step S205). And thus, when a user sees that the LED 524 is on, the user can confirm that an image from the host computer that is connected to the input portion 304 is not displayed.

When the sum of the input data transmission rates that is detected, while the input transmission data rate for the input portion 304 is set to "0", is also $Bi < Bi + Bd$, i.e., $Bm < Bi1 + Bi2 + Bi3 + \text{"0"} + Bd$ (NO at step S202), the control portion 510 sets the input data transmission rate for the input portion 303, i.e., $Bi3$, to "0" (step S203), and re-calculates the sum of the input data transmission rates. When, as a result, $Bm > Bi + Bd$, i.e., $Bm > Bi1 + Bi2 + \text{"0"} + Bi4 + Bd$ (YES at step S204), the bus controller 1010 is notified along the signal line 1011 of the input data transmission rates, while the input transmission rate for the input portion 303 is "0".

Thus, the bus controller 1010 permits the transmission of data by the input portions 301, 302 and 304 to the frame memory 600, and by the frame memory 600 to the display drive controller 910, without any data being lost, and does not permit the transmission of data by the input portion 303 to the frame memory 600. Therefore, the display system in this embodiment can continue the display operation without losing any data and without hanging. Further, the control portion 510 turns on only the LED 523 (step S206). And thus, when a user sees that the LED 523 is on, the user can confirm that an image from the host computer connected to the input portion 303 is not displayed.

In addition, If the sum of the input data transmission rates that is detected while the input data transmission rate of the input portion 303 is set to "0" is also $Bm < Bi + Bd$ (No at step S204), then the input data transmission rate for the input portion 302 is set to "0" (step S209), and the input data transmission rate for the input portion 301 is also set to "0" (step S211). The sum of the input data transmission rates is thereafter re-calculated, and the above described operation is performed.

If $Bm < Bi + Bd$ is established for all the four input data transmission rates (No at step S212), the control portion 510 sets the input data transmission rates for the input portions 303 and 304 to "0" (step S213), and re-calculates the sum of the input data transmission rates. As a result, when $Bm > Bi + Bd$ is established, i.e., when $Bm > Bi1 + Bi2 + \text{"0"} + \text{"0"} + Bd$ is established (YES at step S214), the bus controller 1010 is notified along the signal line 1011 of the input data transmission rates, while the input transmission rate for both of the input portions 303 and 304 is "0."

Therefore, without any data being lost, the bus controller 1010 transmits data from the input portions 301 and 302 to the frame memory 600 and from the frame memory 600 to the display drive controller 910, and does not transmit data from the input portions 303 and 304 to the frame memory 600. As a result, the display system in this embodiment can continue the display operation without losing any data and without hanging. Further, the control portion 510 turns on only the LEDs 523 and 524 (step S217). And thus, when a user sees that the LEDs 523 and 524 are on, the user can confirm that images from the host computers that are connected to the input portions 303 and 304 are not displayed.

When the sum of the input data transmission rates that is detected while the input transmission data rates for the input portions 304 and 303 are both set to "0" is also Bi<Bi+Bd (NO at step S214), the control portion 510 sets the input data transmission rates for the input portions 304 and 302 to "0" (step S215); sets the input data transmission rates for the input portions 304 and 301 to "0" (step S221); sets the input data transmission rates for the input portions 303 and 302 to "0" (step S223); sets the input data transmission rates for the input portions 303 and 301 to "0" (step S225); sets the input data transmission rates for the input portions 302 and 301 to "0" (step S227); sets the input data transmission rates for the input portions 304, 303 and 302 to "0" (step S233); sets the input data transmission rates for the input portions 304, 303 and 301 to "0" (step S235); sets the input data transmission rates for the input portions 304, 302 and 301 to "0" (step S237); and sets the input data transmission rates for the input portions 303, 302 and 301 to "0" (step S239). The sum of the input data transmission rates is repetitiously re-detected until Bm>Bi+Bd is obtained.

The above processing sequence is shown in the flowcharts in FIGS. 21 to 31 (steps S201 to S241). The control portion 510 periodically detects the transmission rates for signals received by the input portions 301 to 304. When Bm<Bi+Bd, the processing shown in the flowcharts in FIGS. 21 to 31 is begun.

By means of the above processing, the display system can continue the display operation without losing any data and without hanging, and by understanding the meanings of the ON/OFF states of the LEDs 521 to 524, a user can identify a host computer that is connected to an input portion but for which no image is displayed. It is apparent that the order in which the data transmission rates for the input portions 301 to 304 are set to "0" does not have to be as is shown in the flowcharts in FIGS. 21 to 31.

An explanation will now be given for the processing performed when the buttons SW511 to SW514 are depressed. Assume that image data from the input portions 301, 302 and 304 are displayed on the CRT 700, and that image data from the input portion 303 are not displayed, i.e., the LED 523 is on. An explanation will now be given for an example where the button SW513 corresponding to the input portion 303 is depressed. This operation is equivalent to a request from the user to display the image data from the input portion 303. When the button SW513 corresponding to the input portion 303 is depressed, the following process is performed in accordance with the flowchart shown in FIGS. 32 to 37 (steps S1301 to S1323) because while the input transmission rate for the input portion 303 is not "0" the bus controller 1010 has been notified that the transmission rate is "0".

When the control portion 510 detects the depression of the button SW513, it re-detects the sum of the input data transmission rates, while the input data transmission rate for the input portion 304, i.e., Bi4, is set to "0" (step S1301). As a result, when Bm>Bi+Bd is established, i.e., when Bm>Bi1+Bi2+Bi3+"0"+Bd is established (YES at step S1302), the bus controller 1010 is notified along the signal line 1011 of the input data transmission rates, while the input transmission rate for the input portion 304 is "0".

Therefore, without any data being lost, the bus controller 1010 transmits data from the input portions 301, 302 and 303 to the frame memory 600 and from the frame memory 600 to the display drive controller 910, and does not transmit data from the input portion 304 to the frame memory 600. As a result, the display system in this embodiment can continue the display operation without losing any data and without hanging, and an image from the host computer 103, connected to the input portion 303, that was not displayed now is. Further, the control portion 510 turns on only the LED 524 (step S1305 (the LED 523 is turned off). And thus, when a user sees that the LED 524 is on, the user can confirm that an image from the host computer that is connected to the input portion 304 is not displayed.

When the sum of the input data transmission rates that is re-detected, while the input transmission data rate of the input portion 304 is set to "0", is also Bi<Bi+Bd, i.e., Bm<Bi1+Bi2+Bi3+"0"+Bd (No at step S1302), the control portion 510 sets the input data transmission rate for the input portion 302, i.e., Bi2, to "0" (step S1303), and re-calculates the sum of the input data transmission rates. It should be noted that this process differs for the flowcharts in FIGS. 2 to 12 and the flowcharts in FIGS. 32 to 37. Since in this case the button SW513 corresponding to the input portion 303 has been depressed, the control portion 510 skips the process for re-detecting the sum of the input data transmission rates, while the input data transmission rate for the input portion 303 is set to "0". As a result, the images from the host computer 103, which is connected to the input portion 303, that are displayed have a higher priority.

When the sum obtained for the input transmission rates, while the input data transmission rate for the input portion 302, i.e., Bi2, is set to "0," is Bm>Bi+Bd, i.e., Bm>Bi1+"0"+Bi3+Bi4+Bd (YES at step S1304), the bus controller 1010 is notified via the signal line 1011 of the input transmission rates, while the input transmission rate for the input portion 302 is "0".

Thus, the bus controller 1010 permits the transmission of data by the input portions 301, 303 and 304 to the frame memory 600 and by the frame memory 600 to the display drive controller 910, without any data being lost, and does not transmit data from the input portion 304 to the frame memory 600. Therefore, the display system in this embodiment can continue the display operation without losing any data and without hanging, and the image from the host computer 103, connected to the input portion 303, that was not displayed now is. Further, the control portion 510 turns on only the LED 522 (step S1306) (the LED 523 is turned off). An thus a user can see that the LED 522 is on, and can confirm that an image from the host computer connected to the input portion 302 is not displayed.

In addition, if the sum of the input data transmission rates that is detected, while the input data transmission rate for the input portion 302 is set to "0", is also Bm<Bi+Bd (No at step S1304), the process is continued in accordance with the flowcharts in FIGS. 32 to 37. It should also be noted that while the input data transmission rate for the input portion 303 is set to "0", the control portion skips the process in the flowcharts in FIGS. 21 to 31 for re-detecting the sum of the input data transmission rates. Also in this process, it is apparent that the order of the input portions 301 to 304 does not have to follow that shown in the flowcharts in FIGS. 32 to 37.

Through the above processing sequence, the display system can continue the display operation without losing any data and without hanging, and can display data (display data input to the input portion 303) upon the request of a user (by the depression of the button SW513 corresponding to the input portion 303). And the user can identify, by monitoring the ON/OFF states of the LEDs 521, 522 and 524, a host computer that is connected to an input portion but for which an image is not displayed.

An explanation will now be given for the processing performed when the image data for the input portions 301, 302 and 304 are displayed on the CRT 700 and the image data for the input portion 303 are not displayed, i.e., the LED 523 is on and the buttons SW512, SW513 and SW514, but not SW511, which corresponds to the input portion 301, have been depressed. Although the control portion 510 detects that the buttons SW512, SW513 and SW514 have been depressed, it does not perform a special process because the bus controller 1010 has not been notified that the input data transmission rates for the input portions 301, 302 and 304 are all "0".

However, even when the same processing is performed as in the flowcharts in FIGS. 32 to 37 (it should be noted that the step to be skipped differs), it is apparent that the display system can continue the display operation without losing any data and without hanging, and that a user can identify, by monitoring the ON/OFF states of the LEDs 521 to 524, a host computer that is connected to the input portion but for which no image is displayed. From the above explanation, it is easy to understand the operation performed when one of the buttons SW511 to SW514 is depressed in another of the conditions produced by a combination of the ON/OFF states of the LEDs 521 to 524, and no explanation for this operation will be given.

As is described above, according to the fourth embodiment of the present invention, the display system comprises: the input portions 301 to 304, for receiving image data from the host computers 101 to 104, for converting the image data into a format appropriate for the graphic bus 400 and for outputting the resultant data; the buttons SW511 to SW514, for selecting input portions to receive image data; the LEDs 521 to 524, for indicating an input portion that is inhibited from storing image data in the frame memory 600; and the control portion 510, for detecting the sum of the input transmission rates for the input portions 301 to 304 and the data transmission rate for the frame memory 600, for comparing the obtained sum with the data transmission rate for the frame memory 600, for employing the results of the comparison or the selected states for the buttons SW511 to SW514, or both, to inhibit the storage in the frame memory 600 of image data received from an input portion and for using an LED to display the input portion that is inhibited from storing image data in the frame memory 600. Therefore, the following functions and effects can be obtained.

With the above arrangement, the control portion 510 employs the results of a comparison of the sum of the input data transmission rates for the input portions 301 to 304 with the data transmission rate for the frame memory 600, or selected states for the buttons SW511 to SW514, or both, to inhibit the storage in the frame memory 600 of image data received from one or more input portions. In addition, the control portion 510 uses the LEDs to indicate which input portion is inhibited for storing image data in the frame memory 600.

Therefore, even when image data are received at a transmission rate that exceeds the data transmission rate for the frame memory 600, the display system can continue the display operation without losing any data and without hanging. In addition, the input portion that is prohibited from storing image data in the frame memory 600 is indicated by using the LEDs, i.e., a host computer is indicated that is connected to the input portion but for which no image is displayed, so that display data from the pertinent host computer can be displayed in accordance with an instruction from a user.

(Fifth Embodiment)

Figure 38:
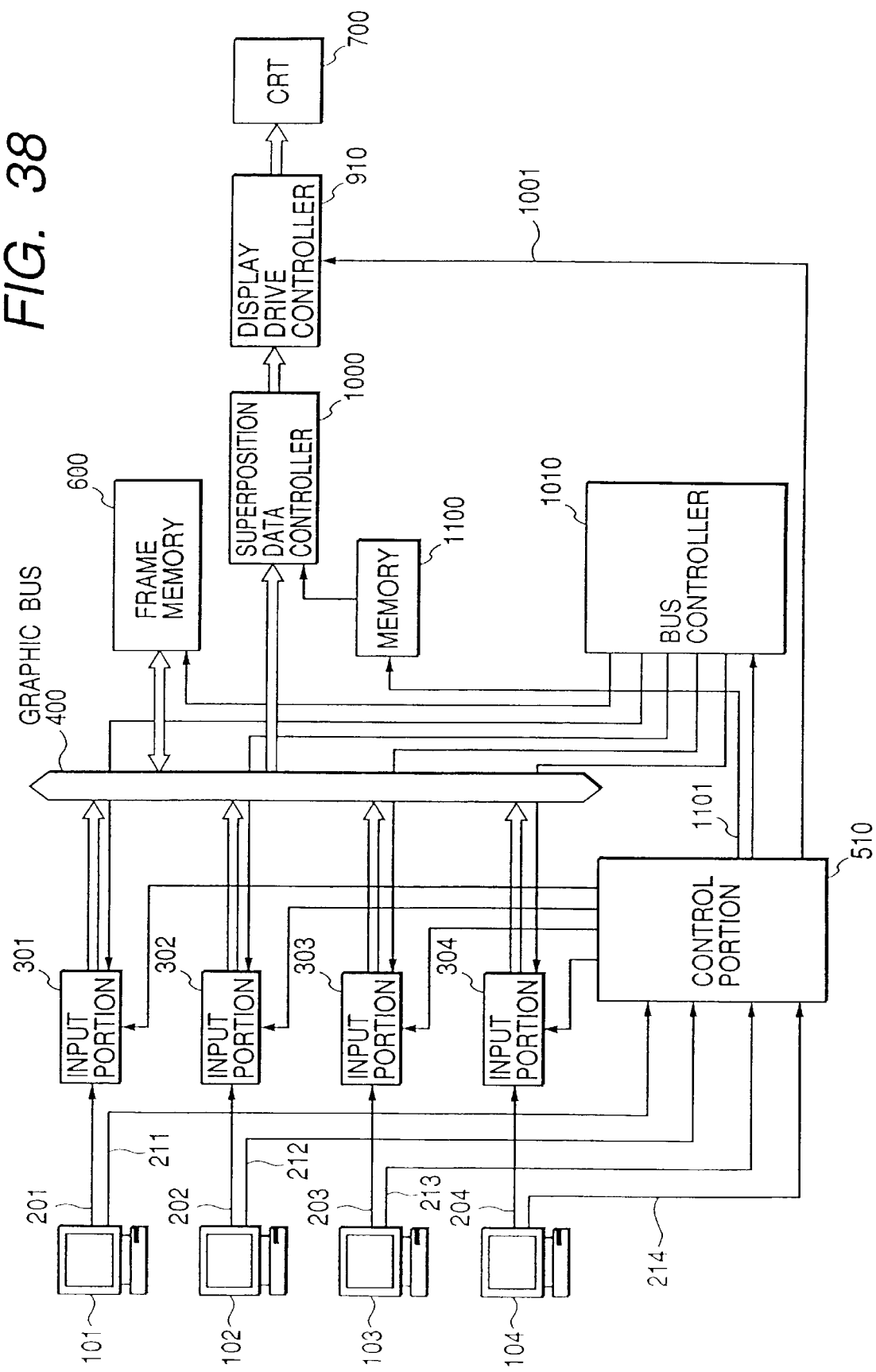
FIG. 38 is a block diagram illustrating the essential part of a display system according to a fifth embodiment of the present invention.
Figure 39:
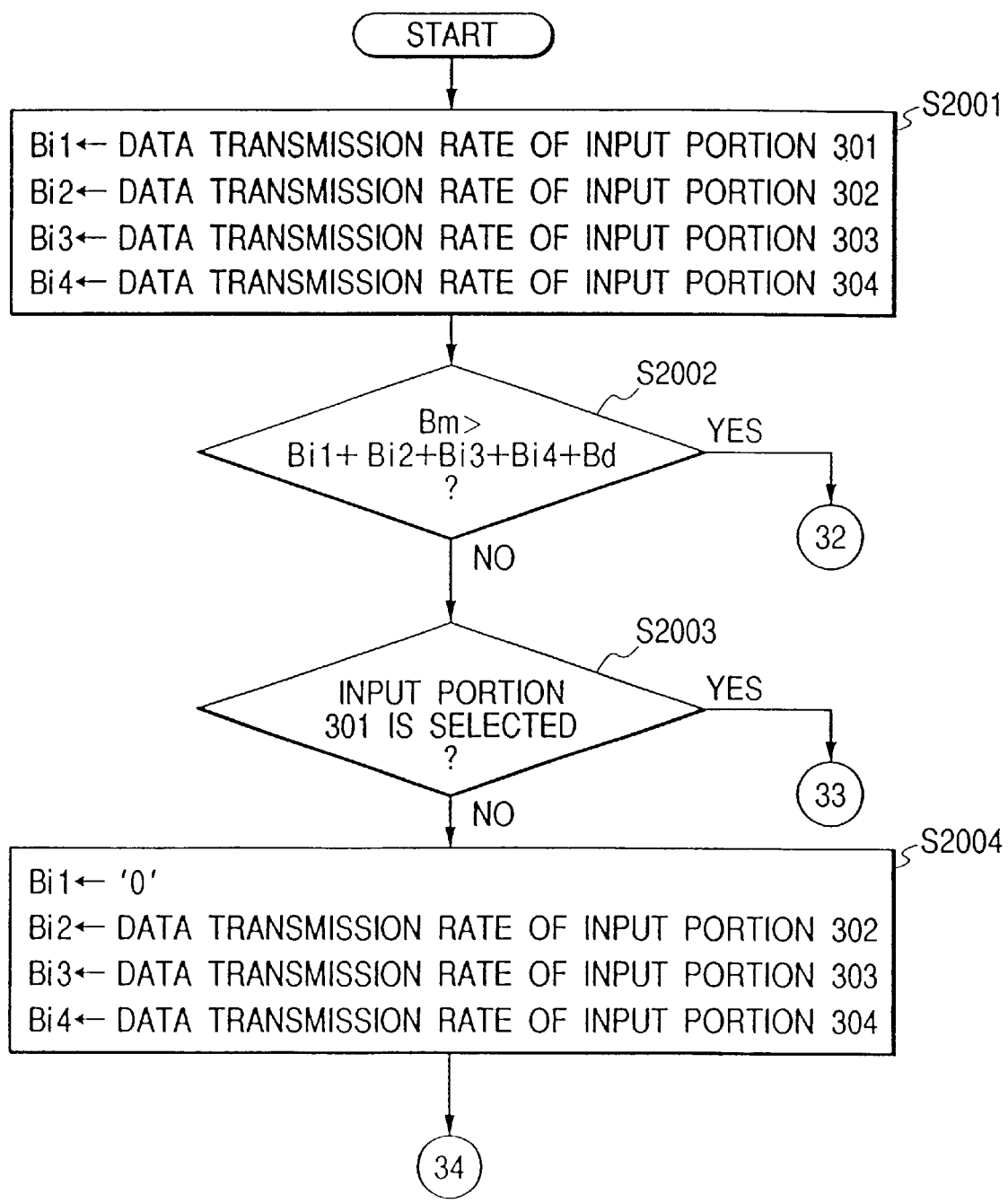
FIGS. 39, 40, 41, 42, 43, 44, 45, 46, 47, 48, 49, 50, 51 and 52 are flowcharts showing the processing performed by the display system according to the fifth embodiment of the present invention.
Figure 40:
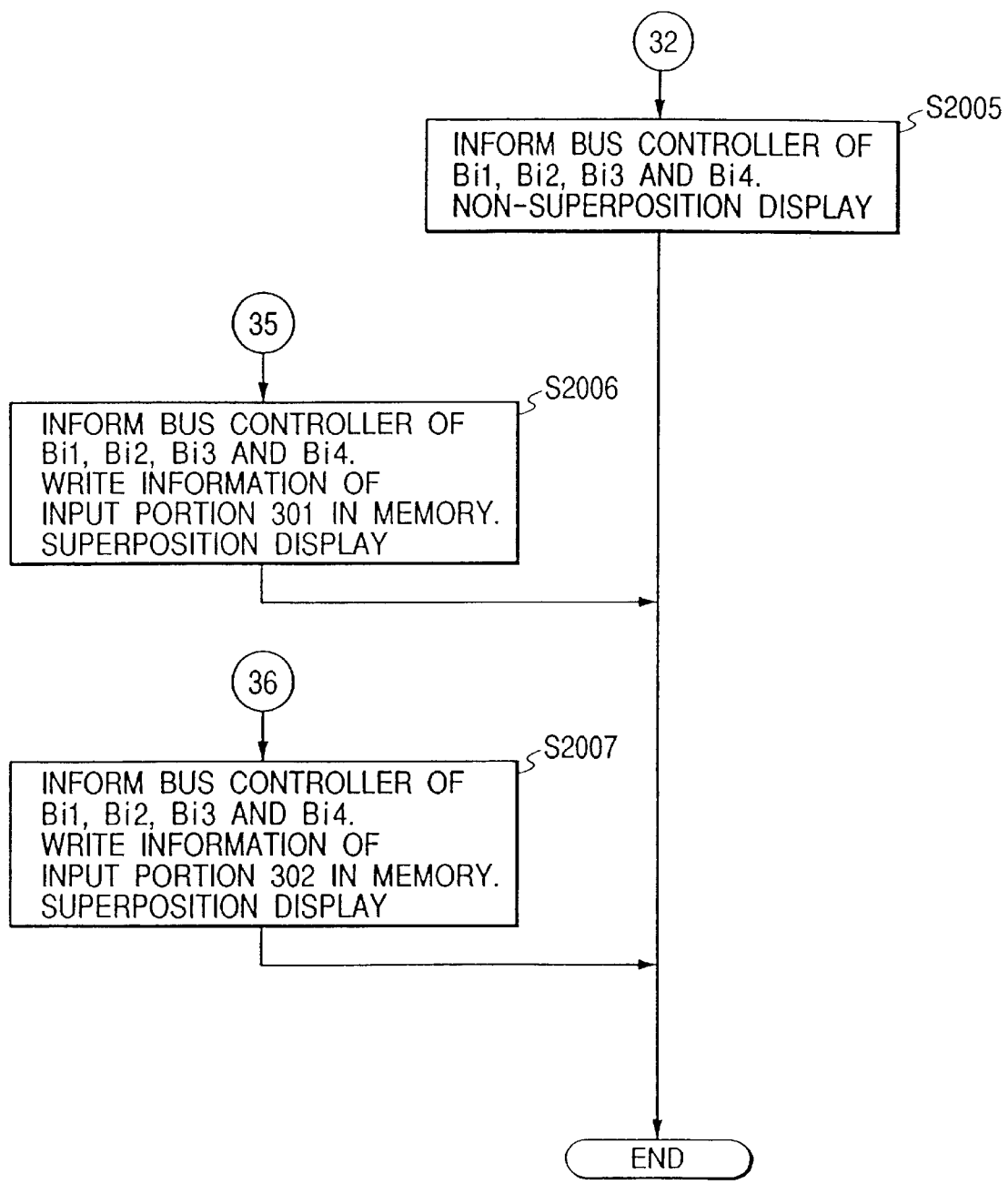
Figure 41:
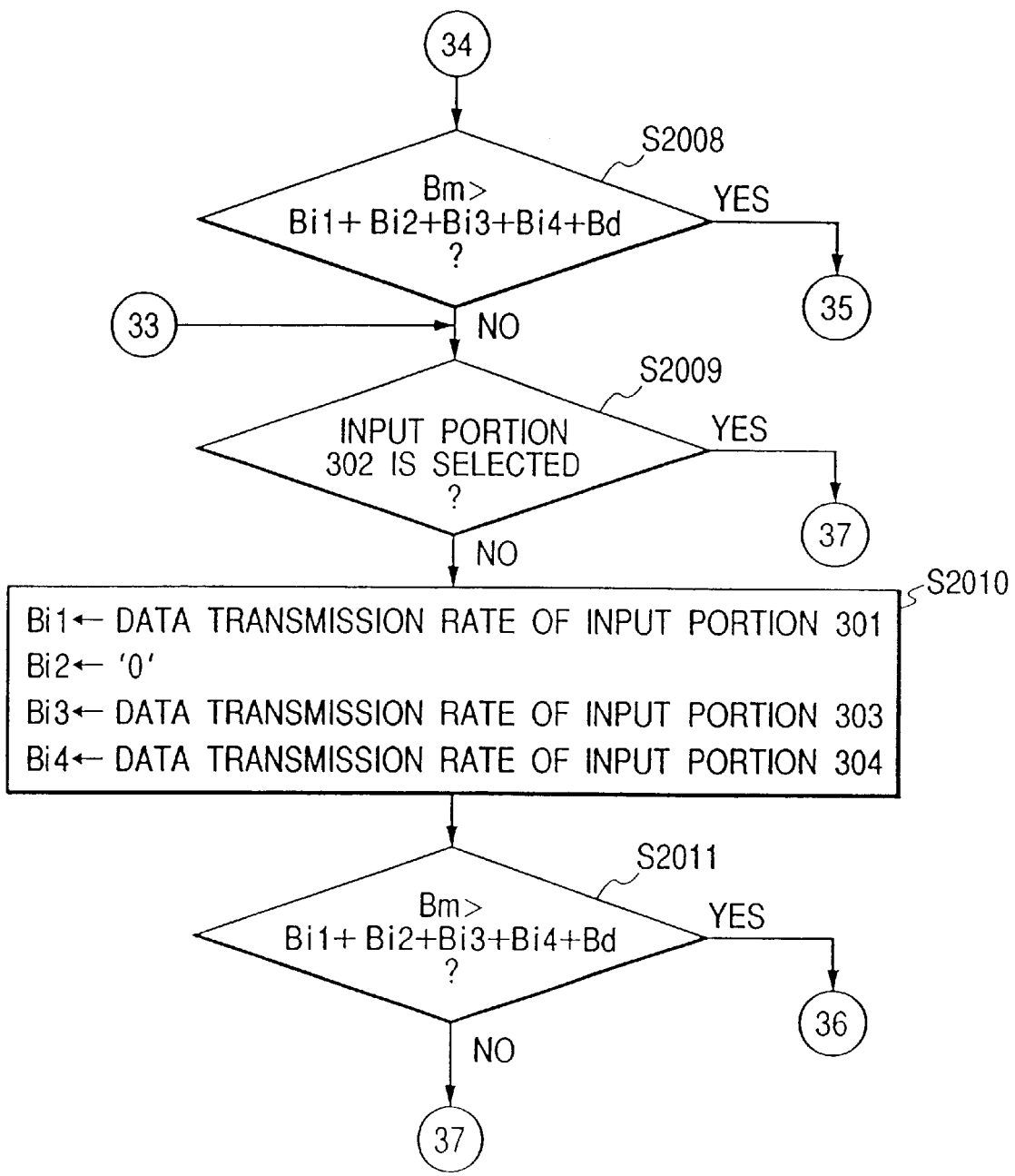
Figure 42:
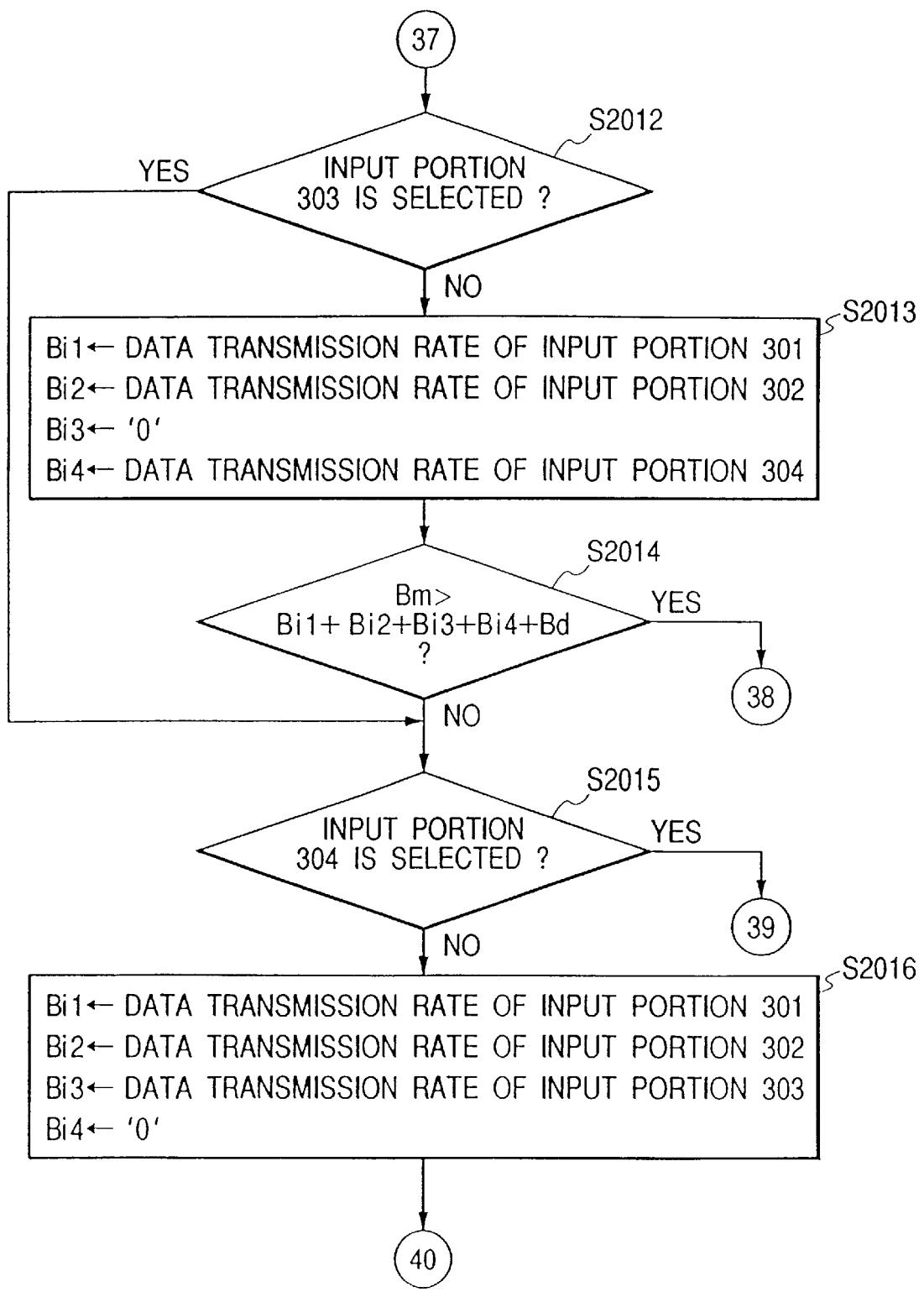
Figure 43:
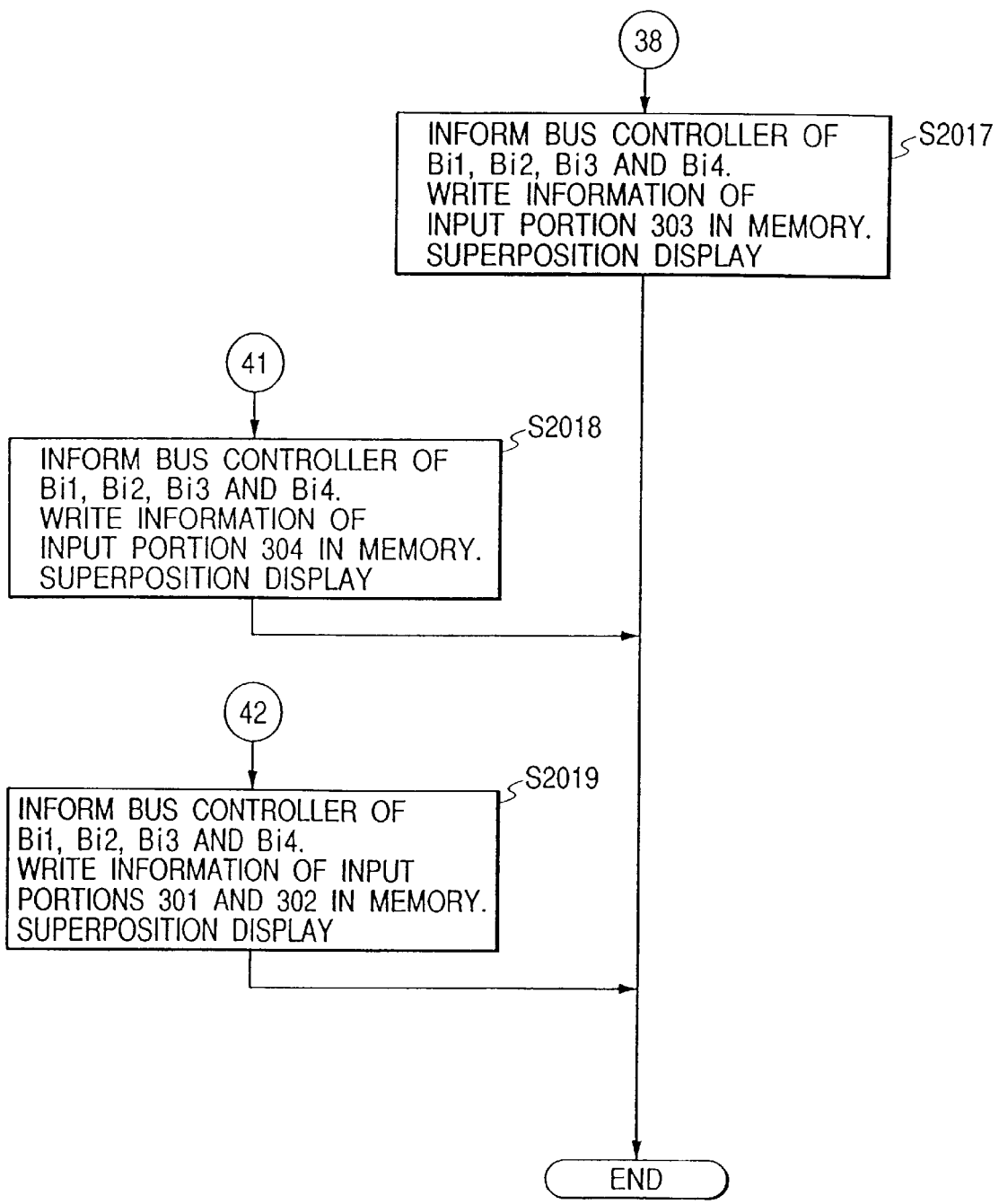
Figure 44:
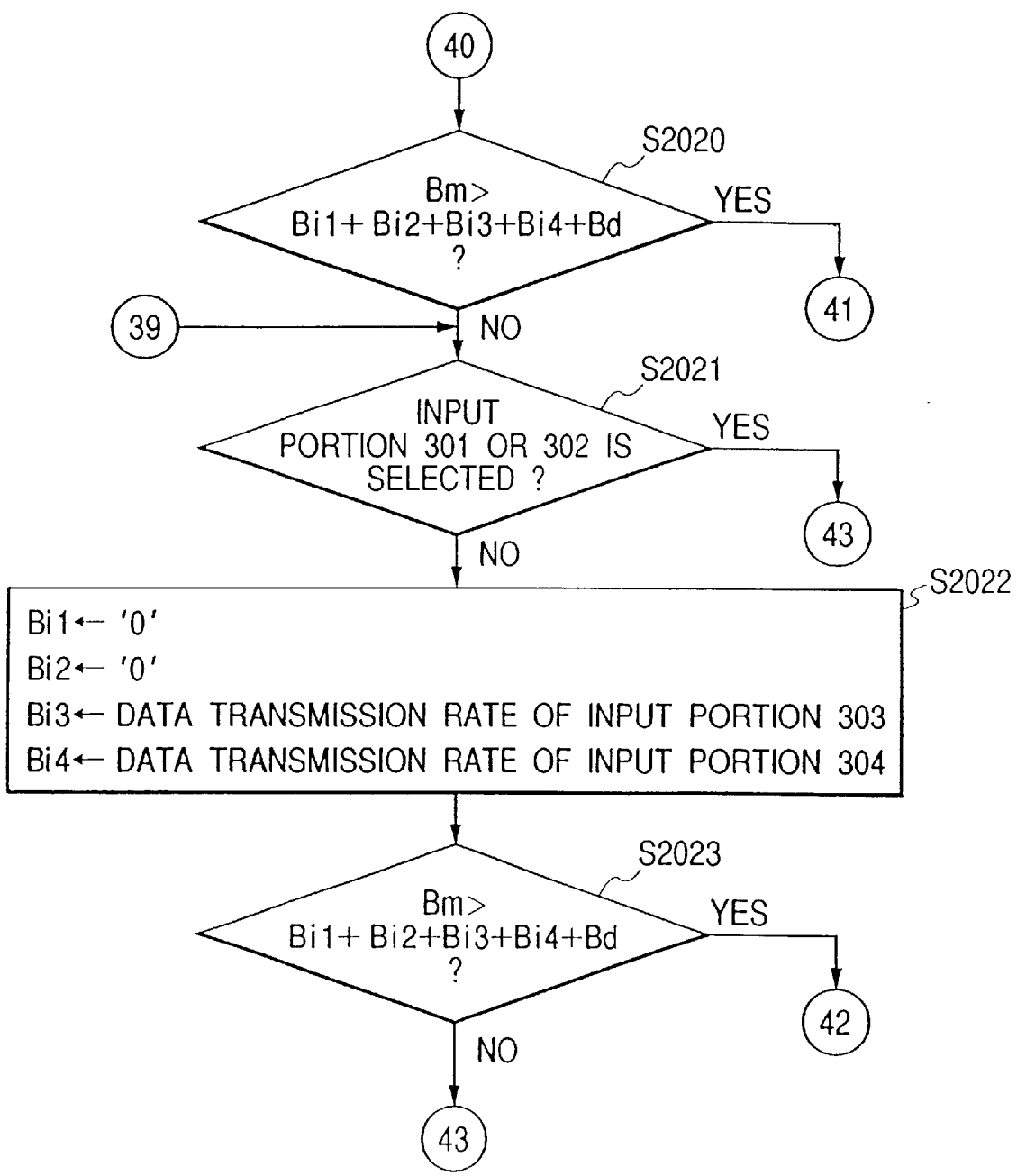
Figure 45:
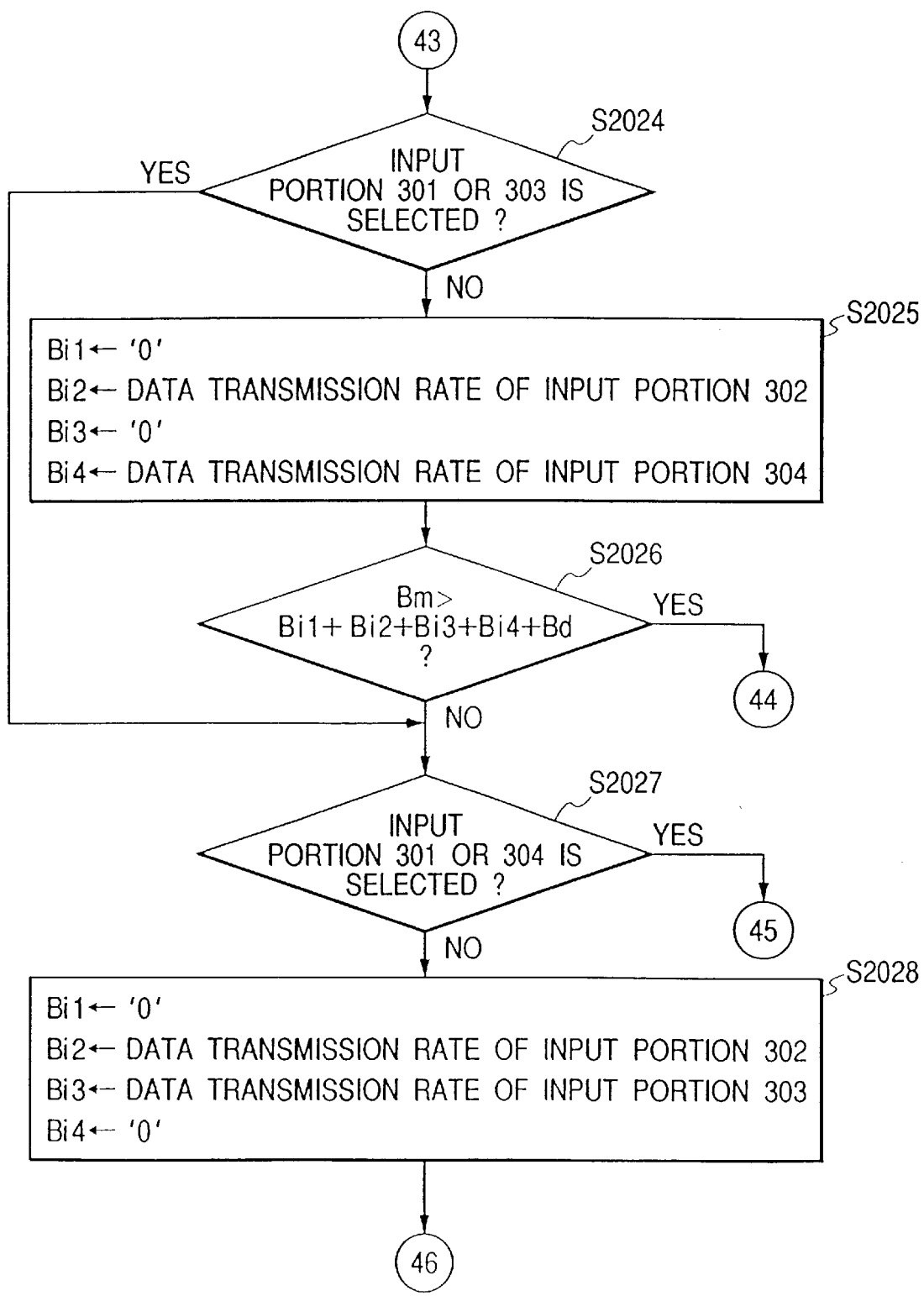
Figure 46:
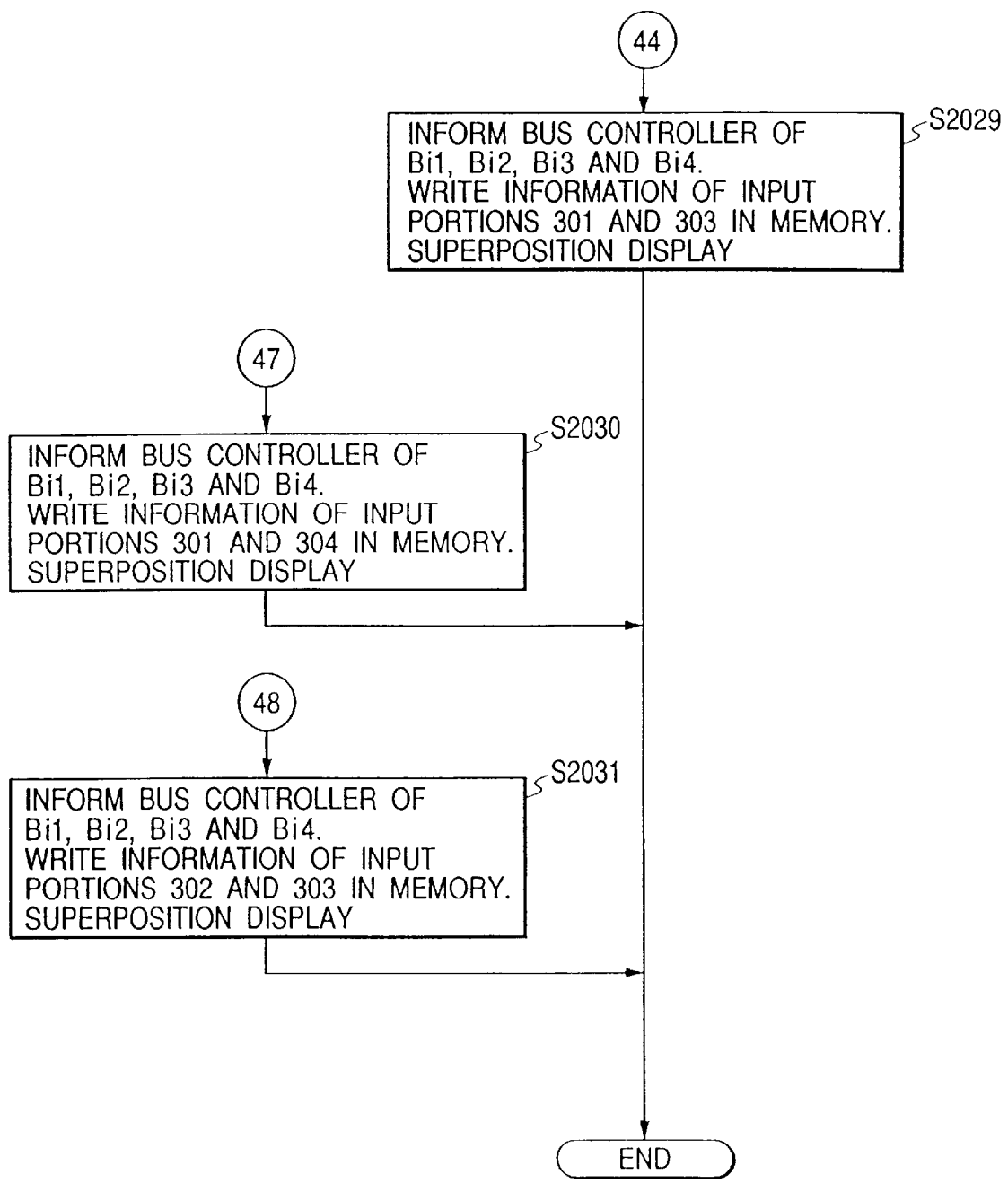
Figure 47:
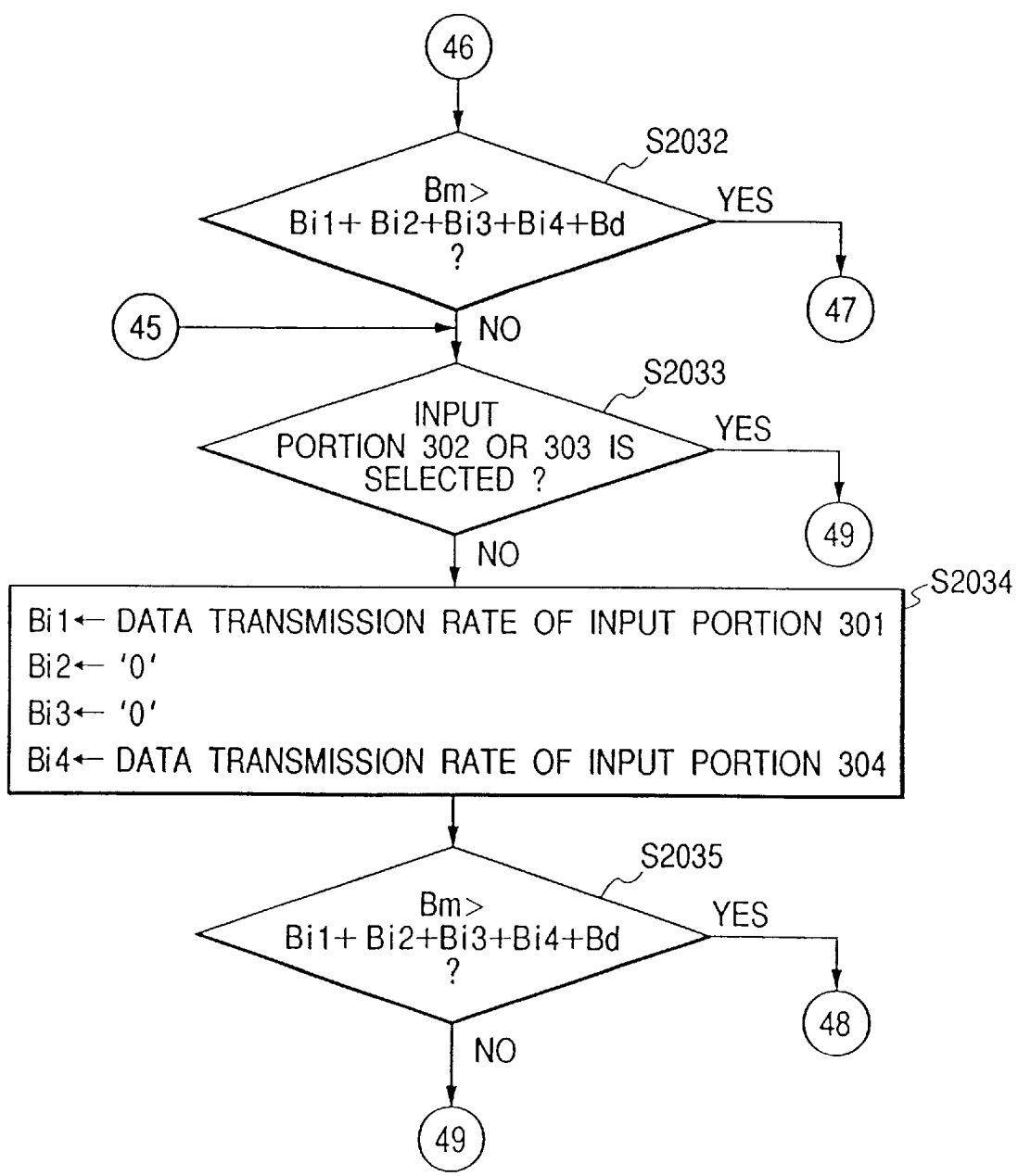
Figure 48:
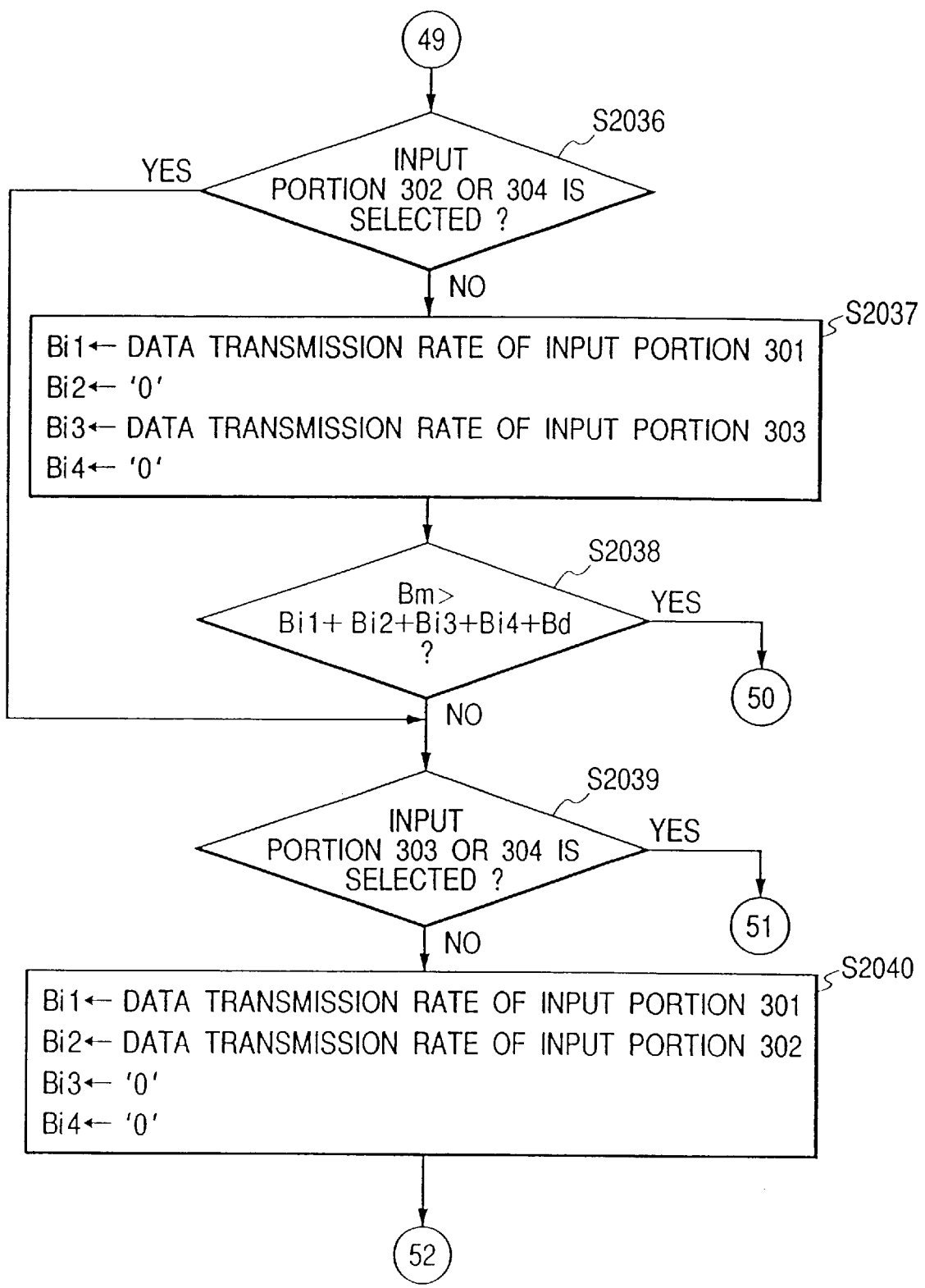
Figure 49:
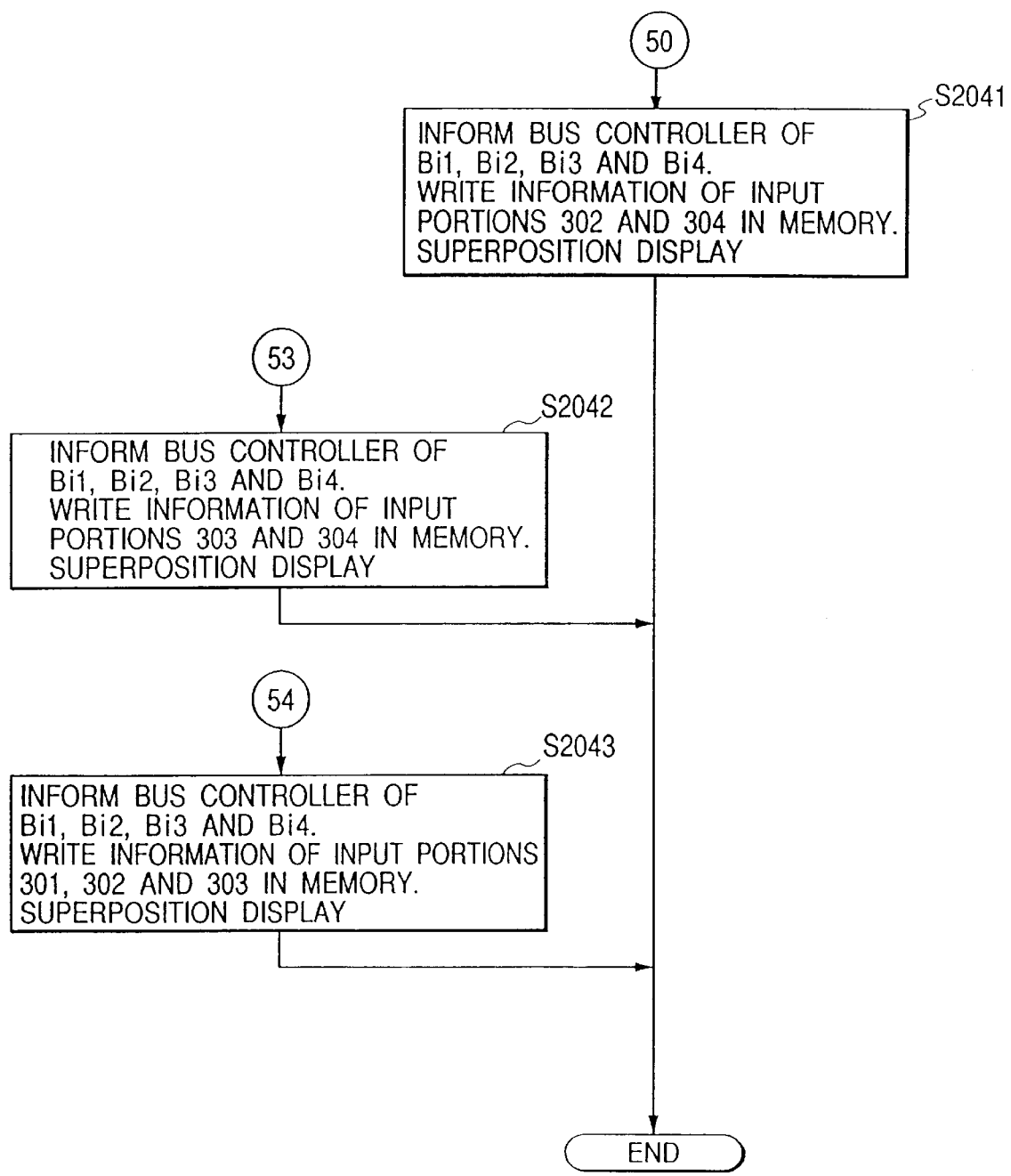
Figure 50:
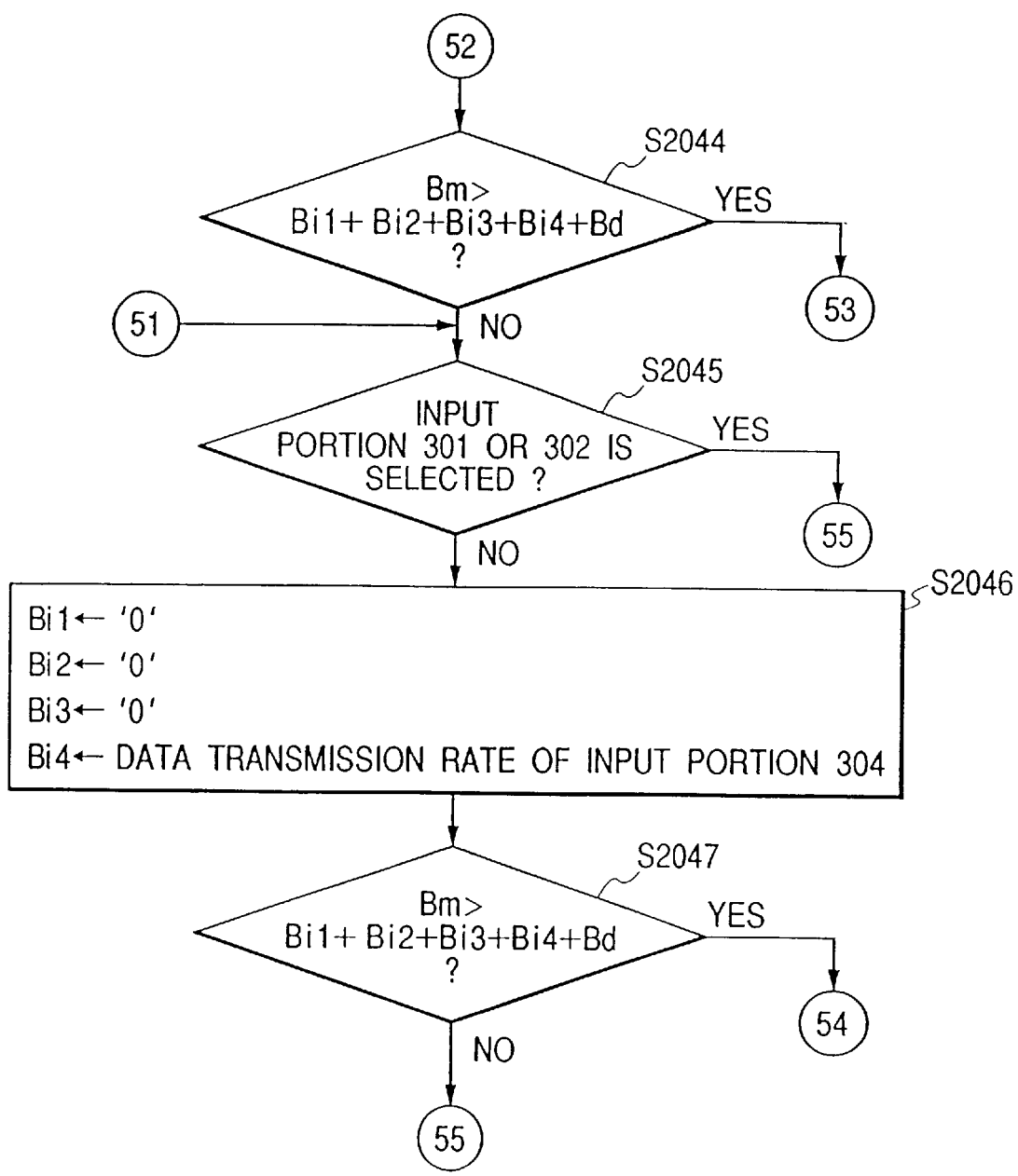
Figure 51:
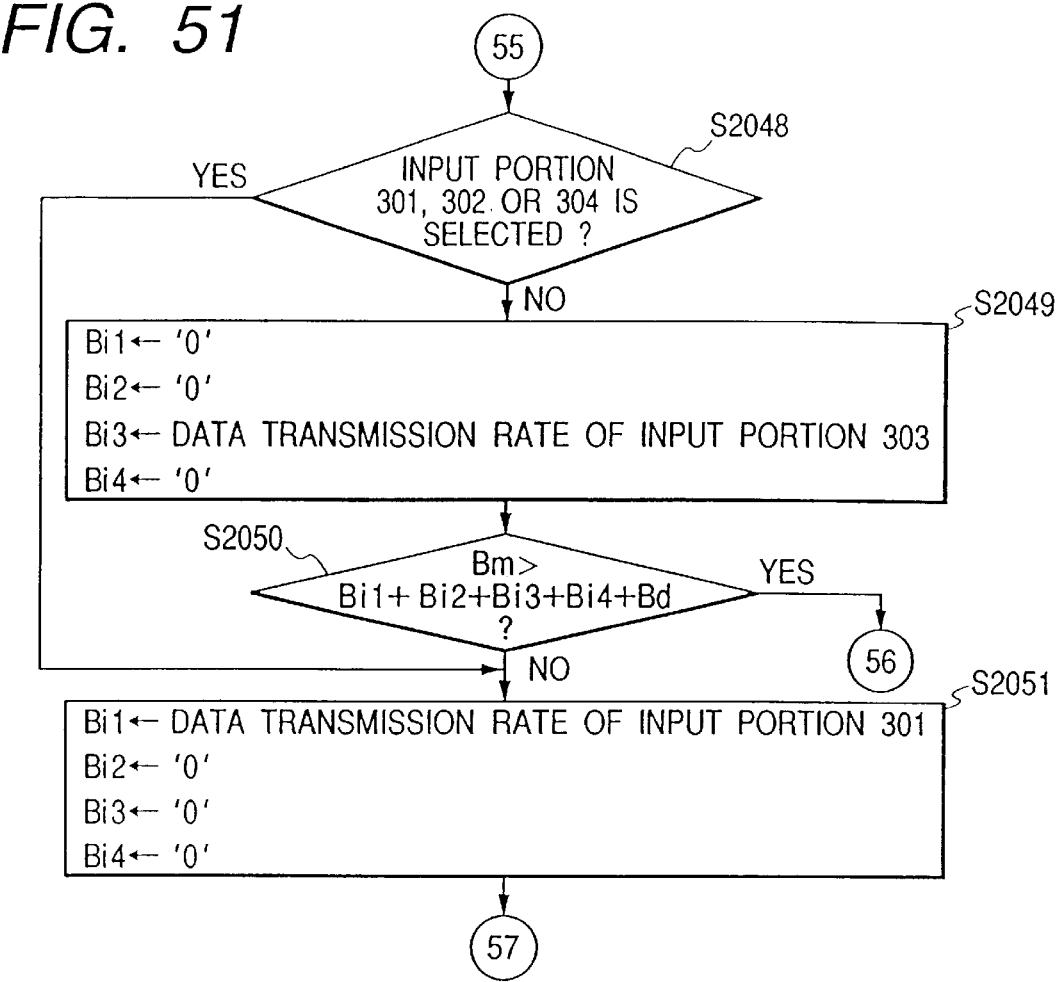
Figure 52:
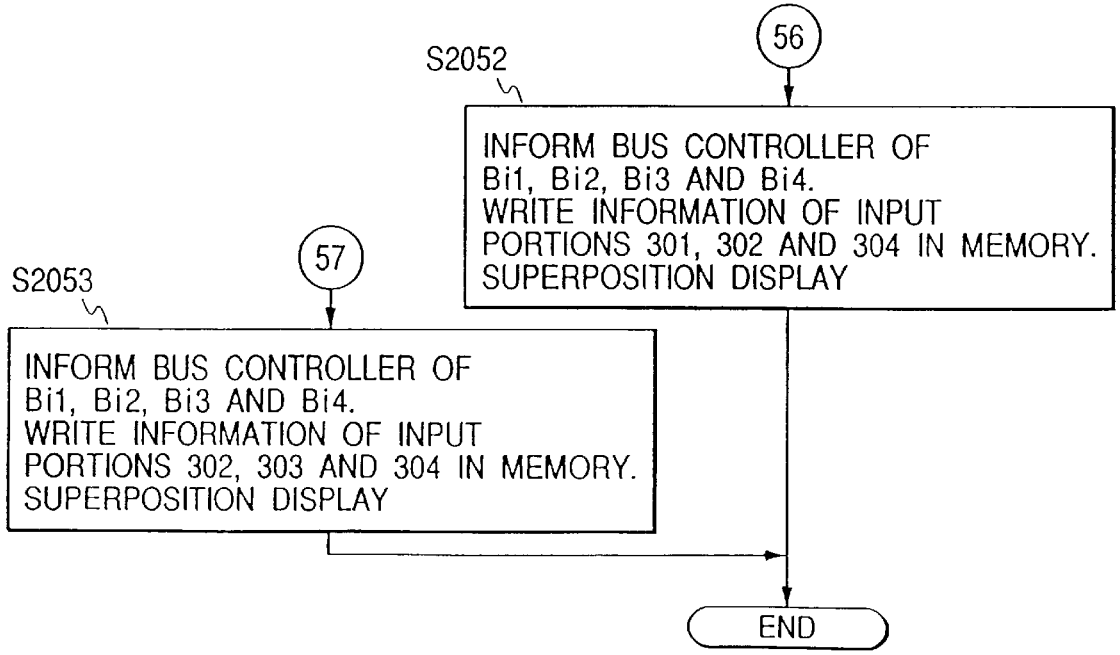

FIG. 38 is a block diagram illustrating the arrangement of the essential parts of a multiple images display system according to a fifth embodiment of the present invention. The display system in the fifth embodiment comprises: input portions 301 to 304, a graphic bus 400, a control portion 510, a frame memory 600, a superposition data controller 1000, and a memory 1100. Host computers 101 to 104 are connected to this system. The same reference numerals as are used in FIG. 20 are also employed in FIG. 38 to denote corresponding components.

Specifically, the host computers 101 to 104, which are external devices, transmit to signal lines 201 to 204, via a digital I/F (interface), RGB digital video signals consisting of image data, vertical synchronization signals Vsync, horizontal synchronization signals Hsync, a clock signal that provides the timing for the sampling of one pixel, and a display enable signal that identifies a period for the transmission of effective image data. In this embodiment, as is the preceding embodiments, four host computers can be connected to the display system.

The input portions 301 to 304 receive data that are output by the host computers 101 to 104 via the signal lines 201 to 204, convert them into a format that is appropriate for the graphic bus 400, and output the resultant data. The input portions 301 to 304 are constituted by a decoder for receiving a digital video signal, such as an LVDS (Low Digital Differential Signaling), and a differential buffer. Since this arrangement is well known prior art, no explanation for it will be given.

The control portion 510 controls the entire system, and is constructed in the same manner as in the fourth embodiment in FIG. 4. The control portion 510 performs the processing shown in the flowcharts in FIGS. 39 to 52. The control portion 510 and the host computers 101 to 104 can communicate with each other via signal lines 211 to 214. Signal communication may be effected by either the serial or the parallel transmission of data, and either by wire or by wireless communication means, since the communication means has not affect on the subject of the present invention. Similarly, no communication protocol has any effect on the subject of the present invention.

The host computers 101 to 104 transmit to the control portion 510, via the signal lines 211 to 214, information, including the frequency for one pixel, for video signals output to the signal lines 201 to 204, the screen size, the front porch time, the back porch time, the V blank time, the number of bits employed for one pixel, the name of the manufacture/model of the corresponding host computer, the name of the OS and the version number, and the name of the user of the corresponding host computer. The control portion 510 receives, identifies and stores the data transmitted along the signal lines 211 to 214, and based on these data, rearranges data bits for output in accordance with the screen size and allocates addresses.

Furthermore, the control portion 510 employs the frequency for one pixel and the number of bits employed for one pixel that are transmitted along each of the signal lines 211 to 214 to detect the transmission rates for the signals received from each of the input portions 301 to 304. Then, the control portion 510 adds together the obtained transmission rates for the data output by the input portions 301 to 304 to acquire the sum of the input data transmission rates. It is readily apparent that, by using the communication means, whether or not the input portions 301 to 304 are connected to the host computer 101 to 104 can be detected.

When, for example, the control portion receives character string "PUSH" along the signal line 211, the input portion 301 is selected. As the control portion 510 can store the last input portion that is selected, when the power is turned on or when the system is reset by reset means (not shown), the control portion stores the input portion 301 as the last selected portion.

If after the reset the input portion 301 is not connected to the host computer 101, the control portion 510 stores the input portion 302 as the last selected one. If the input portions 301 and 302 are not connected to the host computers 101 and 102, the control portion 510 stores the input portion 303 as the last selected one. And if the input portions 301, 302 and 303 are not connected to the host computers 101, 102 and 103, the control portion 510 stores the input portion 304 as the last selected one. If none of the input portions 301 to 304 are connected to the host computers 101 to 104, the control portion 510 stores, as the last selected one, the first input portion 301 to 304 that is connected thereafter. The control portion 510 may also store as the last selected one, the input portion 301 to 304 that was connected thereafter at the last.

A frame memory 600, a CRT 700, a display drive controller 910 and a bus controller 1010 have the same structures as those in the fourth embodiment. A difference between the fourth and the fifth embodiments will now be described. The display data read from the frame memory 600 are transmitted to the CRT 700 via the graphic bus 400, the superposition data controller 1000 and the display drive controller 910. A memory 1100 is used to store display data that are to be superposed on the display data that are read from the frame memory 600. The display data are written by the control portion 510 via a signal line 1101.

The superposition data controller 1000 normally converts the display data from the frame memory 600 into a format appropriate for the display drive controller 910, and outputs the resultant display data. However, when the superposition data controller 1000 receives an instruction from the control portion 510 along the signal line 1001, the superposition data controller 1000 replaces one part of the display data received from the graphic bus 400 by superposition data that are read from the memory 1100, and outputs the superposition data to the display drive controller 910. For this operation, a higher priority is assigned for the superposition data in the memory 1100 that are displayed on the CRT 700.

A detailed explanation will now be given, while referring to the flowcharts in FIGS. 39 to 52, for the operation performed in accordance with the fifth embodiment by the thus arranged display system.

The control portion 510 of the display system performs the following processing in accordance with the flowcharts in FIGS. 39 to 52 (steps S2001 to S2053). First, the control portion 510 compares Bm (the data transmission rate for the frame memory 600) with Bi (the sum of the input data transmission rates for the input portions 301 to 304) +Bd (the data transmission rate for display data read from the frame memory 600). When Bm>Bi+Bd (YES at step S2002), the control portion 510 transmits, to the bus controller 1010, the obtained input data transmission rates for the individual input portions 301 to 304. The control portion 510 does not instruct the superposition data controller 1000 to provide a superposition display (S2005). If Bm<Bi+Bd (NO at step S2002), the control portion 510 determines that the input portion 301 has not been selected (NO at step S2003), and compares Bm with Bi+Bd, while the input data transmission rate for the input portion 301 is set to "0". When Bm>Bi+Bd (YES at step S2008), the control portion 510 transmits to the bus controller 1010, via the signal line 1101, the input transmission rates, while the input data transmission rate for the input portion 301 is "0" (step S2006).

As a result, for the same reason as in the fourth embodiment, the display system can continue the display operation without losing any data and without hanging. Further, the control portion 510 writes, to the memory 1100, the display data for the input portion 301, and instructs the superposition data controller 1000, along the signal line 1001, to prepare a superposition display. A user can monitor the display data for the input portion 301 that are superposed and displayed on the CRT 700, and ascertain that the image from the host computer connected to the input portion 301 is not displayed. The display data for the input portion 301 are, for example, character string "Input4". The name of a host computer and the name of the user of the host computer, which are received along the signal lines 201 to 204, may be image data, such as icons.

If the results obtained by re-detecting the sum of the input data transmission rates, while the input data transmission rate for the input portion 301 is "0", are still Bm<Bi+Bd (No at step S2008), as in the flowcharts in FIGS. 39 to 52, the control portion 510 ascertains that the input portion 302 has not been selected (step S2009). The control portion 510 sets the input data transmission rate for the input portion 302 to "0" (step S2010), and compares Bm with Bi+Bd (step S2011). Since the repetitive process can be understood from the explanation presented in the first embodiment, no explanation for it will be given. It is readily apparent that the order for the input portions 301 to 304 for which the input data transmission rates are set to "0" need not follow that given in the flowcharts in FIGS. 39 to 52.

Through the above described processing sequence, the display system of this embodiment can continue the display operation without losing any data and without hanging. The display system displays, with a higher priority, data for the input portions 301 to 304 that are requested by a user (communication data entered from the host computers 101 to 104), and superposes information representing the input portions 301 to 304 for which data are not displayed. As a result, the user can ascertain which data are not displayed.

As is described above, according to the fifth embodiment of the present invention, the display system comprises: the input portions 301 to 304, for receiving image data from the host computers 101 to 104, and for converting them into a format appropriate for the graphic bus 400 and outputting the resultant data; the signal lines 211 to 214, for connecting the host computers 101 to 104 to the control portion 510 so that they can communicate with each other; the control portion 510, for selecting an input portion from which image data are to be transmitted, for detecting the sum of the input data transmission rates for the input portions 301 to 304 and the data transmission rate for the frame memory 600, for comparing the obtained sum with the data transmission rate for the frame memory 600, and for employing the results of the comparison to prohibit the storage, in the frame memory 600, of image data received from one or more input portions; and the superposition data controller 1000, for, upon receiving an instruction from the control portion 510, displaying on the CRT 700 the input portion that is prohibited from storing image data in the frame memory 600. Therefore, the following functions and effects can be obtained.

With the above arrangement, the control portion 510 compares the sum of the input data transmission rates for the input portions 301 to 304 with the data transmission rate for the frame memory 600, and employs the comparison results to prohibit the storage, in the frame memory 600, of image data received from one or more input portions. Upon receiving an instruction from the control portion 510, the superposition data controller 1000 displays, on the CRT 700, the input portion that is prohibited from storing image data in the frame memory 600.

Therefore, even when image data are received at a transmission rate that exceeds the data transmission rate for the frame memory 600, the display system can continue the display operation without losing any data and without hanging. In addition, since the input portion that is prohibited from storing image data in the frame memory 600 is shown on the CRT 700, i.e., since a host computer that is connected to the input portion but for which an image is not displayed is identified, the display data from the pertinent host computer can be displayed when instructed by a user.

What is claimed is:

1. A display apparatus comprising:
    a plurality of receiving means for receiving a plurality of image data supplied from outside;
    storage means, for storing the plurality of image data respectively received by said plurality of receiving means;
    display means, for displaying the respective image data read-out from said storage means;
    comparison means, for comparing the sum of frame rates of the respective image data received by said receiving means with a data transmission rate for said storage means; and
    storage control means for, based on the results of a comparison by said comparison means, inhibiting image data received by one of the plurality of receiving means from being stored into said storage means when the sum of the frame rates is greater than the data transmission rate, and storing the image data received from said plurality of receiving means to said storage means when the sum of the frame rates is equal to or smaller than the data transmission rate.

2. A display apparatus according to claim 1, further comprising:
    first detection means for detecting the sum of the frame rates of the received image data;
    second detection means for detecting the data transmission rate of said storage means; and
    selection means for selecting which image data are to be received,
    wherein said storage control means employs the results of the comparison, or the state selected by said selection means, or both the results of the comparison and the state selected by said selection means to prohibit the storage, in said storage means, of image data received.

3. A display apparatus according to claim 2, wherein said first detection means has a function for detecting the frame rates of the received image data, and a function for calculating the sum of the frame rates that are obtained.

4. A display apparatus according to claim 2, wherein said first detection means has a function for receiving communication data from external devices that are connectable to said receiving means, and employs the communication data to detect the sum of the frame rates of the received image data.

5. A display apparatus according to claim 2, further comprising communication means for receiving communication data from external devices that are connectable to said receiving means,
    wherein said first detection means employs the communication data to detect the sum of the frame rates of the received image data.

6. A display apparatus according to claim 2, further comprising communication means for receiving communication data from external devices that are connectable to said receiving means,
    wherein said selection means selects the image data to be received based on said communication data.

7. A display apparatus according to claim 1, further comprising display control means for indicating the received image data that is inhibited from being stored in said storage means.

8. A display apparatus according to claim 7, wherein said display control means uses a photodiode to indicate which of the received image data has been prohibited from being stored in said storage means.

9. A display apparatus according to claim 7, wherein said display control means uses an on-screen display device to indicate which of the received image data has been prohibited from being stored.

10. A display apparatus according to claim 9, further comprising communication means for receiving communication data from external devices that are connectable to said receiving means,
    wherein said display control means displays the communication data on said on-screen display device.

11. An image data storage control method, which is applied to a display apparatus that includes a plurality of receiving means for receiving a plurality of image data supplied from outside, and stores, in storage means, the plurality of image data respectively received by the plurality of receiving means and that displays, on display means, the respective image data read-out from the storage means, comprising the steps of:
    comparing the sum of frame rates of the respective image data received by the receiving means with a data transmission rate for the storage means; and
    inhibiting, based on the results in the comparing step, image data received by one of the plurality of receiving means from being stored into the storage means when the sum of the frame rates is greater than the data transmission rate, and storing the image data received from the plurality of receiving means to said storage means when the sum of the frame rates is equal to or smaller than the data transmission rate.

12. An image data storage control method according to claim 10, further comprising the steps of:
    a first detection step of detecting the sum of the frame rates of the received image data;
    a second detection step of detecting the data transmission rate of the storage means; and
    selecting which image data are to be received,
    wherein the storage control means employs the results of the comparison, or the state selected by the selection means, or both the results of the comparison and the state selected by the selection means to prohibit the storage, in the storage means, of the image data received.

13. An image data storage control method according to claim 12, wherein said first detection step has a function for detecting the frame rates, and a function for calculating the sum of the frame rates that are obtained.

14. An image data storage control method according to claim 12, wherein said first detection step has a function for receiving communication data from external devices that are connectable to the receiving means, and employs the communication data to detect the sum of the frame rates of the received image data.

15. An image data storage control method according to claim 12, further comprising a communication step of receiving communication data from external devices that are connectable to the receiving means, wherein, at said first detection step, the communication data are employed to detect the sum of the frame rates of the received image data.

16. An image data storage control method according to claim 12, further comprising a communication step of receiving communication data from external devices that are connectable to the receiving means, wherein, at said selection step, the image data to be received is selected based on the communication data.

17. An image data storage control method according to claim 11, further comprising a display control step for indicating, on the display means, the received image data that is inhibited from being stored.

18. An image data storage control method according to claim 17, wherein, in the display control step, a photodiode is used to indicate which of the received image data has been prohibited from being stored in the storage means.

19. An image data storage control method according to claim 17, further comprising a communication step of receiving communication data from external devices that are connectable to the receiving means, wherein, at said display control step, said communication data are displayed on an on-screen display device.

20. An image data storage control method according to claim 11, wherein, at said inhibiting step, an on-screen display device is used to indicate which of the received image data has been prohibited from being stored.

21. A storage medium, which is readable by a computer for storing a program to execute an image data storage control method, which is applied to a display apparatus that includes a plurality of receiving means for receiving a plurality of image data supplied from outside, and stores, in storage means, the plurality of image data respectively received by the plurality of receiving means and that displays, on display means, the respective image data read-out from the storage means, said image data storage control method comprising the steps of:

comparing the sum of frame rates of the respective image data received by the receiving means with a data transmission rate for said storage means;

inhibiting, based on the results in the comparing step, image data received by one of the plurality of receiving means from being stored into the storage means when the sum of the frame rates is greater than the data transmission rate, and storing the image data received from the plurality of receiving means to the storage means when the sum of the frame rates is equal to or smaller than the data transmission rate; and indicating the receiving means that is inhibited from storing the image data in the storage means.

* * * * *

UNITED STATES PATENT AND TRADEMARK OFFICE
CERTIFICATE OF CORRECTION

PATENT NO. : 6,614,439 B2
DATED : September 2, 2003
INVENTOR(S) : Yuichi Matsumoto et al.

It is certified that error appears in the above-identified patent and that said Letters Patent is hereby corrected as shown below:

Title page,
Insert item:
-- [73] Assignee: Canon Kabushiki Kaisha, Tokyo (JP) --.
Item [76], Inventors, should read:
-- [75] Inventors: Yuichi Matsumoto, Hiratsuka (JP); Katsuhiro Miyamoto, Isehara (JP); Shuntaro Aratani, Machida (JP); Hideaki Yui, Kawasaki (JP) --.
After *Assistant Examiner*, insert:
-- [74] *Attorney, Agent, or Firm*—Fitzpatrick, Cella, Harper & Scinto --.

Column 8,
Line 35, "input 1)" should read -- input 2) --.

Column 28,
Line 43, "claim 10," should read -- claim 11, --.

Signed and Sealed this

Eleventh Day of May, 2004

JON W. DUDAS
*Acting Director of the United States Patent and Trademark Office*